United States Patent
Humphrey et al.

(10) Patent No.: US 9,857,934 B2
(45) Date of Patent: Jan. 2, 2018

(54) SYNCHRONIZED DISPLAY AND PERFORMANCE MAPPING OF MUSICAL PERFORMANCES SUBMITTED FROM REMOTE LOCATIONS

(71) Applicant: JAMMIT, INC., Hollywood, CA (US)

(72) Inventors: Scott Humphrey, Hollywood, CA (US); Frank Gryner, St. Marys (CA)

(73) Assignee: JAMMIT, INC., Hollywood, CA (US)

( * ) Notice: Subject to any disclaimer, the term of this patent is extended or adjusted under 35 U.S.C. 154(b) by 334 days.

(21) Appl. No.: 14/306,224

(22) Filed: Jun. 16, 2014

(65) Prior Publication Data
US 2015/0046824 A1    Feb. 12, 2015

Related U.S. Application Data

(60) Provisional application No. 61/835,591, filed on Jun. 16, 2013.

(51) Int. Cl.
*G10H 1/36* (2006.01)
*G06F 3/0481* (2013.01)
(Continued)

(52) U.S. Cl.
CPC ......... *G06F 3/0481* (2013.01); *G10H 1/0058* (2013.01); *H04L 67/10* (2013.01);
(Continued)

(58) Field of Classification Search
CPC ........... G10H 1/0025; G10H 2240/325; G10H 2220/015; G10H 1/368; G10H 2210/076;
(Continued)

(56) References Cited

U.S. PATENT DOCUMENTS

| 4,030,397 A | 6/1977 | Nelson |
| 4,264,845 A | 4/1981 | Bednarz |

(Continued)

FOREIGN PATENT DOCUMENTS

| JP | 2002-333881 | 5/2001 |
| JP | 2002-341877 | 5/2001 |

(Continued)

OTHER PUBLICATIONS

International Search Report for PCT/US2009/001105, dated Jun. 25, 2009, OEM, Incorporated—related case.

(Continued)

*Primary Examiner* — Marlon Fletcher
(74) *Attorney, Agent, or Firm* — Brian S. Boyer; Syndicated Law, PC

(57) ABSTRACT

Systems and methods are provided for assembling and displaying a visual ensemble of musical performances that were created and uploaded from one or more locations that are remote from a host of the network, a director or other administrator reviewing submissions for selection and assembly, or perhaps merely remote from one or more other submissions received over a computer network. The assembled performances include a plurality of submissions, the submissions including performances created and uploaded at one or more locations remote from the location of the director for the assembly and display over the computer network. Systems and methods are also included for mapping one performance against another performance qualitatively, quantitatively, in real-time, or some combination thereof, enabling a musician, or a reviewer of performances, in the assessment of one performance relative to another performance.

8 Claims, 29 Drawing Sheets

(51) Int. Cl.
*H04L 29/08* (2006.01)
*G10H 1/00* (2006.01)

(52) U.S. Cl.
CPC . *G10H 2210/091* (2013.01); *G10H 2220/106* (2013.01); *G10H 2240/175* (2013.01)

(58) Field of Classification Search
CPC ............ G10H 1/0058; G10H 2240/175; G06F 17/3074
See application file for complete search history.

(56) References Cited

U.S. PATENT DOCUMENTS

| | | | |
|---|---|---|---|
| 4,658,690 | A | 4/1987 | Aitken et al. |
| D289,900 | S | 5/1987 | Aitken et al. |
| 4,870,325 | A | 9/1989 | Kazar |
| 5,008,595 | A | 4/1991 | Kazar |
| 5,100,985 | A | 3/1992 | Allen |
| 5,315,911 | A | 5/1994 | Ochi |
| 5,525,062 | A | 6/1996 | Ogawa et al. |
| 5,533,903 | A | 7/1996 | Kennedy |
| 5,557,056 | A | 9/1996 | Hong et al. |
| 5,569,038 | A | 10/1996 | Tubman et al. |
| 5,585,583 | A | 12/1996 | Owen |
| 5,627,335 | A | 5/1997 | Rigopulos et al. |
| 5,690,496 | A | 11/1997 | Kennedy |
| 5,715,179 | A | 2/1998 | Park |
| 5,725,931 | A | 3/1998 | Landin et al. |
| 5,739,457 | A | 4/1998 | Devecka |
| 5,763,804 | A | 6/1998 | Rigopulos et al. |
| 5,820,384 | A | 10/1998 | Tubman et al. |
| 5,906,464 | A | 5/1999 | Wedenig |
| 6,005,180 | A | 12/1999 | Masuda |
| 6,011,212 | A | 1/2000 | Rigopulos et al. |
| 6,066,791 | A | 5/2000 | Renard et al. |
| 6,201,174 | B1 | 3/2001 | Eller |
| 6,287,124 | B1 | 9/2001 | Yamaura et al. |
| 6,353,174 | B1 | 3/2002 | Schmidt et al. |
| 6,379,244 | B1 | 4/2002 | Sagawa et al. |
| 6,388,181 | B2 | 5/2002 | Moe |
| 6,429,863 | B1 | 8/2002 | LoPiccolo et al. |
| 6,482,087 | B1 | 11/2002 | Egozy et al. |
| 6,541,692 | B2 | 4/2003 | Miller |
| 6,555,737 | B2 | 4/2003 | Miyaki et al. |
| 6,639,138 | B1 | 10/2003 | Hester |
| 6,660,922 | B1 | 12/2003 | Roeder |
| 6,686,531 | B1 | 2/2004 | Pennock et al. |
| 6,740,803 | B2 | 5/2004 | Brinkman et al. |
| 6,751,439 | B2 | 6/2004 | Tice et al. |
| 6,924,425 | B2 | 8/2005 | Naples et al. |
| 6,969,797 | B2 | 11/2005 | Brinkman et al. |
| 7,030,311 | B2 | 4/2006 | Brinkman et al. |
| 7,081,580 | B2 | 7/2006 | Brinkman et al. |
| 7,129,407 | B2 | 10/2006 | Hiratsuka et al. |
| 7,141,733 | B2 | 11/2006 | Fujishima et al. |
| 7,164,076 | B2 | 1/2007 | McHale et al. |
| 7,191,023 | B2 | 3/2007 | Williams |
| 7,199,298 | B2 | 4/2007 | Funaki |
| 7,320,643 | B1 | 1/2008 | Brosius et al. |
| 7,345,236 | B2 | 3/2008 | Worrall et al. |
| 7,430,454 | B2 | 9/2008 | Ota et al. |
| 7,459,624 | B2 | 12/2008 | Schmidt et al. |
| 7,518,057 | B2 | 4/2009 | Worrall et al. |
| 7,525,036 | B2 | 4/2009 | Shotwell et al. |
| 7,576,279 | B2 | 8/2009 | Tohgi et al. |
| 7,625,284 | B2 | 12/2009 | Kay et al. |
| 7,683,250 | B2 | 3/2010 | Ikeya et al. |
| 7,709,725 | B2 | 5/2010 | Toledano et al. |
| 7,714,222 | B2 | 5/2010 | Taub et al. |
| 7,758,427 | B2 | 7/2010 | Egozy |
| 7,772,480 | B2 | 8/2010 | Brennan |
| 7,777,110 | B2 | 8/2010 | Wallis |
| 7,851,689 | B2 | 12/2010 | Reynolds et al. |
| 7,893,337 | B2 | 2/2011 | Lenz |
| 7,902,446 | B2 | 3/2011 | Humphrey |
| 7,906,720 | B2 | 3/2011 | Delorme |
| 7,910,818 | B2 | 3/2011 | Kim et al. |
| 7,923,620 | B2 | 4/2011 | Foster |
| 8,044,289 | B2 | 10/2011 | Toledano et al. |
| 8,111,241 | B2 | 2/2012 | Weinberg et al. |
| 8,119,896 | B1 | 2/2012 | Smith |
| 8,138,409 | B2 | 3/2012 | Brennan |
| 8,170,239 | B2 | 5/2012 | Bailey et al. |
| 8,173,883 | B2 | 5/2012 | Willacy et al. |
| 8,183,454 | B2 | 5/2012 | Luedecke et al. |
| 8,207,438 | B2 | 6/2012 | Humphrey |
| 8,278,543 | B2 | 10/2012 | Humphrey |
| 8,278,544 | B2 | 10/2012 | Humphrey |
| 8,283,545 | B2 | 10/2012 | Humphrey |
| 8,283,547 | B2 | 10/2012 | Villa et al. |
| 8,319,084 | B2 | 11/2012 | Humphrey |
| 8,338,684 | B2 | 12/2012 | Pillhofer et al. |
| 8,367,923 | B2 | 2/2013 | Humphrey |
| 8,444,486 | B2 | 5/2013 | Kay et al. |
| 8,476,517 | B2 | 7/2013 | Humphrey |
| 8,481,838 | B1 | 7/2013 | Smith |
| 8,481,839 | B2 | 7/2013 | Shaffer et al. |
| 8,502,055 | B2 | 8/2013 | Delorme |
| 8,779,265 | B1* | 7/2014 | Gottlieb ............... G10H 1/0033 84/600 |
| 8,847,053 | B2 | 9/2014 | Humphrey |
| 9,311,824 | B2 | 4/2016 | Humphrey |
| 2001/0015123 | A1 | 8/2001 | Nishitani et al. |
| 2002/0188364 | A1 | 12/2002 | Ota et al. |
| 2003/0014262 | A1 | 1/2003 | Kim |
| 2003/0164084 | A1* | 9/2003 | Redmann ............. G10H 1/0058 84/615 |
| 2004/0093236 | A1 | 5/2004 | Chacker |
| 2004/0244564 | A1 | 12/2004 | McGregor |
| 2005/0120866 | A1 | 6/2005 | Binkman et al. |
| 2005/0165657 | A1 | 7/2005 | Aichroth et al. |
| 2005/0255914 | A1 | 11/2005 | McHale |
| 2006/0075882 | A1 | 4/2006 | Ikeya et al. |
| 2006/0134590 | A1 | 6/2006 | Huffman et al. |
| 2006/0283310 | A1* | 12/2006 | Bicker ................. G10H 1/0066 84/645 |
| 2007/0039449 | A1* | 2/2007 | Redmann ............. G10H 1/0058 84/609 |
| 2007/0044643 | A1 | 3/2007 | Huffman |
| 2007/0256543 | A1 | 11/2007 | Evans |
| 2008/0113797 | A1 | 5/2008 | Egozy |
| 2008/0208692 | A1 | 8/2008 | Garaventi et al. |
| 2008/0260184 | A1 | 10/2008 | Bailey et al. |
| 2009/0019990 | A1 | 1/2009 | Chien et al. |
| 2009/0027338 | A1 | 1/2009 | Weinberg et al. |
| 2009/0038467 | A1 | 2/2009 | Brennan |
| 2009/0038468 | A1* | 2/2009 | Brennan .................. G09B 5/06 84/609 |
| 2009/0178544 | A1 | 7/2009 | Reynolds |
| 2010/0089221 | A1 | 4/2010 | Miller |
| 2010/0095829 | A1 | 4/2010 | Edwards |
| 2010/0162878 | A1 | 7/2010 | Lengeling et al. |
| 2010/0162880 | A1 | 7/2010 | Luedecke et al. |
| 2010/0218664 | A1 | 9/2010 | Toledano et al. |
| 2010/0233661 | A1 | 9/2010 | Franzblau |
| 2011/0003638 | A1 | 1/2011 | Lee et al. |
| 2011/0011241 | A1 | 1/2011 | Bartos |
| 2011/0146476 | A1 | 6/2011 | Zimmerman |
| 2011/0259176 | A1 | 10/2011 | Pillhofer et al. |
| 2011/0283866 | A1 | 11/2011 | Hogan |
| 2012/0047077 | A1 | 2/2012 | Humphrey |
| 2012/0174738 | A1 | 7/2012 | Kim |
| 2013/0068086 | A1 | 3/2013 | Mittelstad et al. |
| 2013/0233152 | A1 | 9/2013 | Pillhofer et al. |
| 2014/0067701 | A1 | 3/2014 | Humphrey |
| 2015/0046824 | A1 | 2/2015 | Humphrey |
| 2016/0189561 | A1 | 6/2016 | Humphrey |

FOREIGN PATENT DOCUMENTS

| | | |
|---|---|---|
| JP | 2003-015657 | 6/2001 |
| JP | 2006-106641 | 4/2006 |
| JP | 2010-518459 | 2/2007 |

(56) References Cited

FOREIGN PATENT DOCUMENTS

| KR | 10-0368599 | 1/2003 |
|----|------------|--------|
| WO | WO 2006/017612 | 2/2006 |
| WO | WO 2006/067451 | 6/2006 |
| WO | WO 2007/115299 | 10/2007 |
| WO | WO 2009/105259 | 8/2009 |
| WO | WO 2012/026920 | 3/2012 |
| WO | WO 2012/051605 | 4/2012 |
| WO | WO 2014/204875 | 12/2014 |

OTHER PUBLICATIONS

International Preliminary Report on Patentability for PCT/US2009/001105, dated Sep. 2, 2010, OEM, Incorporated—related case.
International Search Report for PCT/US2010/046395, dated Apr. 27, 2011, The Public Record—related case.
International Search Report for PCT/US2011/056485, dated Jul. 18, 2012, OEM, Incorporated—related case.
International Search Report for PCT/U2014/042596, dated Jun. 16, 2014, OEM, Incorproated—related case.
Alfred Music Publishing, Alfred introduces new jazz play-along series for improvisation [online] URL: http://www.alfred.com/Company/News/NewJazzPlay-AlongSeries.aspx [retrieved on Dec. 14, 2010].
Behind the Player, Interactive music video [online] URL: http://www.behindtheplayer.com/ [retrieve on Dec. 14, 2010].
Cnet News, Java-based MMOG RuneScape goes HD [online] URL: http://news.cnet.com/8301-17939_109-9990066-2.html [retrieved on Dec. 14, 2010].
eJAMMING AUDiiO, Now play and record together live with musicians anywhere in the world [online] URL: http://ejamming.com/learn-more/ [retrieved on Dec. 14, 2010].
Groove Maker, Multi-touch groove and beat remix app [online] URL: http://www.groovemaker.com/home/ [retrieved on Dec. 14, 2010].
Guitar Edge, The hottest artists, the coolest gear, the best tab [online] URL: http://www.guitaredge.com/ [retrieved on Dec. 14, 2010].
Guitar Hero. [online] URL: http://hub.guitarhero.com/ [retrieved on Dec. 14, 2010].
Guitar Instructor.com, [online] URL: http://www.guitarinstructor.com/support/supportAboutGI.jsp [retrieved on Dec. 14, 2010].
Guitar Pro 5 XP-002589192. Arobas Music. [online] URL: http://www.guitar-pro.com/ (Nov. 2005) [retrieved on Jan. 30, 2013].
Guitar Rising [online] URL: http://www.guitarrising.com/about.html [retrieved on Dec. 14, 2010].
Harmony Central, Vox ships jamvox, software/hardware modeling interface with gxt guitar xtracktion™ technology. Press Release Nov. 4, 2008, [online] URL: http://news.harmony-central/com/Newp/2008/Vox-JamVOX-Software-Hardware-Modeling-Interface.html [retrieved on Feb. 13, 2009].
iPERFORM$^{3D}$, Rotate. Zoom. Rock. [online] URL: http://www.iperform3d.com/howitworks.aspx [retrieved on Dec. 14, 2010].
Jam Play. Learn how to play guitar with online, video guitar lessons! [online] URL: http://www.jamplay.com/ [retrieved on Dec. 14, 2010].
Jam Vox, Jam and practice tool for guitar. [online] URL: http:www.voxamps.com/jamvox/ [retrieved on Dec. 14, 2010].
Line6.com, GuitarPort XT. [online] URL: http://line6.com/guitarport/ [retrieved on Dec. 14, 2010].
Mix Me In, iPhone App. [online] URL: http://www.mixmein.com/tour/ [retrieved on Dec. 14, 2010].
Mpogd.com, Music rivals. [online] URL: http://www.mpogd.com/games/game.asp?ID=3038 [retrieved on Dec. 14, 2010].
Music Lab, Music software developers, real guitar. [online] URL: http://www.musiclab.com/products/realgtr_info.htm [retrieved on Dec. 14, 2010].
Music Minus One. [online] URL: http://www.musicminusone.com/ [retrieved on Dec. 14, 2010].
Mxtabs.net. Free legal tablatur. [online]URL: http://www.mxtabs.net/about/ [retrieved on Dec. 14, 2010].
Rockband.com. [online] URL: http://www.rockband.com/ [retrieved on Dec. 14, 2010].
Starplayit. [online] URL: http://starplayit.com/10/ [retrieved on Dec. 14, 2010].
Sheet Music Plus, World's largest sheet music selection. [online] URL: http://www.sheetmusicplus.com/ [retrieved on Dec. 14, 2010].
Techcrunch.com, Bojam launches web-based collaborative. Sep. 30, 2009, [online] URL: http://techcrunch.com/2009/09/30/bojam-launches-web-based-collaborative-sound-studio/ [retrieved on Dec. 14, 2010].
Techcrunch.com, Songsterr: A flash guitar tab player that might rock, someday. [online] URL: http://techcrunch.com/2008/08/19/songsterr-a-flash-guitar-tab-player-that-might-rock-someday/ [retrieved on Dec. 14, 2010].
Wired, Interactive music format pregnant with possibility. Sep. 9, 2008, [online] URL: http://www.wired.com/listening_post/2008/09/dudemark-musing/ [retrieved on Dec. 14, 2010].
Wired, Gadget Lab Video: The holy grail of music gaming. [online] URL: http: //www.wired.com/gadgetlab/2009/01/finally-a-guita/ [retrieved on Dec. 14, 2010].
Wonderland Blog, Dance MMO. [online] URL: http://www.wonderlandblog.com/wonderland/2006/01/dance_mmo.html [retrieved on Dec. 14, 2010].

* cited by examiner

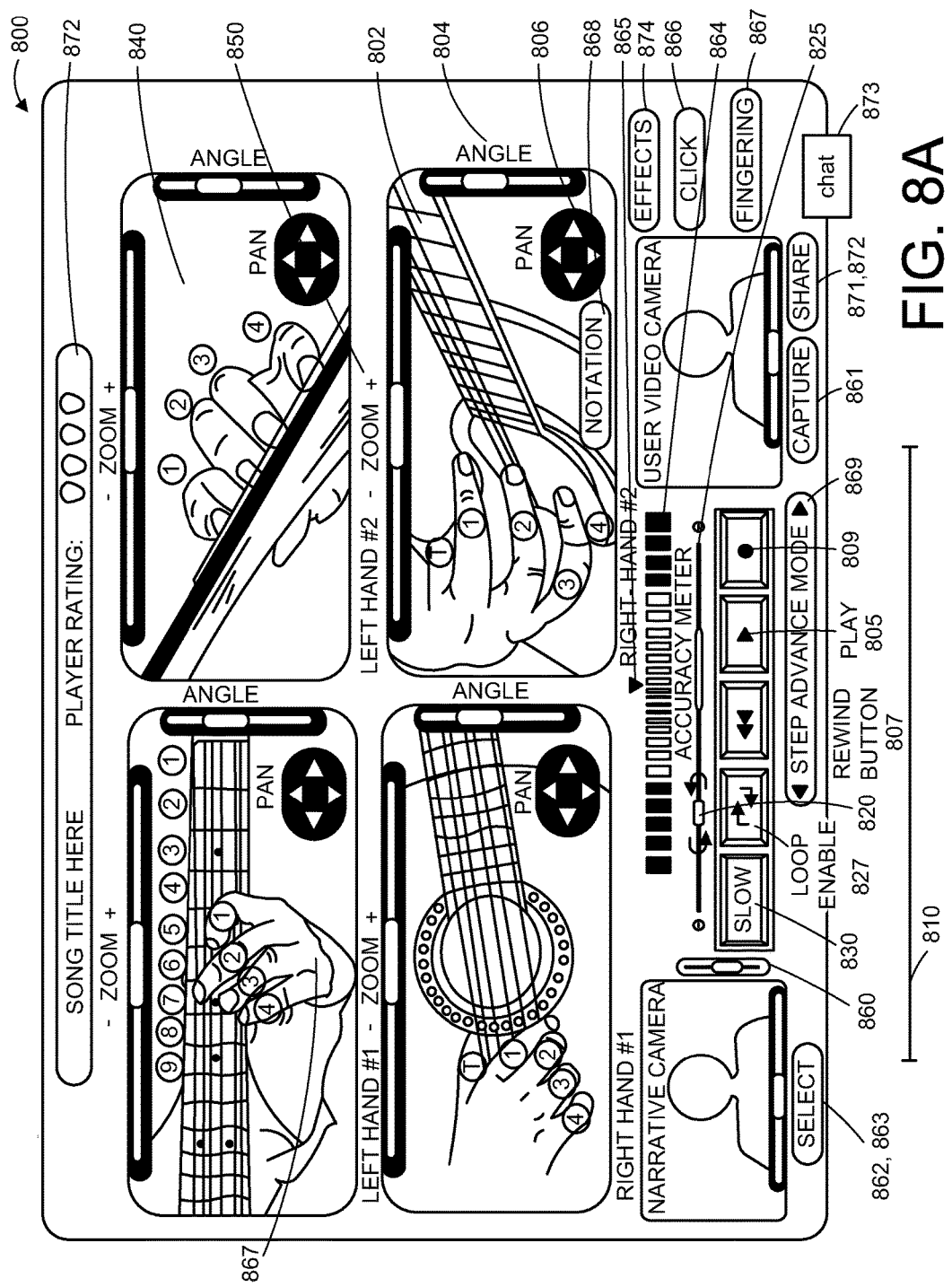

LEGEND:
— frequency performed, $F_P$
— frequency targeted, $F_T$
| timing of frequency performed, $T_{FP}$
| timing of frequency targeted, $T_{FT}$ LEGEND:
— frequency performed, $F_P$
— frequency targeted, $F_T$
| timing of frequency performed, $T_{FP}$
| timing of frequency targeted, $T_{FT}$ LEGEND:
— frequency performed, $F_P$
— frequency targeted, $F_T$
| timing of frequency performed, $T_{FP}$
| timing of frequency targeted, $T_{FT}$

SYNCHRONIZED DISPLAY AND PERFORMANCE MAPPING OF MUSICAL PERFORMANCES SUBMITTED FROM REMOTE LOCATIONS

This application claims the benefit of U.S. Provisional Application No. 61/835,591, filed Jun. 16, 2013, which is hereby incorporated herein by reference in it's entirety.

BACKGROUND

Field of the Invention

The systems and methods taught herein are generally directed to assembling, displaying, and evaluating a visual ensemble of musical performances that include a plurality of submissions from remote locations uploaded through a network to a director for the assembly.

Description of the Related Art

Music is a pleasure that is shared by most, and although there is a lot of musical talent to be discovered in the world, it can be a daunting task to discover it. Individuals that want to be discovered, for example, can find it difficult to gain exposure, and talent scouts that want to find talent are limited to finding talent using currently available methods often including traveling to live performances, auditioning live, or perhaps by a manual screening of recorded submissions that are sent to the talent scouts from remote locations. The process of traveling, scheduling auditions, and manual reviews of submissions can be expensive, as well as tedious, and quite subjective. Moreover, it can be even more challenging to assemble a band using such talent that has been discovered independently, from the remote locations. Discovering talent that both looks and sounds good together as an ensemble of performances that work well together as a band, for at least these reasons, requires extensive screening, travel, communications, scheduling, professional recording assistance, and the like. This is because, currently, you can't simply receive multiple separately recorded submissions and play them together as an ensemble in synchronization, and there's currently no technical solution to that synchronization problem, making live auditions necessary.

American Idol and The Voice are examples of extremely popular forums for discovering and displaying talent to the public, each of these forums sampling talent across the United States with the goal of discovering new talent for the public to enjoy. Jeff Zucker, the former NBC Universal chief executive has been said to have described American Idol as, for example, the most impactful show in the history of television. It's not unusual for a single episode of the show to attract over 30 million viewers. In its first ten years alone, American Idol created Kelly Clarkson, Carrie Underwood, Daughtry, Fantasia, Ruben Studdard, Jennifer Hudson, Clay Aiken, Adam Lambert and Jordin Sparks and remaining one of the highest rated television shows.

The process of choosing winners in such programs is long, arduous, expensive, and limiting, requiring the use of actual judges, transportation of the judges to actual physical locations for auditions, an extensive amount of time to hear the auditions, and limiting the participants to only those that can actual appear at the limited and actual audition sites that have been made available to the participants. The American Idol selection process, for example, includes several rounds—an initial three rounds of preliminary additions, a Hollywood round, a Las Vegas round (now the Sudden Death round), semi-finals, and then finals. Although auditions can exceed 10,000 musicians in each city, only a few hundred make it past the preliminary round of auditions. Those making it past the preliminary round then sing in front of producers. If they make it past that cut, they then proceed to audition in front of the judges, which is the only audition stage shown on television. Those selected by the judges are sent to Hollywood. Around 10-60 musicians from each city might make it to the Hollywood round. The "top 20" musicians from the Las Vegas round move to the semi-finals, after which the public takes over in the selection of musicians by voting, which has occurred through phone, text, and internet channels. The "top 10" then move onto the finals for more voting. The Voice, also with an incredibly high number of viewers and voters, has a similar structure with "blind auditions", "battle rounds", "knockout rounds", and live shows.

Electronic solutions to these physical limitations have been attempted with limited success due to the problem of having to sort through a massive number of submissions, and this, like American Idol and The Voice, is done physically by human reviewers and, accordingly, is subjective to the reviewers. YOUTUBE, for example, is the world's largest video-sharing website and has been credited for finding replacements for members of popular classic rock bands like Journey, Boston and many others. While it's easy to point out a few success stories, the arduous task of sorting through the endless amount of potential talent is clearly overwhelming, and the answer to this problem has not been solved, and has not been considered obvious to those of skill.

Although these processes provide great value to the public, they still have several technical problems that limit their value as an effective auditioning tool: (i) the limitation in sampling of talent due to the requirement that auditioners and judges meet at a particular physical location; (ii) the limitation in obtaining the best performance by the talent due to the stresses of performing at the particular physical location on demand; (iii) the limitation of having to physically review large numbers of auditions to find the best subsets of talent; (iv) the limitation of the physical reviews being subjective to the reviewer; (v) the limitation of having to physically review a daunting number of electronic submissions; (vi) the inability to select different types of talent and review them together, as an ensemble, due to the inability to align the performances and swap-out band members at will; and, moreover, (vii) the inability to view them together using both audio and video to see how they look, as well as perform, together as a band. Accordingly, those of skill in the art of music, auditions, and the selection of talent will appreciate the solution to these problems set-forth herein.

SUMMARY

The systems and methods taught herein are generally directed to assembling and displaying a visual ensemble of musical performances that include a plurality of submissions, each of the plurality of submissions performed and uploaded through a network to an administrator, such as a director, for the assembly. The submissions include performances created and uploaded at one or more locations remote from the location of the administrator. Systems and methods are also included for mapping one performance against another performance qualitatively, quantitatively, in real-time, or some combination thereof, enabling a musician, or a reviewer of performances, in the assessment of one performance relative to another performance.

The teachings include methods of engaging in the creation of an ensemble of a set of remotely-performed and remotely-uploaded musical performances through a computer network having a processor operably connected to a memory on a non-transitory computer readable medium. Engaging in the creation of the ensemble can occur in any of a variety of ways known to those in the music industry. For example, the engaging can include offering, creating, hosting, sponsoring, serving as a director in, deriving talent from, advertising on, marketing through, uploading a musical submission to, or deriving revenue from the computer network.

In some embodiments, the computer network includes a plurality of musicians in an operable communication with the computer network, the plurality of musicians having one or more musicians at a location remote from the location of an administrator of their performance, such as a host, reviewer, or director, for example, that may select a set of performances from the plurality of musicians to create an ensemble for display. The computer network also includes a timing reference on a non-transitory computer readable medium and available to the plurality of musicians, the timing reference having a tempo for a musical work selected by the administrator and instructions for execution of the timing reference by the processor. Moreover, the musicians will appreciate having instructions for participating in the methods, and so the computer network can also include an instruction module on a non-transitory computer readable medium operable for providing directions for each of the plurality of musicians. The instruction module can include instructions, for example, to use the timing reference to create a musical submission for the ensemble; record their musical submission at their remote location on a non-transitory computer readable medium; and, upload their musical submission to the computer network on a non-transitory computer readable medium to enable the administrator to select the set of performances from a plurality of submissions uploaded by the plurality of musicians.

The teachings are also directed to a system for contributing to an ensemble of a set of remotely-performed and remotely-uploaded musical performances through a computer network. In some embodiments, the systems comprise a processor operably connected to a memory on a non-transitory computer readable medium and an input device operable to receive audio data on a non-transitory computer readable medium. The memory can include a database operable to store data for access on a non-transitory computer readable medium; a timing reference on a computer readable medium, the timing reference having (i) instructions for execution by the processor and (ii) a tempo selected by a director, for example; an audio engine embodied in a non-transitory computer readable storage medium, wherein the audio engine is operable to transform input audio data to output audio data; and, an instruction module on a non-transitory computer readable medium operable for providing directions for a musician. For example, the instruction module can direct the musician to record a musical submission on a non-transitory computer readable medium at a location that is remote from a director of the ensemble, the recording including configuring the musical submission by following the timing reference when performing the musical submission. The instruction module can also direct the musician to upload the musical submission to the computer network at the location remote from the director to enable the director to create the ensemble by integrating the musical submission with the second musical submission using the timing interface.

It should be noted that the timing reference can offer more than a mere metronome with a constant beat. In fact, the timing reference can serve as a technical contribution to novelty and non-obviousness of the teachings set-forth herein. The timing references are configured to create ensembles as taught herein by functioning as a timing interface. The timing interference can serve as a technical means for allowing those of skill to assemble the timing of the musical submission with the timing of a second musical submission, the second musical submission also configured to interface with other performances in an ensemble by following the timing reference when performing the second musical submission. The systems, in fact, can include an integration engine embodied in a non-transitory computer readable medium and operable to interface the timing of the musical submission with the timing of the second musical submission using the timing interface created by use of the timing reference when performing each submission assembled in the ensemble.

Naturally, the methods include using a system for creating an ensemble of a set of remotely-performed and remotely-uploaded musical performances through a computer network. In some embodiments, the systems can be used by any administrator of the creation of an ensemble, such as a director, a host, or a reviewer, for example. In some embodiments, the administrator can include any person desiring to select and assemble an ensemble of performances from independent performances uploaded by the plurality of musicians to the computer network. In some embodiments, the administrator can include one of the plurality of musicians. Such a system can have a processor operably connected to a memory on a non-transitory computer readable medium, the memory including, for example, a receiving module operable for receiving audio data from a musical submission and a second musical submission on a non-transitory computer readable medium; an integration engine embodied in a non-transitory computer readable medium wherein the integration engine is operable to interface the timing of the musical submission with the timing of the second musical submission using the timing interface created by use of the timing reference in the creation of each submission assembled in the ensemble. And, a system for reviewing submissions, and creating and reviewing an ensemble, can include a display module operable for displaying the ensemble.

The musicians making submissions, and the administrators receiving and/or rating the submissions, will appreciate having a tool that will help them compare the frequency and timing of a musical submission with that of a reference performance. Such a tool can facilitate the learning by musicians, review of performances, and selection of musicians. As such, the systems and methods taught herein can further comprise a guidance module on a non-transitory computer readable medium and operable as a guidance system that includes a timing comparison tool to compare the musical submission to the select reference performance, the guidance system providing a feedback that includes a qualitative or quantitative measure of the timing comparison. Likewise, the guidance system can include a frequency comparison tool to compare the musical submission to the select reference performance, the guidance system providing a feedback that includes a qualitative or quantitative measure of the frequency comparison. Likewise, the guidance system can include both a frequency comparison tool and a timing comparison tool providing at least two-dimensions to compare the musical submission to the select reference performance, the guidance system providing a feedback that includes a qualitative or quantitative measure of the frequency comparison and the timing comparison.

The guidance system can be dynamic, providing an ongoing, continuous comparison of frequency and timing between a musical submission and it's reference performance over the course of the performance of the musical submission. In some embodiments, the dynamic guidance module can be on a non-transitory computer readable medium and operable as a dynamic guidance system including a frequency comparison tool and a timing comparison tool to provide a continuous comparison of the musical submission with the select reference performance from the beginning of the performance to the end of the performance, or any section therein, the dynamic guidance system providing a qualitative or quantitative measure of the frequency comparison and the timing comparison. In some embodiments, the dynamic guidance module can be on a non-transitory computer readable medium and operable as a dynamic guidance system, the guidance system including a frequency comparison tool and a timing comparison tool for each of the plurality of musicians to continuously compare their performance of the musical submission with the select reference performance while they perform, the dynamic guidance system providing a real-time feedback that includes a qualitative or quantitative measure of the frequency comparison and the timing comparison, the real-time feedback being no slower than 30 milliseconds from the occurrence of a respective transient or note performed in the musical submission and used for comparison to the select reference performance.

The timing reference is robust in it's function as a timing interface in that it accounts for tempo changes, complex rhythms and beats, and for that matter, any variable timing that occurs throughout a complex musical performance. In some embodiments, the timing reference can effectively "normalize" the timing of a plurality of performances that were performed at locations that were remote from the location of an administrator, host, director, or any reviewer that desires to assemble any combination of the plurality of performances as an ensemble. In some embodiments, the timing reference can be selected from the group consisting of a click-track; a drum track; a select reference track of a select reference performance, ♪i, the select reference performance having a series of sound frequencies, each of the frequencies performed at a particular time in the select reference performance; a residual audio track representing a multi-track digital audio file of a musical work having the select reference performance removed, the residual audio track having a series of sound frequencies, each of the frequencies performed at a particular time in the residual audio track; and, any combination thereof.

In some embodiments, the timing reference is one of a series of multi-track digital audio files available upon request by each of the plurality of musicians; each of the series containing a shared musical work, highlighting a select reference performance on a select reference track within the musical work. In these embodiments, the timing reference can include T reference performances within the musical work, wherein T=Σ♪$_i$; and, ♪$_i$=♪$_1$, ♪$_2$, ♪$_3$, . . . , or ♪$_T$; a select reference track of the select reference performance, ♪$_i$, the select reference performance having a series of sound frequencies, each of the frequencies performed at a particular time in the select reference performance; a residual audio track representing the multi-track digital audio file having the select reference performance removed; and, instructions for execution by the processor.

As such, the teachings are also directed to a method of facilitating the creation of an ensemble of a set of remotely-performed and remotely-uploaded musical performances through a computer network. In some embodiments, the method can include engaging in a computer network having a processor operably connected to a memory on a non-transitory computer readable medium. The teachings include methods of engaging in the creation of an ensemble of a set of remotely-performed and remotely-uploaded musical performances through a computer network having a processor operably connected to a memory on a non-transitory computer readable medium.

In some embodiments, the computer network includes a plurality of musicians in an operable communication with the computer network, the plurality of musicians having one or more musicians at a location remote from the location of a host, or other reviewer of their performance, such as a director, for example, that may select a set of performances from the plurality of musicians to create an ensemble for display. And, in some embodiments, the computer network also includes a timing reference on a non-transitory computer readable medium and available to the plurality of musicians, the timing reference having a tempo for a musical work selected by the director and instructions for execution of the timing reference by the processor.

Moreover, the musicians will appreciate having instructions for participating in the methods, and so the computer network can also include an instruction module on a non-transitory computer readable medium operable for providing directions for each of the plurality of musicians. The instruction module can include instructions, for example, to use the timing reference to create a musical submission for the ensemble, record their musical submission at their remote location on a non-transitory computer readable medium, and upload their musical submission to the computer network on a non-transitory computer readable medium to enable the director to select the set of performances from a plurality of submissions uploaded by the plurality of musicians.

In some embodiments, the reviewer is a director that selects a set of performances, Σ♪$_{ir}$≤♪$_{1r}$, ♪$_{2r}$, ♪$_{3r}$, . . . , + ♪$_{Tr}$, from the plurality of musicians in creating an ensemble. Moreover, the computer network can include a series of multi-track digital audio files available upon request by each of the plurality of musicians; each of the series containing a shared musical work, highlighting a select reference performance on a select reference track within the musical work and including T reference performances within the musical work, wherein T=Σ♪$_i$; and, ♪$_i$= ♪$_1$, ♪$_2$, ♪$_3$, . . . , or ♪$_T$; a select reference track of the select reference performance, ♪$_i$, the select reference performance having a series of sound frequencies, each of the frequencies performed at a particular time in the select reference performance; a residual audio track representing the multi-track digital audio file having the select reference performance removed; and, instructions for execution of each of the series by the processor. And, as described above, the computer network can also provide directions, often through the use of an instruction module on a non-transitory computer readable medium, instructing to each of the plurality of musicians to request one of the series of multi-track digital audio files having the select reference performance that they desire to replace with their own submission, ♪$_{ir}$; record their submission at their remote location on a non-transitory computer readable medium; perform their submission using the select reference track, the residual audio track, or the combination thereof, as a timing interface for integration of the ensemble; and, upload their submission to the computer network on a non-transitory computer readable medium to enable the director to select the set of performances from a plurality of submissions uploaded by the plurality of musicians.

As described above, the engaging in the creation of the ensemble can occur in any of a variety of ways known to those in the music industry. For example, the engaging can include offering, creating, hosting, sponsoring, serving as a director in, deriving talent from, advertising on, marketing through, uploading a musical submission to, or deriving revenue from the computer network. In some embodiments, the engaging includes directing, and the method further comprises reviewing the plurality of submissions, each of the plurality of submissions on a non-transitory computer readable medium; selecting the set of performances; and, interfacing the set of performances with an integration engine on a computer readable medium to create the ensemble for displaying with a display module on a non-transitory computer readable medium.

The teachings are also directed to a method for a musician to contribute to an ensemble of musical performances from a location that is remote from the location of a director that is creating the ensemble over a computer network. In some embodiments, the method includes entering a computer network having a processor operably connected to a memory on a non-transitory computer readable medium; a plurality of musicians, each of the plurality of musicians at a remote location from the director and in an operable communication with the computer network; a director that selects a set of performances, $\Sigma \natural_{i r} \leq \natural_{1 r}, \natural_{2 r}, \natural_{3 r}, \ldots, +\natural_{T r}$, from the plurality of musicians in creating an ensemble; a series of multi-track digital audio files available upon request by each of the plurality of musicians; each of the series containing a shared musical work. Each of the series, in fact, highlight a select reference performance on a select reference track within the musical work, and including (i) T reference performances within the musical work, wherein $T=\Sigma \natural_i$; and, $\natural_i = \natural_1, \natural_2, \natural_3, \ldots,$ or $\natural_T$; (ii) a select reference track of the select reference performance, $\natural_i$, the select reference performance having a series of sound frequencies, each of the frequencies performed at a particular time in the select reference performance; (iii) a residual audio track representing the multi-track digital audio file having the select reference performance removed; and, (iv) instructions for execution of each of the series by the processor. The computer network also includes directions, often provided on an instruction module on a non-transitory computer readable medium, instructing each of the plurality of musicians to request one of the series of multi-track digital audio files having the select reference performance that they desire to replace with their own musical submission, $\natural_{i r}$; perform their musical submission at their remote location using the select reference track, the residual audio track, or the combination thereof, as a timing interface for integration of the ensemble; record their musical submission at their remote location on a non-transitory computer readable medium; and, upload their submission to the computer network on a non-transitory computer readable medium to enable the director to select the set of performances from a plurality of submissions uploaded by the plurality of musicians.

In some embodiments, the method includes requesting from the computer network one of the series of multi-track digital audio files having the select reference performance that is to be replaced with a submission, $\natural_{i r}$; recording the submission on a non-transitory computer readable medium at a location remote from the director while using the select reference performance as a guide for the timing of performing each of the frequencies, and using the residual audio track as an accompaniment; and, uploading the submission to the database on a non-transitory computer readable medium for an interfacing of timing of the submission with the timing of a second submission that was recorded on a non-transitory computer readable medium by a second musician at a second location remote from the director while using the select reference performance as the timing interface, and using the residual audio track as an accompaniment. The methods can also include a displaying of the submission with the second submission as an ensemble, and the displaying can be obtained using a display module on a non-transitory computer readable medium operable to display each performance, and the ensemble of performances on a graphical user interface.

The systems and methods taught herein can include the assembly of both audio and video data in the creation of an ensemble. In this way, a musician or reviewer can visualize how a performance appears and sounds as an ensemble. Performers can be swapped-out to view a variety of different combinations in the selection of a set of performances to assemble as an ensemble, or band. As such, in some embodiments, the ensemble is a visual ensemble, and each performance in the set of performances includes a video recording of the respective submission for display in the visual ensemble. Likewise, in some embodiments, the systems can be configured to include an input device operable to receive video data on a non-transitory computer readable medium; a video engine embodied in a non-transitory computer readable medium, wherein the video engine is operable to transform input video data to output video data as a video recording of a musical submission for display in a visual ensemble; and, an output module embodied in a non-transitory computer readable medium, wherein the output module is operable to transmit the integrated audio data, along with the video data, to an output device, the output device operable to display the visual ensemble.

BRIEF DESCRIPTION OF THE FIGURES

FIGS. 8A-8C illustrates the system with a variety of functions for a variety of musical instruments, according to some embodiments.

DETAILED DESCRIPTION OF THE INVENTIONS

Figure 1:
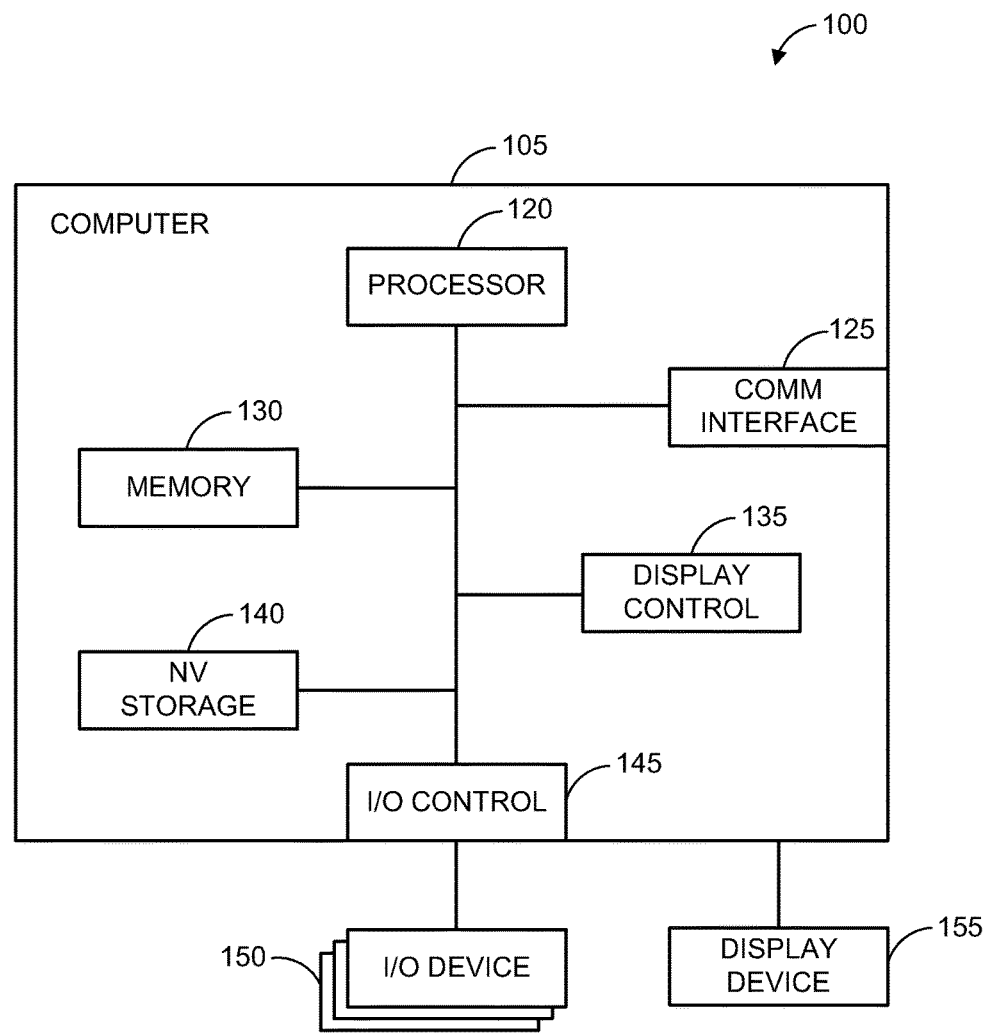
FIG. 1 shows a general technology platform for the system, according to some embodiments.

The systems and methods taught herein are generally directed to assembling and displaying a visual ensemble of musical performances that include a plurality of submissions, each of the plurality of submissions performed and uploaded through a network to an administrator, such as a director, for the assembly. The submissions include performances created and uploaded at one or more locations remote from the location of the administrator. Systems and methods are also included for mapping one performance against another performance qualitatively, quantitatively, in real-time, or some combination thereof, enabling a musician, or a reviewer of performances, in the assessment of one performance relative to another performance.

The systems and methods can assemble an ensemble of audio only, or audio and video, using any one or any combination of the teachings provided herein. In some embodiments, the performances can include a video portion, the systems and methods providing a variety of functionalities and uses. On the user side, for example, the systems and methods allow for some control of tempo, and the tempo is mapped, sometimes fixed, sometimes variable, and sometimes a variable can be adjusted to "conform to fixed tempo", in which the system can providing a moving average of tempo in any of a series of variable tempo sections, the sections parsed by tempo according to the musical work. Several users can perform works independently, and the tempo map allows them to assemble and display their combined works according to a set tempo map by system default, or a master-slave relationship. This can be done publicly or in private rooms. Likewise, on the admin side, the system allows reviewers to review performances by comparing a user's performance to a template performance, by comparing one user's performance to another user's performance, or some combination thereof. There can also be a guidance system and/or rating feature that maps the user's audio portion to a template portion to evaluate the user's performance against the template. The guidance system and/or rating feature can be a default program or custom design for particular desired performance traits which may define, for example, the "groove", "feel", or "pocket" of a particular performance or set of performances. The custom design can be a publicly disclosed design, or it can be proprietary to the reviewers.

The systems and methods taught herein are generally directed to a dynamic point referencing, or tempo mapping, of an audiovisual performance for an accurate and precise selection and controlled cycling of portions of the performance. In some embodiments, the teachings herein can include the development of a tempo map, and the tempo map can comprise a mapping of a complex tempo. In some embodiments, for example, the teachings are directed to a method of creating the instructional work of a performing art. Such methods can include selecting the work; and, mapping the audio portion of the work to create a dynamic point reference. The dynamic point reference is used to facilitate an accurate and precise selection, and point-cycling, of a desired portion of the work. In some embodiments, the dynamic point reference includes a tempo map of the audio portion that is adaptable for a plurality of tempos within the work. The term "dynamic point reference" can also be referred to as a "map," "a tempo map," "a customized tempo map," "a timing reference," "a variable timing reference," "a manually created and audible, variable timing reference," "an index," "indexing," "a custom index," "a customized indexing," "grid," "tempo/index," "position point reference," "variable point reference," or the like, in some embodiments.

The terms "audio/video," "audiovisual," "audio/visual," "AV," and the like, can be used interchangeably in most embodiments, the terms typically being used to refer to a work having an audio track or audio portion and a corresponding video portion or video portion. The term "corresponding" can refer, for example, to (i) the original source file recorded with the video; or, (ii) a recreated file in which the audio and/or video has been recreated or added, making the audio/video file useful for the teachings provided herein. Audiovideo files can include, for example, a monotrack audio file, a stereo audio file, or a multi-track audio file. A "multitrack file" can include, for example, from about 3 tracks to over 200 tracks, in some embodiments. And, it should be appreciated that a multi-track audio file can be analog or digital and, in fact, it can be extracted from a mono- or stereo-mixed file, or it can be extracted from any type of audio file sharing multiple instruments. The term "extracted" can be used to refer to a separation of instruments, in some embodiments, that are combined in an audio file. One of skill will readily identify such extraction methods known in the art including, but not limited to, processes that use phase- or phase-reversal techniques or frequency techniques (e.g., fast-fourier transform, FFT, discrete fourier transform, DFT, etc), mathematical algorithms, or a combination thereof, for example. Such extractions can be used with the teachings herein, in some embodiments.

The dynamic point referencing can be used by a learning artist, for example, in analyzing or performing a portion of the work through an accurate and precise digital audio/video instructional method having the controlled cycling feature. Such systems and methods will be appreciated, for example, by musicians, dancers, and other enthusiasts of the performing arts. In some embodiments, the work comprises an audio portion and a video portion, wherein the video portion includes a performance of the work by a performing artist. The terms "artist," "performing artist," "performer," "musician," "instructional artist," "instructor," "teacher," and the like, can be used interchangeably in some embodiments. In these embodiments, a dynamic point reference can be included within the musical work for an accurate and precise selection and point-cycling of a desired portion of the work. The dynamic point reference can include a tempo map of the musical work that is adaptable for a plurality of tempos within the musical work. Examples of tempo mapping can be found, for example, in U.S. Pat. No. 7,902,446, and U.S. application Ser. No. 13/274,293, each of which is hereby incorporated herein in its entirety by reference.

In some embodiments, the teachings are directed to a method for a user to learn a performance through an accurate and precise audiovisual instructional process. In these embodiments, the method can include obtaining an audiovisual work having an audio portion, a video portion, and a dynamic point reference for selecting a desired portion of the audiovisual work. The method can also include selecting the desired portion of the work using the dynamic point reference and emulating the performance. The method can also include point-cycling the desired portion until the desired portion is learned to a satisfaction of the user. The term "user" can include any operator of the system which, in some embodiments, can include a "learning artist," "student," "observer," "analyst," "voter," "judge," "teacher", "instructor," "competitor", "competing artist", "competing performer," and the like.

An advantage of the teachings provided herein is the accuracy and precision available in the selection of a desired portion. Due to this advantage, the cycling can include any selected time-frame within the work, such as a period of silence in an audio track, or any one or any series of sounds, beats, and bars. In some embodiments, the cycling can consist of a single musical note, a single repeating rhythmic pattern, or a series of accurate and precise selections from a tempo map. Each selection in the series of selections can consist of silence, a musical note, a plurality of beats, a bar, a plurality of bars, a repeating rhythmic pattern, or any combination thereof. In some embodiments, a visual portion of the work can provide a point of reference for the cycling such as, for example, during a period of silence in the work, or where an audio portion of the work is otherwise insufficient to establish a point of reference for the cycling, such as where the audio portion is damaged or ineffective. The ability to accurately and precisely select and cycle a desired portion of a musical work is a valuable aspect of the teachings provided herein. The terms "cycling," "point cycling," "rhythmic cycling," "looping," and "controlled cycling," can refer to the repeated playback of a desired portion selected using the teachings provided herein.

The terms "accurate," "accurately," and the like, can be used to refer to a measurable error, or in some embodiments the absence of a measurable error, in the difference between a user's actual desired portion, and the user's ability to select the desired portion from a work using the teachings provided herein. And, the desired portion can be a portion of an audio track or a related video portion. The terms "precise," "precisely," "precision," and the like can be used to refer the user's ability to reproducibly select the desired portion. The high degree of accuracy provided through the systems and methods taught herein produces, in response, likewise results in a high degree of precision for the user as well.

In some embodiments, the systems methods provided herein results in substantially no error in the selecting of the desired portion, such that any error may be isolated to fall within a relatively high accuracy of a computing system performing the functions taught herein which, in some embodiments, any error in selecting the desired portion can be less than a fraction of a millisecond. Such a computing system error may be, for example, less than about 3 milliseconds in some embodiments, between about 0.5 milliseconds and about 3 milliseconds in other embodiments, and less than perhaps a single millisecond in yet other embodiments. The term "desired portion" can be used to refer to a portion of a musical work that may range in duration, for example, from about 50 milliseconds to about 20 minutes. In some embodiments, a user can try to select a desired portion having a time duration of play that is very short, for example, ranging from about 90 ms to perhaps about 0.5 seconds or 1 second, making it difficult for the user to select the desired portion in a real-time manner. In this instance, such user error resulting from user response time is mitigated by offering the various features taught herein that include, for example, (i) a "nudge' function that allows the user to move forward in a preselected number of beats or any time reference, such as a single beat, fraction of a beat, pairs of beats, sets of beats, bars, pairs of bars, sets of bars, and the like; (ii) rules that automatically provide a region around an area selected, such that the user can be too slow or too fast in response time and still capture the desired portion; and (iii) a tempo adjustment to allow the user to, for example, slow down a whole work, or particular section to facilitate ease of selection of the desired portion.

FIG. 1 shows a general technology platform for the system, according to some embodiments. The computer system 100 may be a conventional computer system and includes a computer 105, I/O devices 150, and a display device 155. The computer 105 can include a processor 120, a communications interface 125, memory 130, display controller 135, non-volatile storage 140, and I/O controller 145. The computer system 100 may be coupled to or include the I/O devices 150 and display device 155.

The computer 105 interfaces to external systems through the communications interface 125, which may include a modem or network interface. It will be appreciated that the communications interface 125 can be considered to be part of the computer system 100 or a part of the computer 105. The communications interface 125 can be an analog modem, isdn modem, cable modem, token ring interface, satellite transmission interface (e.g. "direct PC"), or other interfaces for coupling the computer system 100 to other computer systems. In a cellular telephone, this interface is typically a radio interface for communication with a cellular network and may also include some form of cabled interface for use with an immediately available personal computer. In a two-way pager, the communications interface 125 is typically a radio interface for communication with a data transmission network but may similarly include a cabled or cradled interface as well. In a personal digital assistant, the communications interface 125 typically includes a cradled or cabled interface and may also include some form of radio interface, such as a BLUETOOTH or 802.11 interface, or a cellular radio interface, for example.

The processor 120 may be, for example, any suitable processor, such as a conventional microprocessor including, but not limited to, an Intel Pentium microprocessor or Motorola power PC microprocessor, a Texas Instruments digital signal processor, or a combination of such components. The memory 130 is coupled to the processor 120 by a bus. The memory 130 can be dynamic random access memory (DRAM) and can also include static ram (SRAM). The bus couples the processor 120 to the memory 130, also to the non-volatile storage 140, to the display controller 135, and to the I/O controller 145.

The I/O devices 150 can include a keyboard, disk drives, printers, a scanner, and other input and output devices, including a mouse or other pointing device. The display controller 135 may control in the conventional manner a display on the display device 155, which can be, for example, a cathode ray tube (CRT) or liquid crystal display (LCD). The display controller 135 and the I/O controller 145 can be implemented with conventional well known technology, meaning that they may be integrated together, for example.

The non-volatile storage 140 is often a FLASH memory or read-only memory, or some combination of the two. A magnetic hard disk, an optical disk, or another form of storage for large amounts of data may also be used in some embodiments, although the form factors for such devices typically preclude installation as a permanent component in some devices. Rather, a mass storage device on another computer is typically used in conjunction with the more limited storage of some devices. Some of this data is often written, by a direct memory access process, into memory 130 during execution of software in the computer 105. One of skill in the art will immediately recognize that the terms "machine-readable medium" or "computer-readable medium" includes any type of storage device that is accessible by the processor 120 and also encompasses a carrier wave that encodes a data signal. Objects, methods, inline caches, cache states and other object-oriented components may be stored in the non-volatile storage 140, or written into memory 130 during execution of, for example, an object-oriented software program.

The computer system 100 is one example of many possible different architectures. For example, personal computers based on an Intel microprocessor often have multiple buses, one of which can be an I/O bus for the peripherals and one that directly connects the processor 120 and the memory 130 (often referred to as a memory bus). The buses are connected together through bridge components that perform any necessary translation due to differing bus protocols.

In addition, the computer system 100 can be controlled by operating system software which includes a file management system, such as a disk operating system, which is part of the operating system software. One example of an operating system software with its associated file management system software is the family of operating systems known as Windows CE® and Windows® from Microsoft Corporation of Redmond, Wash., and their associated file management systems. Another example of operating system software with its associated file management system software is the LINUX operating system and its associated file management system. Another example of an operating system software with its associated file management system software is the PALM operating system and its associated file management system. Another example of an operating system is an ANDROID, or perhaps an iOS, operating system. The file management system is typically stored in the non-volatile storage 140 and causes the processor 120 to execute the various acts required by the operating system to input and output data and to store data in memory, including storing files on the non-volatile storage 140. Other operating systems may be provided by makers of devices, and those operating systems typically will have device-specific features which are not part of similar operating systems on similar devices. Similarly, WinCE®, PALM, IOS or ANDROID operating systems, for example, may be adapted to specific devices for specific device capabilities.

The computer system 100 may be integrated onto a single chip or set of chips in some embodiments, and can be fitted into a small form factor for use as a personal device. Thus, it is not uncommon for a processor, bus, onboard memory, and display/I-O controllers to all be integrated onto a single chip. Alternatively, functions may be split into several chips with point-to-point interconnection, causing the bus to be logically apparent but not physically obvious from inspection of either the actual device or related schematics.

Figure 2A:
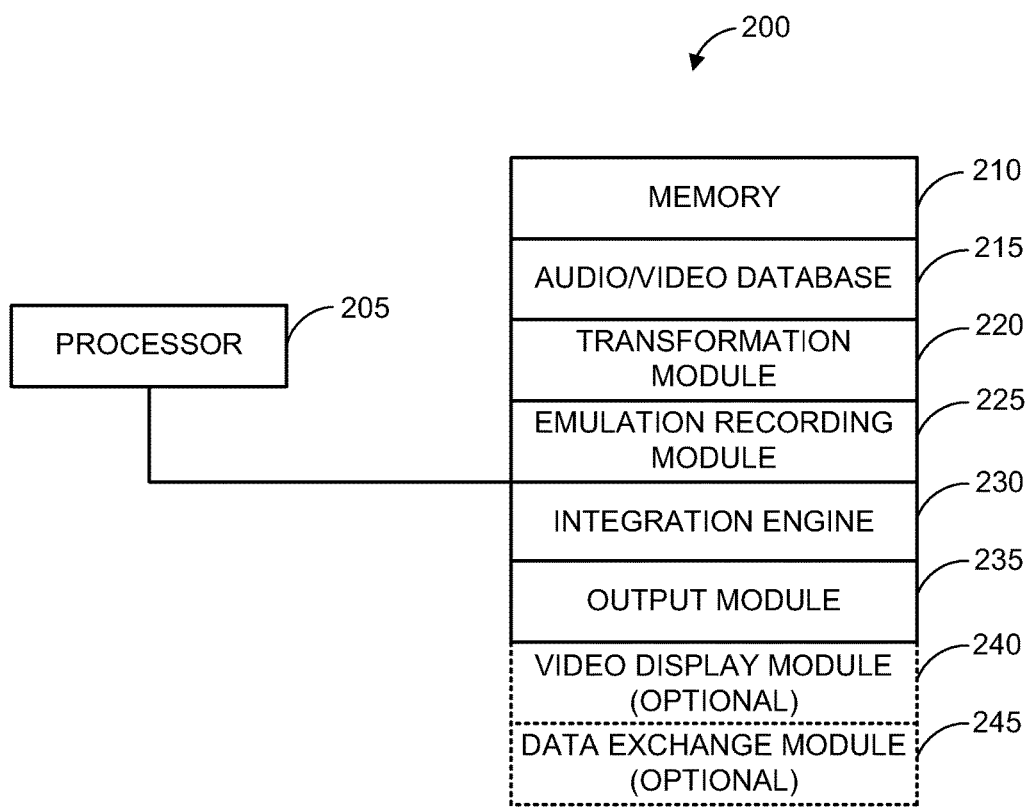
FIGS. 2A and 2B illustrate a processor-memory diagram to describe general components of the systems taught herein, according to some embodiments.
Figure 2B:
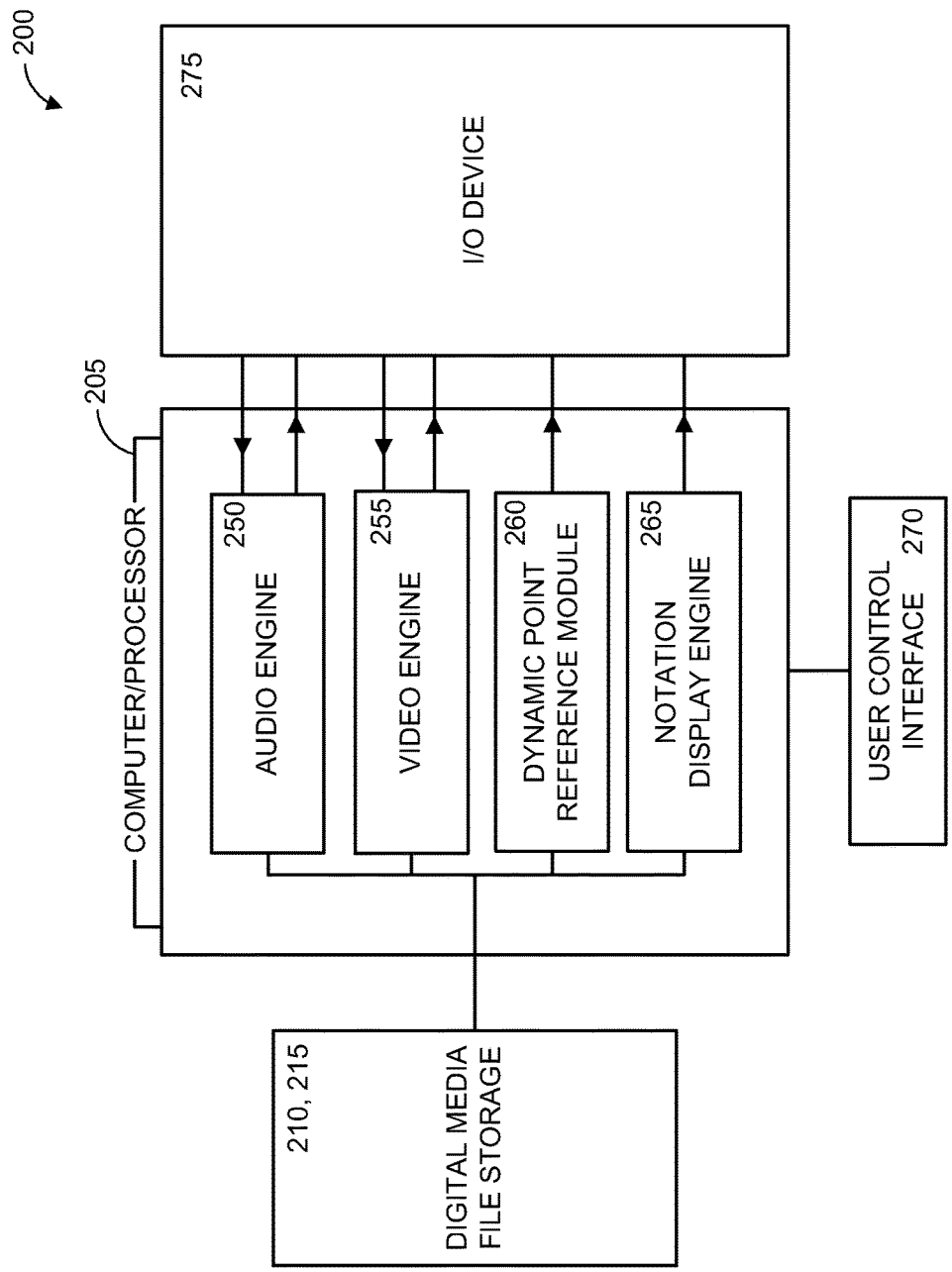

FIGS. 2A and 2B illustrate processor-memory diagrams to describe components of the system, according to some embodiments. In FIG. 2A, the system 200 shown in FIG. 2 contains a processor 205 and a memory 210 (that can include non-volatile memory), wherein the memory 210 includes an audio/video database 215, a transformation module 220, an emulation recording module 225, an integration engine 230, an output module 235, and an optional video display module 240, which can also be a part of the output module 235. The system can further comprise an optional data exchange module 245 embodied in a non-transitory computer readable medium, wherein the data exchange module is operable to exchange data with external computer readable media.

The system includes an input device (not shown) operable to receive audio data or video data on a non-transitory computer readable medium. Examples of input devices include a data exchange module operable to interact with external data formats, voice-recognition software, a handheld device in communication with the system including, but not limited to, a microphone, and the like, as well as a camera or other video image capture and transmission device. It should be appreciated that the input and output can be an analog or digital audio or video, The audio/video database 215 is operable to store audio or video files for access on a non-transitory computer readable storage medium. In some embodiments, the system can store original multi-track audio files, copies of original multi-track audio files, and the like. Any audio or video file known to one of skill in the art can be stored including, but not limited to sound files, text files, image files, and the like. In some embodiments, the system can access any of a variety of accessible data through a data exchange module, as discussed above.

Any audio or video format known to one of skill in the art can be used. In some embodiments, the audio file comprises a format that supports one audio codec and, in some embodiments, the audio file comprises a format that supports multiple codecs. In some embodiments the audio file comprises an uncompressed audio format such as, for example, WAV, AIFF, and AU. In some embodiments, the audio file format comprises lossless compression such as, FLAC, Monkey's Audio having file extension APE, WayPack having file extension WV, Shorten, Tom's lossless Audio Kompressor (TAK), TTA, ATRAC Advanced Lossless, Apple Lossless, and lossless WINDOWS Media Audio (WMA). In some embodiments, the audio file format comprises lossy compression, such as MP3, Vorbis, Musepack, ATRAC, lossy WINDOWS Media Audio (WMA) and AAC.

In some embodiments, the audio format is an uncompressed PCM audio format, as a ".wav" for a WINDOWS computer readable media, or as a ".aiff" as a MAC OS computer readable media. In some embodiments a Broadcast Wave Format (BWF) can be used, allowing metadata to be stored in the file. In some embodiments, the audio format is a lossless audio format, such as FLAC, WayPack, Monkey's Audio, ALAC/Apple Lossless. In some embodiments, the lossless audio format provides a compression ratio of about 2:1. In some embodiments, the audio format is a free-and-open format, such as way, ogg, mpc, flac, aiff, raw, au, or mid, for example. In some embodiments, the audio format is an open file format, such as gsm, dct, vox, aac, mp4/m4a, or mmf. In some embodiments the audio format is a proprietary format, such as mp3, wma, atrac, ra, ram, dss, msv, dvg, IVS, m4p, iklax, mxp4, and the like.

The transformation module 220 is operable to transform a multi-track audio file comprising an isolated instrument audio track and a residual component track into a ratio of (i) the isolated instrument audio track to (ii) the residual component track, wherein the residual component track represents a subtraction of the isolated instrument audio track from the plurality of audio tracks, and the transforming can results from a user selecting a gain ratio, for example, between the isolated instrument audio track, the residual component track, and a click track. It should be appreciated that a "gain ratio" can be used to refer to a user-controlled variable sound level relationship between the minimum (inaudible) sound volume (infinity:1) to maximum loudness output (0 dB full scale with a ratio of 1:1). The terms "gain" and "volume" can be used interchangeably in some embodiments, where a gain of "0" can be used, in some embodiments, as a reference for a minimum volume of an audio portion, track or otherwise; and, a ratio of 0 can be used to refer to a gain in the numerator of 0. For example, a ratio of an isolated instrument audio track to a residual component audio track of 0 can mean, for example, that at least the isolated instrument audio track has been turned off, or at least down to the minimum volume setting of 0. This setting allows the residual component volume, or gain, to be adjusted to an audible level desired by a user. Likewise, a ratio of a residual component audio track to an isolated instrument audio track of 0, for example, can mean that the residual component audio track has been turned off, or at least down to the minimum volume setting of 0, such that the isolated instrument audio track can be adjusted to a desired audible level for play in the absence of the residual component audio track.

The "residual component track" or "residual audio track" can be referred to as "a background audio track" or "an emulation audio track," in some embodiments. The term "metronome track" can be referred to as "click track," "manually created, audible, variable timing reference track," "audible, variable timing reference track," "variable timing reference track," "audible, dynamic point reference track," "audible, position point reference track," 'audible, variable point reference track," and the like, in some embodiments. It should be appreciated that, in some embodiments, the metronome track can provide a steady tempo. However, the term "metronome track" can also be used, in some embodiments, to refer to a track having a variable tempo for use with the dynamic point referencing taught herein.

The residual track represents a subtraction of the isolated instrument audio track from the plurality of audio tracks, and the transforming can result from a user selecting a between the isolated instrument audio track, the residual track, and the click track. The system can also include an emulation recording module 225 embodied in a non-transitory computer readable medium. The emulation recording module 225 is operable to record the user's emulated audio track on a non-transitory computer readable medium. In some embodiments, the emulation recording module 225 can be operable within a single functioning section of a system, such as a single page of a software application. In some embodiments, the emulation recording module 225 can be operable within a plurality of functioning sections of a system, such as in a plurality of pages of a software application, such that the recording can occur quickly at the choosing of the user without having to move from one section of the system to another section of the system.

The system can also include an integration engine 230 embodied in a non-transitory computer readable medium, wherein the integration engine 230 is operable to combine the emulated instrument audio track with the residual track to transform the multi-track audio file into an educational audio file. In addition, the system can include an output module 235 embodied in a non-transitory computer readable medium, wherein the output module 235 is operable to transmit audio data to an output device, which can be a graphical user interface, or video display, which can optionally be supported by a separate video display module 240, or the display can be supported with one or more other output devices by the output module 235. The output device can be operable to provide audio data to the user, wherein the audio data assists the user in learning a preselected piece of music.

In some embodiments, the input device comprises a microphone and/or camera and, in some embodiments, the output module 235 transmits music transcription and tablature data, or an alternative visual representation that may or may not be traditional transcription and tablature data, such as an animated motion graphic or cartoon, of an instrument or performance, to a graphical user interface. In some embodiments, the output device comprises a speaker, a graphical user interface, or both a speaker and a graphical user interface, for example. And, in some embodiments, the output module has a synchronization function operable to synchronize the music transcription and tablature data display on the graphical user interface with the isolated instrument audio track provided to the listener through the speaker.

The output module 235 can also have a recalibration function operable to recalibrate an audio data track output to correct a latency in the output of the audio track data. One of skill will appreciate that time stamps can be used to align, recalibrate, and correct latencies in the output of a data stream flow. In some embodiments, the latency is corrected by time stamping samples of the audio data, where a "sample" is a short wave form of the audio having a length measured by an increment of time. In some embodiments, a sample is less than a second long, (e.g., about 1/100 of a second, or 1/1000 of a second, in duration). In some embodiments, the samples can be about 44/1000 of a second long. An audio track can contain, for example, about 44,000 samples per track per second in a high quality sound file. As such, the concept of a sample and sample resolution is a measure of audio resolution or quality. A lower quality mono audio file can have about 22,000 samples per track per second, for example.

Recalibration techniques can be used in some embodiments. Bandwidth limitations of a computer system, for example, can create variations or transients in misalignments between tracks and hinder sound quality. A computer having a smaller CPU than another computer having a larger CPU but similar memory capacity can have latency problems that result in performance problems. In some embodiments, the system can provide an output of 4 streaming files, and these files can include (i) a residual component track that does not contain the isolated instrument audio track, (ii) an isolated instrument audio track, (iii) an emulated instrument audio track, and (iv) a dynamic point reference that can provide a dynamic point referencing of a variable tempo. In some embodiments, the residual component track, the isolated instrument audio track, and the emulated instrument audio track are stereo files and, in some embodiments, the index track is a mono file. Each track in each file has it's own timeline, and there can be acceptable variances that are not noticeable to the ear, but there can also be unacceptable variances that result in an unacceptable and audible degradation in audio quality.

Each input file is comprised of an array of samples, and each sample can be used as a marker in time, since each sample position has an actual position that will serve as a measure of variance against an ideal position. The recalibration is performed on sets of samples. When a group of samples is off in time, the system can be designed to correct for the next set of samples. For example, a system can be designed to recalibrate based on a sample resolution that provides a 0.001 second accuracy by measuring the variance of a time stamp on a group of 44 samples (0.001 of a second for a 44,000 sample/sec high quality sample) to an ideal time stamp for that sample set. A fast method of recalibration was developed to reduce this variance or "latency" in the audio so that it's not detectable to human being. A good ear, for example, can hear time variance between tracks of about 1/60 of a second, and multiple events of variances in a closely related string of samples can be cumulative, making it necessary to have a variance at least an order of magnitude under 1/60 of a second. In some embodiments, the minimum audio resolution in a sample for latency correction should be no less than 300 samples in a segment. In some embodiments, the audio resolution in a sample for latency correction is about 44 samples in a segment. In some embodiments, it was found that the recalibration should be done on each "run through" of the data in the system, where a "run through" is an emptying and a filling of a data queue in the system. Between data loads in a queue, the recalibration occurs by measuring the difference between the actual time of each track and the ideal time of each track and a correction is applied between data loads. In some embodiments, the audio queues up several hundred times per second.

The CPU on a handheld computer system can have difficulties concurrently processing the audio data files described herein. In some embodiments, a handheld computing system may have latency difficulties when concurrently processing more than 2 audio data files. As such, data files may require compression. In some embodiments, the data files can be compressed using a compression technique, for example, such as QUICKTIME by Apple. Other file compression techniques can be used. IMA4 can also be used to compress the files in some embodiments. In some embodiments, the system requires at least a 600-700 MHz processor. The iPhone has a 400 MHz processor, on the other hand, suggesting that compressed audio data files may be needed for use of some embodiments of the system on the iPhone. The IMA4 compression method compresses the audio data file to about 25% of file size. An iPAD system can also be used in some embodiments.

In some embodiments, it should be appreciated, however, that the system can use pure, uncompressed wave files. Many home PCs, however, may not need compressed files due to the more powerful processors currently available for home PCs. The bandwidth of the computer system, i.e. the size of the CPU and memory will dictate whether compression is necessary. One of skill in the art will appreciate that certain compression technologies may be needed in some systems for optimum performance and that these technologies are readily identifiable and accessible.

One of skill will appreciate that time stamping of data samples can also be used to synchronize between other data streams. In some embodiments, an additional audio data stream is used to provide a digital musical transcription and tablature display in the form of a graphical display. This audio data can be synchronized and recalibrated at the same time as the other audio data.

An audio file, such as a multi-track audio file, can further comprise an index track. As such, in some embodiments, the transformation module 220 can be operable to transform a multi-track audio file into a ratio of (i) the isolated instrument audio track, (ii) the residual track, and (iii) the index track, and a between the isolated instrument audio track, the residual track, and the index track can be selected by the user.

As described above, the system can further comprise an optional data exchange module 245 embodied in a non-transitory computer readable medium, wherein the data exchange module is operable to exchange data with external computer readable media. The data exchange module can, for example, serve as a messaging module operable to allow users to communicate with other users having like subject-profiles, or others users in a profile independent manner, merely upon election of the user. The users can email one another, post blogs, or have instant messaging capability for real-time communications. In some embodiments, the users have video and audio capability in the communications, wherein the system implements data streaming methods known to those of skill in the art. In some embodiments, the system is contained in a hand-held device; operable to function as a particular machine or apparatus having the additional function of telecommunications, word processing, or gaming; or operable to function as a particular machine or apparatus not having other substantial functions.

In FIG. 2B, a flowchart shows a variation of the system 200 where processor 205 is in operable connection with the memory 210 and the audio/video database are in digital media file storage 210,215. The system 200 can also include an audio engine 250 embodied in a non-transitory computer readable storage medium, wherein the audio engine 250 is operable to transform input audio data to output audio data. Likewise, the system 200 can also include a video engine 255 embodied in a non-transitory computer readable storage medium, wherein the video engine 255 is operable to transform input video data to output video data. Moreover, the system 200 can include a dynamic point reference module 260 embodied in a non-transitory computer readable storage medium, wherein the dynamic point reference module 260 is operable to create a dynamic point reference for a performance using a tempo map, the performance having an audiovisual file with the audio data and the video data. The system 200 can also have an output module (not shown) embodied in a non-transitory computer readable medium, wherein the output module is operable to (i) transmit the audio data and the video data to an output device in the form of an accurate and precise selection of a desired portion of the performance and (ii) transmit a point-cycling of the desired portion of the performance to a user. The output device 275 is operable to provide the audio data and the video data to the user, assisting the user in learning a performance. The system 200 can also include a notation display engine 265 to display music transcription and tablature indexed to the dynamic point reference. Moreover, the system 200 can include a user control interface 270.

The systems taught herein can be practiced with a variety of system configurations, including personal computers, multiprocessor systems, microprocessor-based or programmable consumer electronics, network PCs, minicomputers, mainframe computers, and the like. The teachings provided herein can also be practiced in distributed computing environments where tasks are performed by remote processing devices that are linked through a communications network. As such, in some embodiments, the system further comprises an external computer connection through the data exchange module 245 and a browser program module (not shown). The browser program module (not shown) can be operable to access external data as a part of the data exchange module 245.

Figure 3:
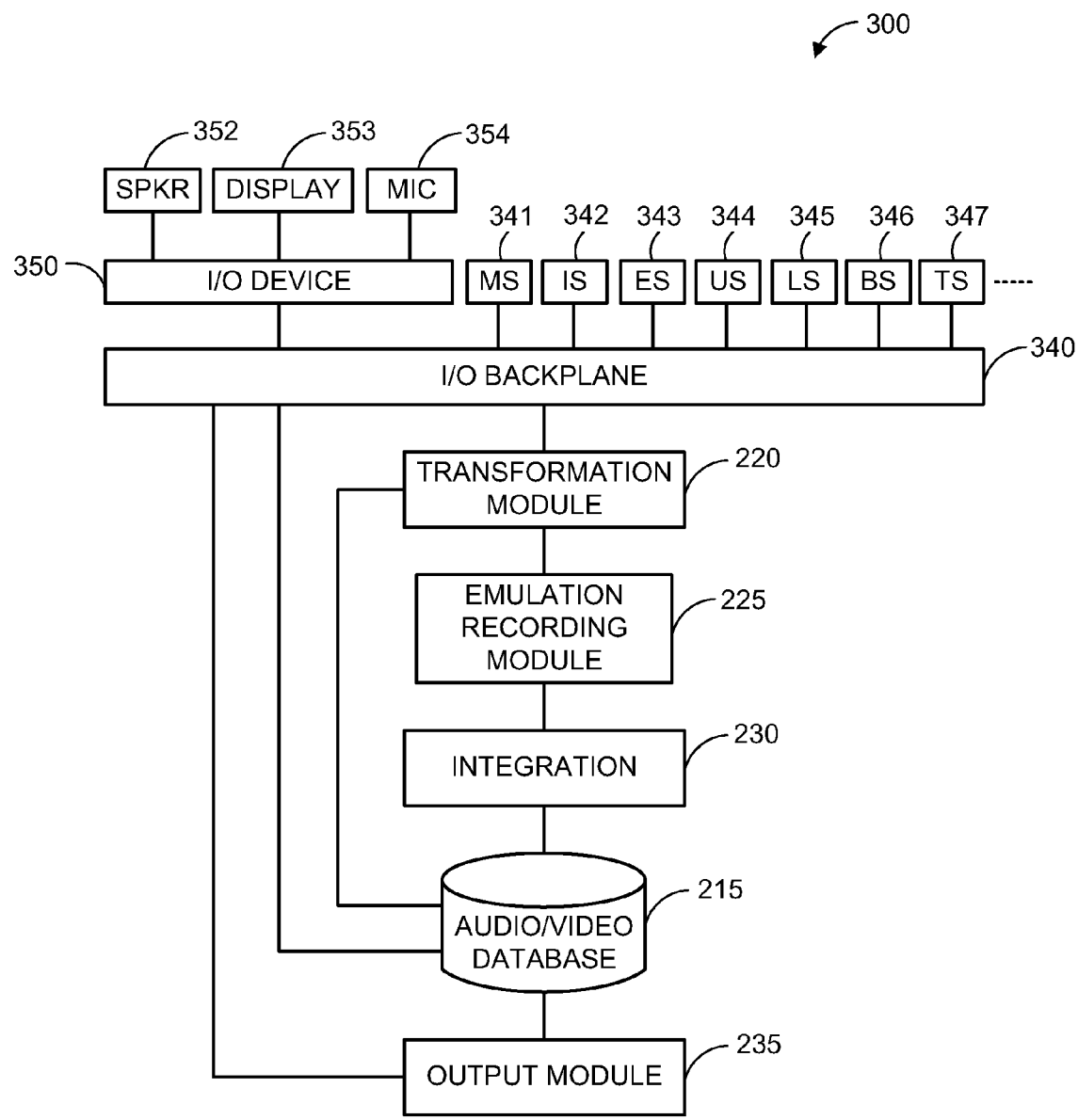
FIG. 3 is a concept diagram illustrating the system, according to some embodiments.

FIG. 3 is a concept diagram illustrating the system, according to some embodiments. The system 300 contains components that can be used in a typical embodiment. In addition to the audio database 215, the transformation module 220, the emulation recording module 225, the integration engine 230, and the output module 235 shown in FIG. 2, the memory 210 of the device 300 also includes a data exchange module 245 and the browser program module (not shown) for accessing the external data. The system includes a speaker 352, display 353, and a printer 354 connected directly or through I/O device 350, which is connected to I/O backplane 340.

The system 300 can be implemented in a stand-alone device, rather than a computer system or network. In FIG. 3, for example, the I/O device 350 connects to the speaker (spkr) 352, display 353, and microphone (mic) 354, but could also be coupled to other features. Such a device can have a music state selector 341, an isolated instrument audio track state selector 342, a residual track state selector 343, a user's emulated audio track state selector 344, a learning state selector 345 for the educational audio track, a bar state selector 346, and a timer state selector 347 for the index track, with each state selector connected directly to the I/O backplane 340.

In some embodiments, the system further comprises security measures to protect the subject's privacy, integrity of data, or both. Such security measures are those well-known in the art such as firewalls, software, and the like. In addition, the system can be configured for use in an environment that requires administrative procedures and control. For example, the system can include an administrative module (not shown) operable to control access, configure the engines, monitor results, perform quality assurance tests, and define audiences for targeting and trending. Since the system can safely be provided by a network and, in some embodiments, the system is coupled to a network, the security measures can help protect the contents of the system from external intrusions.

In some embodiments, the system is a web enabled application and can use, for example, Hypertext Transfer Protocol (HTTP) and Hypertext Transfer Protocol over Secure Socket Layer (HTTPS). These protocols provide a rich experience for the end user by utilizing web 2.0 technologies, such as AJAX, Macromedia Flash, etc. In some embodiments, the system is compatible with Internet Browsers, such as Internet Explorer, Mozilla Firefox, Opera, Safari, etc. In some embodiments, the system is compatible with mobile devices having full HTTP/HTTPS support, such as iPhone, PocketPCs, Microsoft Surface, Video Gaming Consoles, and the like. In some embodiments, the system can be accessed using a Wireless Application Protocol (WAP). This protocol will serve the non HTTP enabled mobile devices, such as Cell Phones, BlackBerries, Droids, etc., and provides a simple interface. Due to protocol limitations, the Flash animations are disabled and replaced with Text/Graphic menus. In some embodiments, the system can be accessed using a Simple Object Access Protocol (SOAP) and Extensible Markup Language (XML). By exposing the data via SOAP and XML, the system provides flexibility for third party and customized applications to query and interact with the system's core databases. For example, custom applications could be developed to run natively on iPhones, Java or .Net-enabled platforms, etc. One of skill will appreciate that the system is not limited to any of the platforms discussed above and will be amenable to new platforms as they develop.

In some embodiments, the teachings are directed to a method for a user to learn a performance through an accurate and precise audiovisual instructional process. In these embodiments, the method can include obtaining an audiovisual work having an audio portion, a video portion, and a dynamic point reference for selecting a desired portion of the audiovisual work. The method can also include selecting the desired portion of the work using the dynamic point reference and emulating the performance. The method can also include point-cycling the desired portion until the desired portion is learned to a satisfaction of the user.

The teachings include methods of engaging in the creation of an ensemble of a set of remotely-performed and remotely-uploaded musical performances through a computer network having a processor operably connected to a memory on a non-transitory computer readable medium. the method of engaging in the creation of an ensemble of a set of remotely-performed and remotely-uploaded musical performances includes a plurality of musicians includes engaging in a computer network. The plurality of musicians having one or more musicians at a location remote from the location of an administrator of their performance, such as a host, reviewer, or director, for example, that may select a set of performances from the plurality of musicians to create an ensemble for display. The computer network also includes a timing reference on a non-transitory computer readable medium and available to the plurality of musicians, the timing reference having a tempo for a musical work selected by the administrator and instructions for execution of the timing reference by the processor. Moreover, the musicians will appreciate having instructions for participating in the methods, and so the computer network can also include an instruction module on a non-transitory computer readable medium operable for providing directions for each of the plurality of musicians. The instruction module can include instructions, for example, to use the timing reference to create a musical submission for the ensemble; record their musical submission at their remote location on a non-transitory computer readable medium; and, upload their musical submission to the computer network on a non-transitory computer readable medium to enable the administrator to select the set of performances from a plurality of submissions uploaded by the plurality of musicians.

Engaging in the creation of the ensemble can occur in any of a variety of ways known to those in the music industry. For example, the engaging can include offering, creating, hosting, sponsoring, serving as a director in, deriving talent from, advertising on, marketing through, uploading a musical submission to, or deriving revenue from the computer network.

Figure 4A:
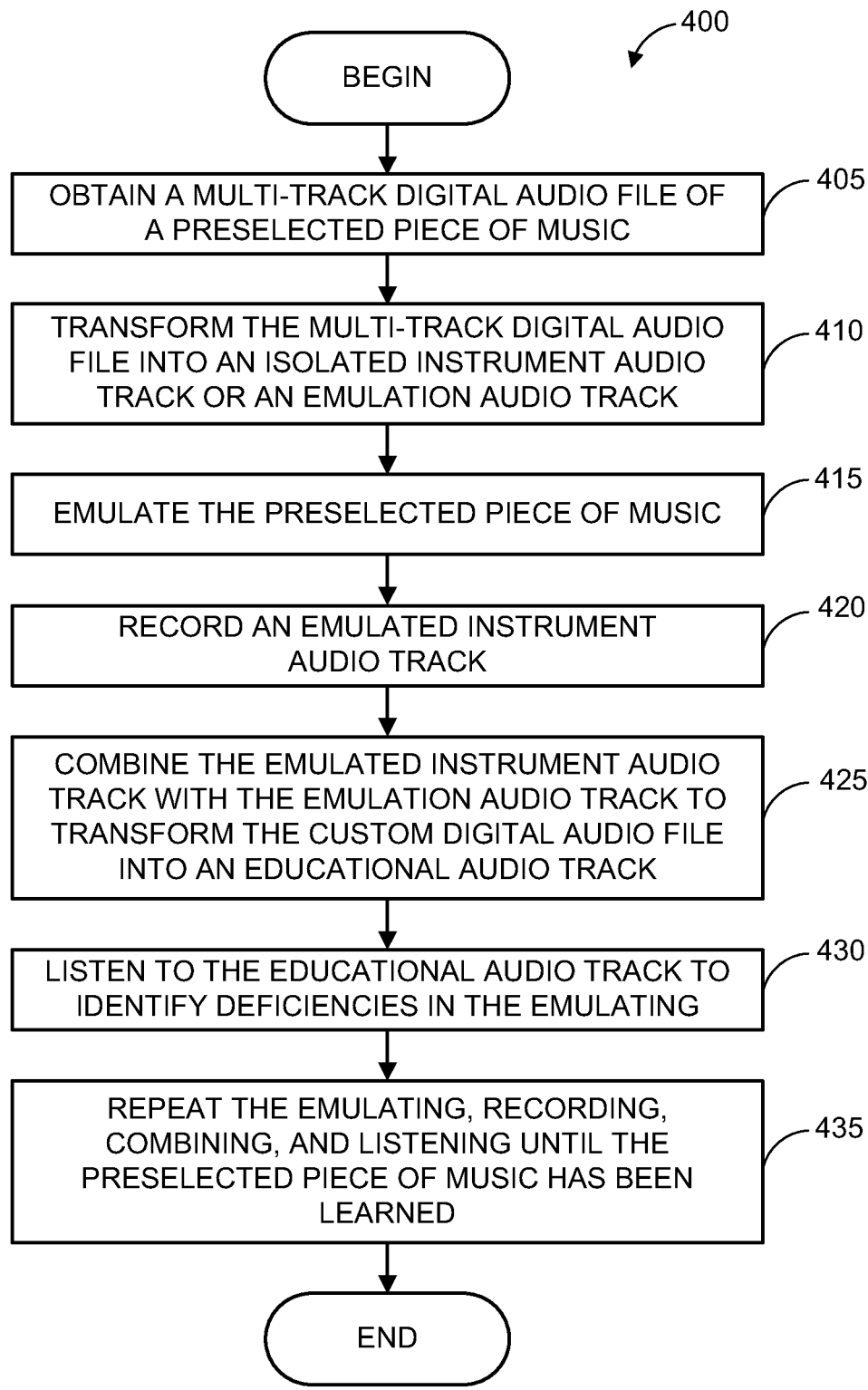
FIGS. 4A-4C illustrate the system, according to some embodiments: (A) a learning method; (B) a method of facilitating the creation of an ensemble of a set of remotely-performed and remotely-uploaded musical performances; and, (C) a method for a musician to contribute to an ensemble of musical performances from a location that is remote from the location of a director that is creating the ensemble.
Figure 4B:
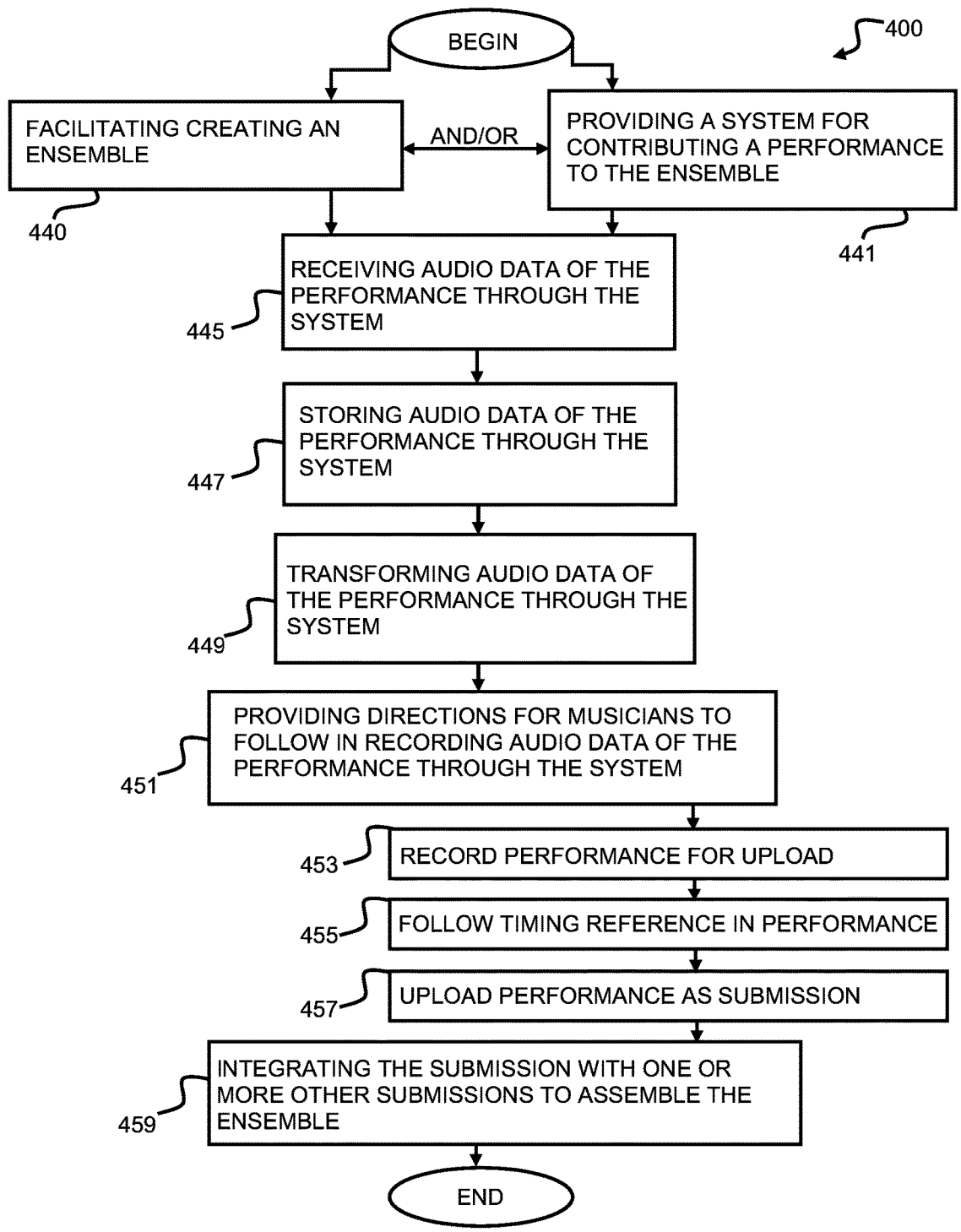
Figure 4C:
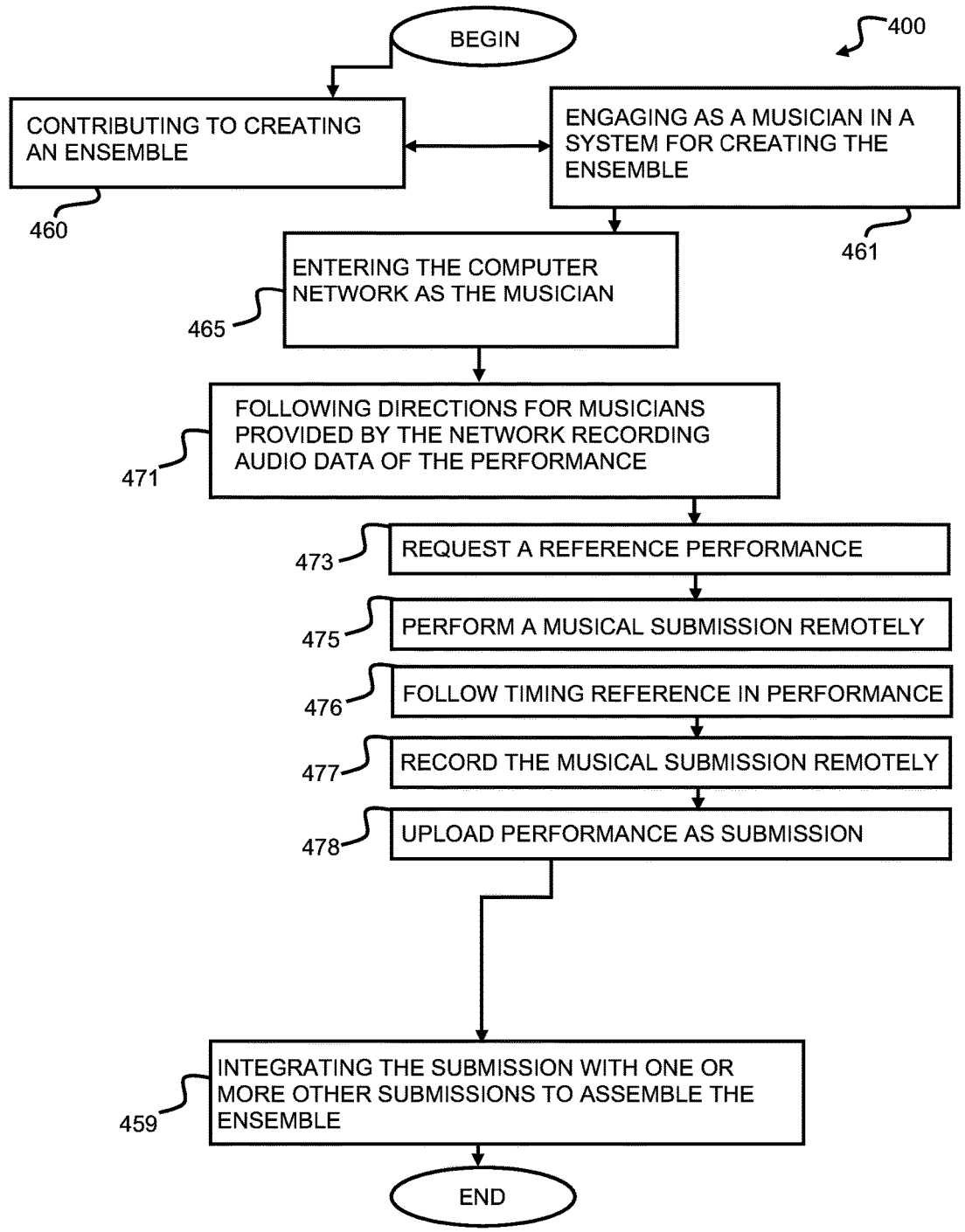

FIGS. 4A-4C illustrate the system, according to some embodiments: (A) a learning method; (B) a method of facilitating the creation of an ensemble of a set of remotely-performed and remotely-uploaded musical performances; and, (C) a method for a musician to contribute to an ensemble of musical performances from a location that is remote from the location of a director that is creating the ensemble.

As shown in FIG. 4A, the methods 400 include obtaining 405 a multi-track audio file produced from a multi-track audio recording. The multi-track audio file can be presented with a related video portion according to the teachings provided herein. The multi-track audio file can have an isolated instrument audio track and a residual track, and the isolated instrument audio track can have a single musical instrument playing a preselected piece of music that a user desires to learn on a preselected musical instrument. The method includes transforming 410 the composition of a multi-track audio file to include a ratio of (i) the isolated instrument audio track to (ii) a residual track. The residual component audio track represents a subtraction of the isolated instrument audio track from the plurality of audio tracks. The method includes emulating 415 the preselected piece of music by listening to the isolated instrument audio track, watching the corresponding video portion, and playing the preselected musical instrument to create an emulated instrument audio track. Consistent with the teachings provided herein, the emulating can include the video instructional which can be controlled and indexed through the tempo map as taught herein for use in conjunction with an audio track. The emulated instrument audio track is recorded 420 on a non-transitory computer readable medium and combined 425 with the residual track to transform the custom digital audio file into an educational audio file. The method includes listening 430 to the educational audio track to identify deficiencies in the emulating by the user. The user repeats 435 the emulating, recording, combining, and listening until the user has learned the preselected piece of music on the preselected musical instrument to the user's satisfaction.

In some embodiments, the transforming 410 includes reducing the volume of the residual track and, in some embodiments, the transforming 410 includes reducing the volume of the isolated instrument audio track. In some embodiments, the video portion is controlled through the tempo map as taught herein for a user to better understand how to play, and emulate the subtleties in an audio track. The method can further comprise selecting one or more bars of the isolated instrument audio track to enable the user to focus on emulating a section of the preselected piece of music. In some embodiments, the method can include the selection one or more bars to provide a repeated playback of the section. In some embodiments, the emulating 415 can further comprise reading a digital musical transcription and tablature display corresponding to the isolated instrument audio track. And, in some embodiments, the custom digital audio file further comprises an isolated index track, and the method further comprises listening to the isolated index track that is designed for the preselected piece of music.

As shown in FIG. 4B, the methods 400 include facilitating 440 the creation of an ensemble of a set of remotely-performed and remotely-uploaded musical performances. These methods include providing 441 a system for a plurality of musicians to contribute a performance to an ensemble of a set of remotely-performed and remotely-uploaded musical performances through a computer network. In some embodiments, these systems comprise a processor operably connected to a memory on a non-transitory computer readable medium and an input device operable to receive 445 audio data on a non-transitory computer readable medium from a musician. The memory can include a database operable to store 447 data for access on a non-transitory computer readable medium; a timing reference on a computer readable medium for the musician to follow, the timing reference having (i) instructions for execution by the processor and (ii) a tempo, constant, variable, or a variable set of tempos, selected by a director, for example; an audio engine embodied in a non-transitory computer readable storage medium, wherein the audio engine is operable to transform 449 input audio data to output audio data; and, an instruction module on a non-transitory computer readable medium operable for providing 451 directions for musicians to follow. For example, the instruction module can direct the musician to record 453 a musical submission on a non-transitory computer readable medium at a location that is remote from a director of the ensemble, the recording including configuring the musical submission by following 455 the timing reference when performing the musical submission. The instruction module can also direct the musician to upload 457 the musical submission to the computer network at the location remote from the director to enable the director to create the ensemble by integrating 459 the musical submission with the second musical submission using the timing interface.

As such, the methods can include engaging in a computer network having a processor operably connected to a memory on a non-transitory computer readable medium. The teachings include methods of engaging in the creation of an ensemble of a set of remotely-performed and remotely-uploaded musical performances through a computer network having a processor operably connected to a memory on a non-transitory computer readable medium. Consistent with the teachings herein, the engaging can occur in any of a variety of ways known to those in the music industry. For example, the engaging can include offering, creating, hosting, sponsoring, serving as a director in, deriving talent from, advertising on, marketing through, uploading a musical submission to, or deriving revenue from the computer network. In some embodiments, the engaging includes directing, and the method further comprises reviewing the plurality of submissions, each of the plurality of submissions on a non-transitory computer readable medium; selecting the set of performances; and, interfacing the set of performances with an integration engine on a computer readable medium to create the ensemble for displaying with a display module on a non-transitory computer readable medium.

In some embodiments, the computer network includes a plurality of musicians in an operable communication with the computer network, the plurality of musicians having one or more musicians at a location remote from the location of a host, or other reviewer of their performance, such as a director, for example, that may select a set of performances from the plurality of musicians to create an ensemble for display. And, in some embodiments, the computer network also includes a timing reference on a non-transitory computer readable medium and available to the plurality of musicians, the timing reference having a tempo for a musical work selected by the director and instructions for execution of the timing reference by the processor.

Moreover, the musicians will appreciate having instructions for participating in the methods, and so the computer network can also include an instruction module on a non-transitory computer readable medium operable for providing directions for each of the plurality of musicians. The instruction module can include instructions, for example, to use the timing reference to create a musical submission for the ensemble, record their musical submission at their remote location on a non-transitory computer readable medium, and upload their musical submission to the computer network on a non-transitory computer readable medium to enable the director to select the set of performances from a plurality of submissions uploaded by the plurality of musicians.

In some embodiments, the reviewer is a director that selects a set of performances, $\Sigma \musEighth_{ir} \leq \musEighth_{1r}, \musEighth_{2r}, \musEighth_{3r}, \ldots, + \musEighth_{Tr}$, from the plurality of musicians in creating an ensemble. Moreover, the computer network can include a series of multi-track digital audio files available upon request by each of the plurality of musicians; each of the series containing a shared musical work, highlighting a select reference performance on a select reference track within the musical work and including T reference performances within the musical work, wherein $T = \Sigma \musEighth_i$; and, $\musEighth_i = \musEighth_1, \musEighth_2, \musEighth_3, \ldots,$ or $\musEighth_T$; a select reference track of the select reference performance, $\musEighth i$, the select reference performance having a series of sound frequencies, each of the frequencies performed at a particular time in the select reference performance; a residual audio track representing the multi-track digital audio file having the select reference performance removed; and, instructions for execution of each of the series by the processor. And, as described above, the computer network can also provide directions, often through the use of an instruction module on a non-transitory computer readable medium, instructing to each of the plurality of musicians to request one of the series of multi-track digital audio files having the select reference performance that they desire to replace with their own submission, $\musEighth_{ir}$; record their submission at their remote location on a non-transitory computer readable medium; perform their submission using the select reference track, the residual audio track, or the combination thereof, as a timing interface for integration of the ensemble; and, upload their submission to the computer network on a non-transitory computer readable medium to enable the director to select the set of performances from a plurality of submissions uploaded by the plurality of musicians.

The systems and methods taught herein include facilitating the creation of an ensemble by providing a musician with tools for contributing to an ensemble of musical performances. The musician can contribute from a location that is remote from the location of a director that is creating the ensemble. In some embodiments, the systems and methods taught herein can be implemented by any administrator of the creation of an ensemble, such as a director, a host, or a reviewer, for example. In some embodiments, the administrator can include any person desiring to select and assemble an ensemble of performances from independent performances uploaded by a plurality of musicians in the computer network. In some embodiments, the administrator can include one of the plurality of musicians. Such a system can have a processor operably connected to a memory on a non-transitory computer readable medium, the memory including, for example, a receiving module operable for receiving audio data from a musical submission and a second musical submission on a non-transitory computer readable medium; an integration engine embodied in a non-transitory computer readable medium wherein the integration engine is operable to interface the timing of the musical submission with the timing of the second musical submission using the timing interface created by use of the timing reference in the creation of each submission assembled in the ensemble. And, a system for reviewing submissions, and creating and reviewing an ensemble, can include a display module operable for displaying the ensemble.

It should be noted that the timing reference can offer more than a mere metronome with a constant beat. In fact, the timing reference can serve as a technical contribution to novelty and non-obviousness of the teachings set-forth herein. The timing references are configured to create ensembles as taught herein by functioning as a timing interface. The timing interference can serve as a technical means for allowing those of skill to assemble the timing of the musical submission with the timing of a second musical submission, the second musical submission also configured to interface with other performances in an ensemble by following the timing reference when performing the second musical submission. The systems, in fact, can include an integration engine embodied in a non-transitory computer readable medium and operable to interface the timing of the musical submission with the timing of the second musical submission using the timing interface created by use of the timing reference when performing each submission assembled in the ensemble.

The Guidance Module

The musicians making submissions, and the administrators receiving and/or rating the submissions, will appreciate having a tool that will help them compare the frequency and timing of a musical submission with that of a reference performance. Such a tool can facilitate the learning by musicians, review of performances, and selection of musicians. As such, the systems and methods taught herein can further comprise a guidance module on a non-transitory computer readable medium and operable as a guidance system that includes a timing comparison tool to compare the musical submission to the select reference performance, the guidance system providing a feedback that includes a qualitative or quantitative measure of the timing comparison. Likewise, the guidance system can include a frequency comparison tool to compare the musical submission to the select reference performance, the guidance system providing a feedback that includes a qualitative or quantitative measure of the frequency comparison. Likewise, the guidance system can include both a frequency comparison tool and a timing comparison tool providing at least two-dimensions to compare the musical submission to the select reference performance, the guidance system providing a feedback that includes a qualitative or quantitative measure of the frequency comparison and the timing comparison.

The guidance system can be dynamic, providing an ongoing, continuous comparison of frequency and timing between a musical submission and it's reference performance over the course of the performance of the musical submission. In some embodiments, the dynamic guidance module can be on a non-transitory computer readable medium and operable as a dynamic guidance system including a frequency comparison tool and a timing comparison tool to provide a continuous comparison of the musical submission with the select reference performance from the beginning of the performance to the end of the performance, or any section therein, the dynamic guidance system providing a qualitative or quantitative measure of the frequency comparison and the timing comparison. In some embodiments, the dynamic guidance module can be on a non-transitory computer readable medium and operable as a dynamic guidance system, the guidance system including a frequency comparison tool and a timing comparison tool for each of the plurality of musicians to continuously compare their performance of the musical submission with the select reference performance while they perform, the dynamic guidance system providing a real-time feedback that includes a qualitative or quantitative measure of the frequency comparison and the timing comparison, the real-time feedback being no slower than 30 milliseconds from the occurrence of a respective transient or note performed in the musical submission and used for comparison to the select reference performance.

In some embodiments, the term "real-time" can be used to refer to a system in which the system receives constantly changing audio data from the musician and processes it sufficiently rapidly, such that the musician can have some control over the source of the data sent to the system. For example, the musician can change the frequency of sound performed at a particular time in response to feedback from the system. Or, the musician can change the timing at which frequencies are performed in response to feedback from the system. In some embodiments, the real-time feedback being no slower than 1, 2, 3, 5, 10, 15, 20, 25, 30, 50, 75, 100, 150, 200, or 300 milliseconds, or any amount therein in intervals of 1 millisecond milliseconds from the occurrence of a respective transient or note performed in the musical submission and used for comparison to the select reference performance. In some embodiments the real-time feedback ranges in response time from 1-100 milliseconds, from 5-50 milliseconds, from 2-20 milliseconds, from 3-30 milliseconds, from 4-40 milliseconds, or any range therein in intervals of 1 millisecond.

Any aspect of the system can operate in real-time, in some embodiments. For example, a user who submits in real-time could get immediate feedback from the director, or the public through a voting process. This process would allow for a real-time tutorial in a remote setting, in which the musician can respond to feedback as he would in a live session at a shared location. A producer could produce a musical performance remotely in this fashion. Moreover, such tutorials could be done through the teachings, presence, performance, or sponsorship of a well-known musician, record label, or enterprise such as American Idol, The Voice, or the like. The system could include a means for generating advertising revenue through the recognition and users generated through any such forum that includes the teachings, presence, performance, or sponsorship of a well-known musician, record label, or enterprise such as American Idol, The Voice, or the like.

The timing reference can be simple, or robust in it's function by serving as a timing interface in that it accounts for tempo changes, complex rhythms and beats, and for that matter, any variable timing that occurs throughout a complex musical performance. In some embodiments, the timing reference can effectively "normalize" the timing of a plurality of performances that were performed at locations that were remote from the location of an administrator, host, director, or any reviewer that desires to assemble any combination of the plurality of performances as an ensemble. In some embodiments, the timing reference can be selected from the group consisting of a click-track; a drum track; a select reference track of a select reference performance, ♪, the select reference performance having a series of sound frequencies, each of the frequencies performed at a particular time in the select reference performance; a residual audio track representing a multi-track digital audio file of a musical work having the select reference performance removed, the residual audio track having a series of sound frequencies, each of the frequencies performed at a particular time in the residual audio track; and, any combination thereof.

In some embodiments, the submission can be a musical performance that has a minimal timing reference to allow the musician to perform the submission "from scratch" to allow for greater creativity and expression in the submission. In other words, the submission is not a "replacement" but rather an overlay that can be combined with other submissions based on the minimal timing reference for the timing interface. The timing reference may be just a chart to follow and, for example, the submission may be a submission of a guitar part that doesn't yet exist at all in relation to the chart. In these embodiments, the timing reference may be a click track with no key for the song, a click track with a key for song, a click track with chord changes, drums with no key for the song, drums with a key for the song, drums with chord changes, drums with a bass track, drums with a rhythm track, drums with a plurality of instruments, and perhaps a complete musical work looking for an overlay.

In some embodiments, the timing reference is one of a series of multi-track digital audio files available upon request by each of the plurality of musicians; each of the series containing a shared musical work, highlighting a select reference performance on a select reference track within the musical work. In these embodiments, the timing reference can include T reference performances within the musical work, wherein $T=\Sigma \text{♪}_i$; and, $\text{♪}_i = \text{♪}_1, \text{♪}_2, \text{♪}_3, \ldots,$ or $\text{♪}_T$; a select reference track of the select reference performance, $\text{♪}_i$, the select reference performance having a series of sound frequencies, each of the frequencies performed at a particular time in the select reference performance; a residual audio track representing the multi-track digital audio file having the select reference performance removed; and, instructions for execution by the processor.

As shown in FIG. 4C, the methods 400 also include a process for a musician to use to contribute to an ensemble of musical performances from a location that is remote from the location of an administrator of the ensemble, such as a director that is creating the ensemble, over a computer network. In some embodiments, the method the contributing 460 includes engaging 461 in the system as a musician, the engaging 461 including entering 465 the computer network as the musician, the network having a processor operably connected to a memory on a non-transitory computer readable medium; a plurality of musicians, each of the plurality of musicians at a remote location from the director and in an operable communication with the computer network; a director that selects a set of performances, $\Sigma \text{♪}_{ir} \leq \text{♪}_{1r}, \text{♪}_{2r}, \text{♪}_{3r}, \ldots, + \text{♪}_{Tr}$, from the plurality of musicians in creating an ensemble; a series of multi-track digital audio files available upon request by each of the plurality of musicians; each of the series containing a shared musical work. Each of the series, in fact, highlight a select reference performance on a select reference track within the musical work, and including (i) T reference performances within the musical work, wherein T=$\Sigma \jmath_i$; and, $\jmath_i = \jmath_1, \jmath_2, \jmath_3, \ldots,$ or $\jmath_T$; (ii) a select reference track of the select reference performance, $\jmath_i$, the select reference performance having a series of sound frequencies, each of the frequencies performed at a particular time in the select reference performance; (iii) a residual audio track representing the multi-track digital audio file having the select reference performance removed; and, (iv) instructions for execution of each of the series by the processor. The computer network also includes directions for following 471 by the musician, the directions often provided on an instruction module on a non-transitory computer readable medium, instructing each of the plurality of musicians to request 473 one of the series of multi-track digital audio files having the select reference performance that they desire to replace with their own musical submission, $\jmath_{ir}$; perform 475 their musical submission at their remote location following 476 the select reference track, the residual audio track, or the combination thereof, as a timing interface for integration of the ensemble; record 477 their musical submission at their remote location on a non-transitory computer readable medium; and, upload 478 their submission to the computer network on a non-transitory computer readable medium to enable the director to select the set of performances from a plurality of submissions uploaded by the plurality of musicians for the integrating 479 of the set of performances to assemble an ensemble.

In some embodiments, the method includes requesting from the computer network one of the series of multi-track digital audio files having the select reference performance that is to be replaced with a submission, $\jmath_{ir}$; recording the submission on a non-transitory computer readable medium at a location remote from the director while using the select reference performance as a guide for the timing of performing each of the frequencies, and using the residual audio track as an accompaniment; and, uploading the submission to the database on a non-transitory computer readable medium for an interfacing of timing of the submission with the timing of a second submission that was recorded on a non-transitory computer readable medium by a second musician at a second location remote from the director while using the select reference performance as the timing interface, and using the residual audio track as an accompaniment. The methods can also include a displaying of the submission with the second submission as an ensemble, and the displaying can be obtained using a display module on a non-transitory computer readable medium operable to display each performance, and the ensemble of performances on a graphical user interface.

The systems and methods taught herein can include the assembly of both audio and video data in the creation of an ensemble. In this way, a musician or reviewer can visualize how a performance appears and sounds as an ensemble. Performers can be swapped-out to view a variety of different combinations in the selection of a set of performances to assemble as an ensemble, or band. As such, in some embodiments, the ensemble is a visual ensemble, and each performance in the set of performances includes a video recording of the respective submission for display in the visual ensemble. Likewise, in some embodiments, the systems can be configured to include an input device operable to receive video data on a non-transitory computer readable medium; a video engine embodied in a non-transitory computer readable medium, wherein the video engine is operable to transform input video data to output video data as a video recording of a musical submission for display in a visual ensemble; and, an output module embodied in a non-transitory computer readable medium, wherein the output module is operable to transmit the integrated audio data, along with the video data, to an output device, the output device operable to display the visual ensemble. Moreover, a video display can provide a useful tool for the learning artist to use in learning a piece of music. In some embodiments, the video portion includes a plurality of instructional views of the instructional artist performing the musical work for selection by the learning artist.

Any performing artist will appreciate the systems and methods taught herein. The performing artist in an audio-visual work can be amateur or professional. For example, the performing artist can be a popular artist, in some embodiments. Likewise, the musical work can be amateur or professional. For example, the musical work can be a popular musical work, in some embodiments. And, in some embodiments, the musical work can be an original, master multi-track recording of a popular, professional artist or group. As such, the performing artist can even be the popular professional artist or group that performed the original, master multi-track recording.

The tools provided herein to musicians and administrators are robust, as the timing reference builds-in a great deal of utility to the systems and methods. It should be appreciated that the user can isolate any desired portion of an audio track, and associated video portion, including any one or any series of sounds, beats, and bars. In some embodiments, the desired portion can consist of a single musical note, a single repeating rhythmic pattern, or a series of accurate and precise selections from the tempo map. Each selection in the series of selections can consist of a musical note, a plurality of beats, a bar, a plurality of bars, a repeating rhythmic pattern, or any combination thereof. The musical work can include any format or compilation that one of skill would find useful as applied to the teachings herein. In some embodiments, the musical work can be a multi-track musical work comprising an isolated audio track consisting of a solo performance that was not obtained through a process of subtracting the solo performance from a mixture of performances. Likewise, in some embodiments, the musical work can be a multi-track musical work comprising a plurality of isolated audio tracks consisting of a plurality of solo performances that were not obtained through a process of subtracting the solo performances from a mixture of the performances.

In some embodiments, an audiovisual file comprises a video portion synchronized with an audio track, wherein the video portion includes a performance of a work by a performing artist. In these embodiments, a dynamic point referencing method can be included within the musical work for an accurate and precise selection and cycling of a desired portion of the synchronized audio and video portions by the learning artist. The dynamic point referencing can include a tempo map of the musical work that is adaptable for a plurality of tempos within the musical work. The accuracy and precision of the selection of the desired portion of the synchronized audio and video data provides an instructional tool that is valuable to the learning artist. For example, a dynamic point referencing of the musical work can provide accuracy and precision in the selection of the desired portion when using the methods provided herein. The tempo map can include a plurality of tempos or a complex tempo, in some embodiments. It should also be appreciated that the tempo map can represent a fixed tempo in some embodiments, such that the tempo map comprises a single tempo in a substantial portion of a work, and even consists of a single tempo throughout the work.

The systems and methods can be operable using a handheld device, in some embodiments. In some embodiments, the systems are operable to function as a particular machine or apparatus having the additional function of telecommunications, word processing, or other forms of gaming. Likewise, the system can be operable to function as a particular machine or apparatus not having other substantial functions. The handheld apparatus can be a smart phone, iPAD, laptop computer, or another type of handheld computing device having other substantial functions.

Figure 5:
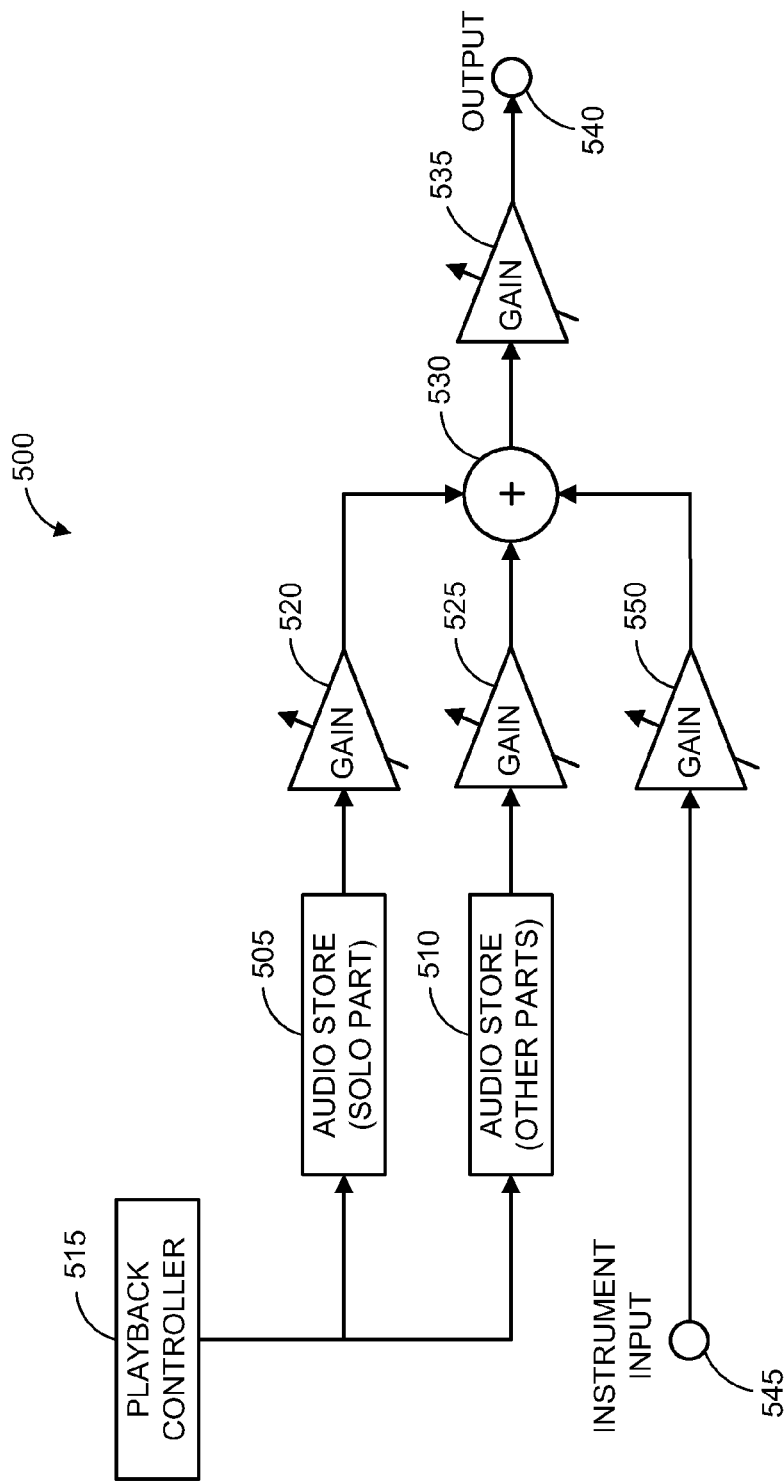
FIG. 5 illustrates a circuit diagram of the system according to some embodiments.

FIG. 5 illustrates a circuit diagram of the system, according to some embodiments. The solo audio part (the part to be learned) is retained in an audio store 505, and the audio recording of the other parts of the composition are retained in an audio store 510. Storage areas 505 and 510 may reside in separate devices or in a single storage device, but can be accessed separately. The progressive retrieval of audio information from stores 505 and 510 is controlled by a playback controller 515 such that the various parts of the composition become synchronized in time. The solo audio signal can pass through a variable gain element 520 so that it's volume level in an overall output 540 can be controlled. Similarly, the other audio signals pass through a gain element 525 and are fed to a mixing element 530, to be combined with the solo instrument audio signal provided from gain element 520. A similar circuit diagram can be used for video stores.

An external instrument input element 545 enables an external audio source, such as the practice instrument, to be included in overall output 540. The signal provided by instrument input element 545 passes through a gain element 550 before delivery to mixing element 530.

The overall output level can be controlled using a gain element 535, which receives an input signal from mixing element 530 and feeds an output signal to overall output 540. The various gain elements can be controlled directly through user controls or through signals from a controlling device such as a microprocessor. In some embodiments, other parts of the musical performance may be stored in separated storage areas to facilitate the learning process or to accommodate multiple players.

Figure 6:
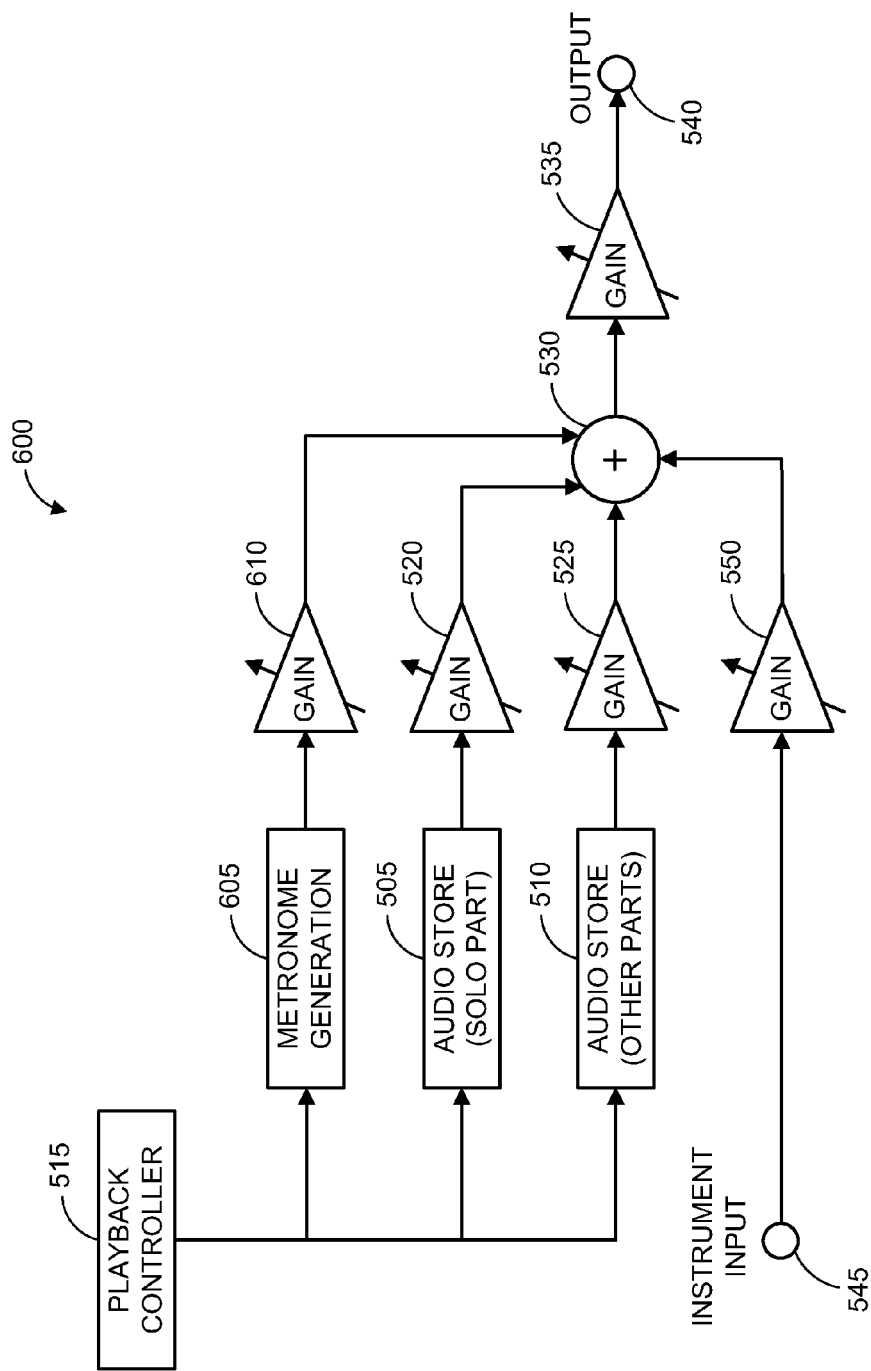
FIG. 6 illustrates a circuit diagram of the system including a click function, according to some embodiments.

FIG. 6 illustrates a circuit diagram of the system including a click function, according to some embodiments. An audible timing reference, or dynamic point reference, is included into the signal provided to the output of the device. This timing reference may be a periodic sound such as a click, beep, or a tone, which can be recorded and stored in a method similar to that used for the other audio signals, or which may be synthesized by an audio signal generator 605 while the musical piece is being played. This additional sound is delivered to mixing element 530 via a variable gain element 610, which allows the audible level of the dynamic point reference to be adjusted.

In some embodiments, the dynamic point reference can be created from a tempo map, such that the dynamic point reference, or indexing, is variable over time, rather than constant. Many musical works cannot be accurately mapped using a constant timing reference, as these works can be found to have, for example, variable and unpredictable tempo changes during the course of the performance of the musical work. And, this is particularly true of original musical works, such as those found in the original multitrack master recordings that are the subject of many embodiments of the teachings provided herein.

Sheet music, for example, can be obtained for such original musical works, and these are generally expected to comprise transcriptions of an original and complex variance of tempos into a constant tempo. The teachings provided herein, however, do not use a constant tempo but, rather, are based on a custom tempo mapping, for example, of an original recording providing a dynamic point reference that is substantially identical to the originally recorded work. Traditional sheet music, or digital sheet music (e.g., pdf scans of sheet music), of popular music provide a derivative musical work that is, in most cases, transcribed much different than the originally recorded musical work. Traditional sheet music, for example, generally uses repeated sections that ignore the nuances that occur in an original musical work. The teachings provided herein, however, do not use such repeated sections, but rather are linear and verbatim representations of the original work transcribed from the original, isolated instrument tracks of an original master providing a transcription of the work that is transcribed to be substantially identical to the originally recorded work.

Figure 7A:
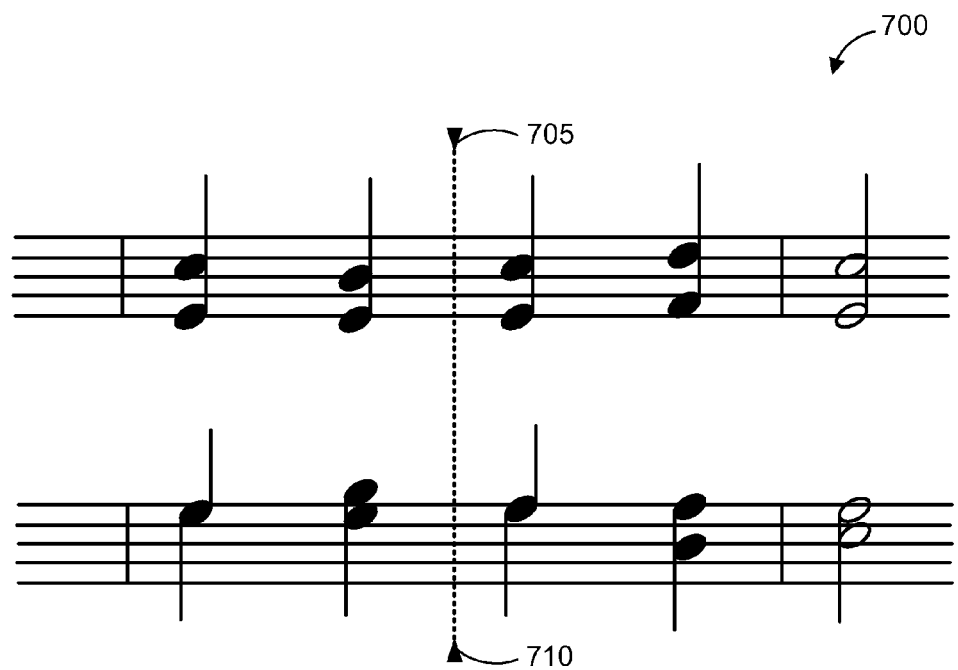
FIGS. 7A and 7B illustrate a musical notation display designed for use with the system, according to some embodiments.
Figure 7B:

FIGS. 7A and 7B illustrate a musical notation display designed for use with the system, according to some embodiments. In some embodiments, a display provides an animated graphical representation of the musical notation relative to the part to be learned, whereby such graphical representation scrolls along the display area in synchronism with the audio music signal. In FIG. 7A, for example, a time region 705,710 of the display area is marked to identify the present moment, with the graphical representation of the music moving past time region 705,710 as the music part is being played. By this arrangement, the display area enables a player to see musical events in advance that are immediately following the present moment. In some embodiments, a recent musical notation may also be seen in retrospect. In FIG. 7B, for example, a desired portion of the musical work is accurately and precisely selected for cycling, as shown by the broken line, in which the speed of the cycled portion can be adjusted for the skill level of the user. Moreover, the size of the broken line box can be reduced to a very high resolution to capture nearly any desired time increment in the work, for example, a small set of beats, a single beat, a fraction of beat, and the like. Accordingly, the apparatus and methods of presenting musical notation are advantageous for at least the reason that a user is provided with a temporal context, tempo speed adjustments, and video matching of the same for the musical events of interest.

Moreover, and contrary to traditional sheet music notation, the scrolling of the music can be continuous, removing the need for page turns. And, as described herein, the scrolling of the notation can reflect the variable and unpredictable tempo changes of an original, multi-track master, rather than a derivative work produced using a constant, or substantially constant, tempo. Having the function of digital indexing with the tempo map, as described herein, allows for an accurate and precise selection of the desired portion of the musical work, as well as an accurate and precise cycling at any tempo desired by the user. A tempo can be referred to as "substantially constant," for example, where it was not created to reflect the variable and unpredictable tempo changes of the original, multi-track master. It should be appreciated that a transcriptionist of music could vary tempo from time to time in a musical work, but one of skill would consider such tempo changes to be substantially constant in view of the variable and unpredictable tempo changes that can occur from the original performance by the original artist as found in an original, multi-track master recording.

Figure 8B:
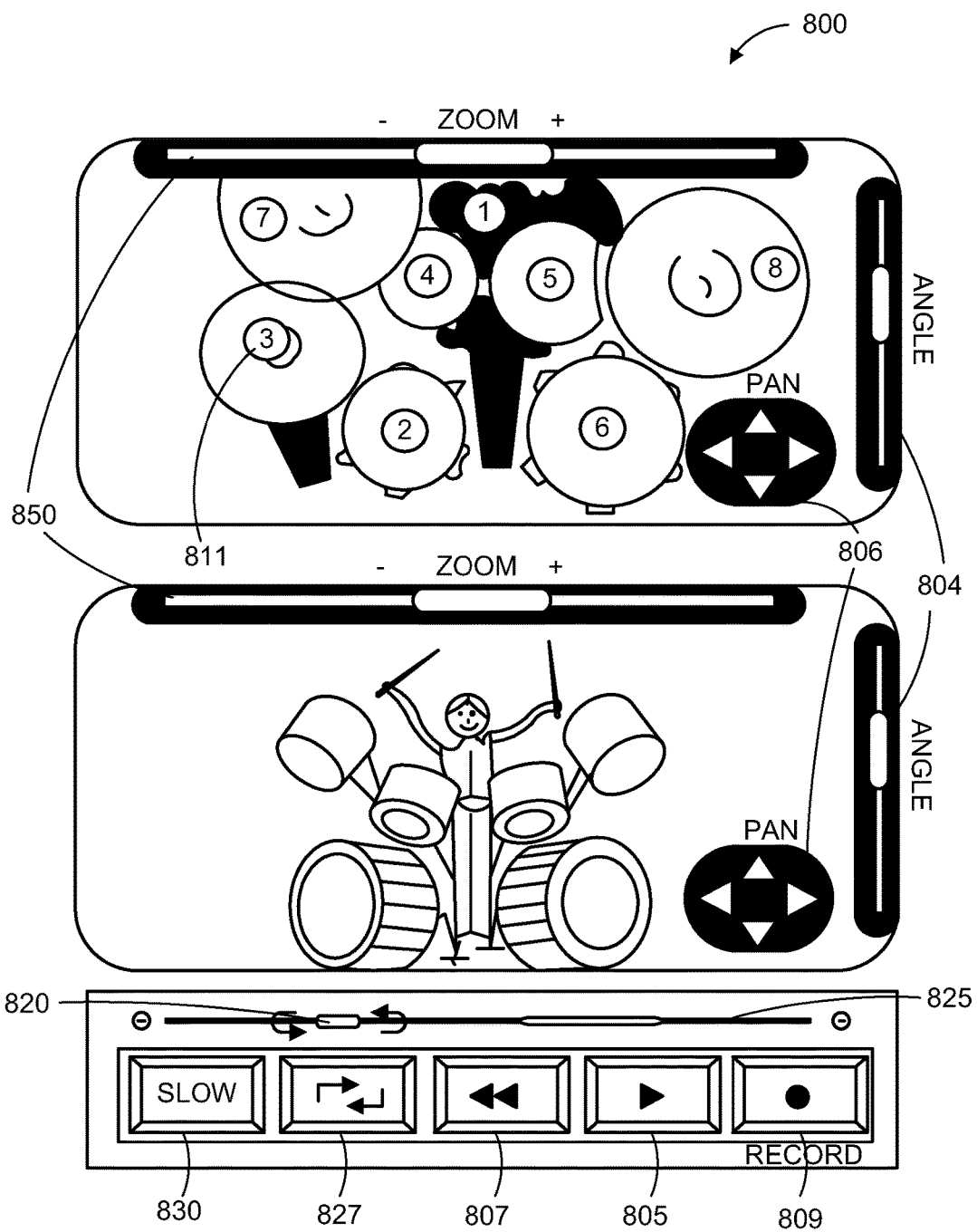
Figure 8C:
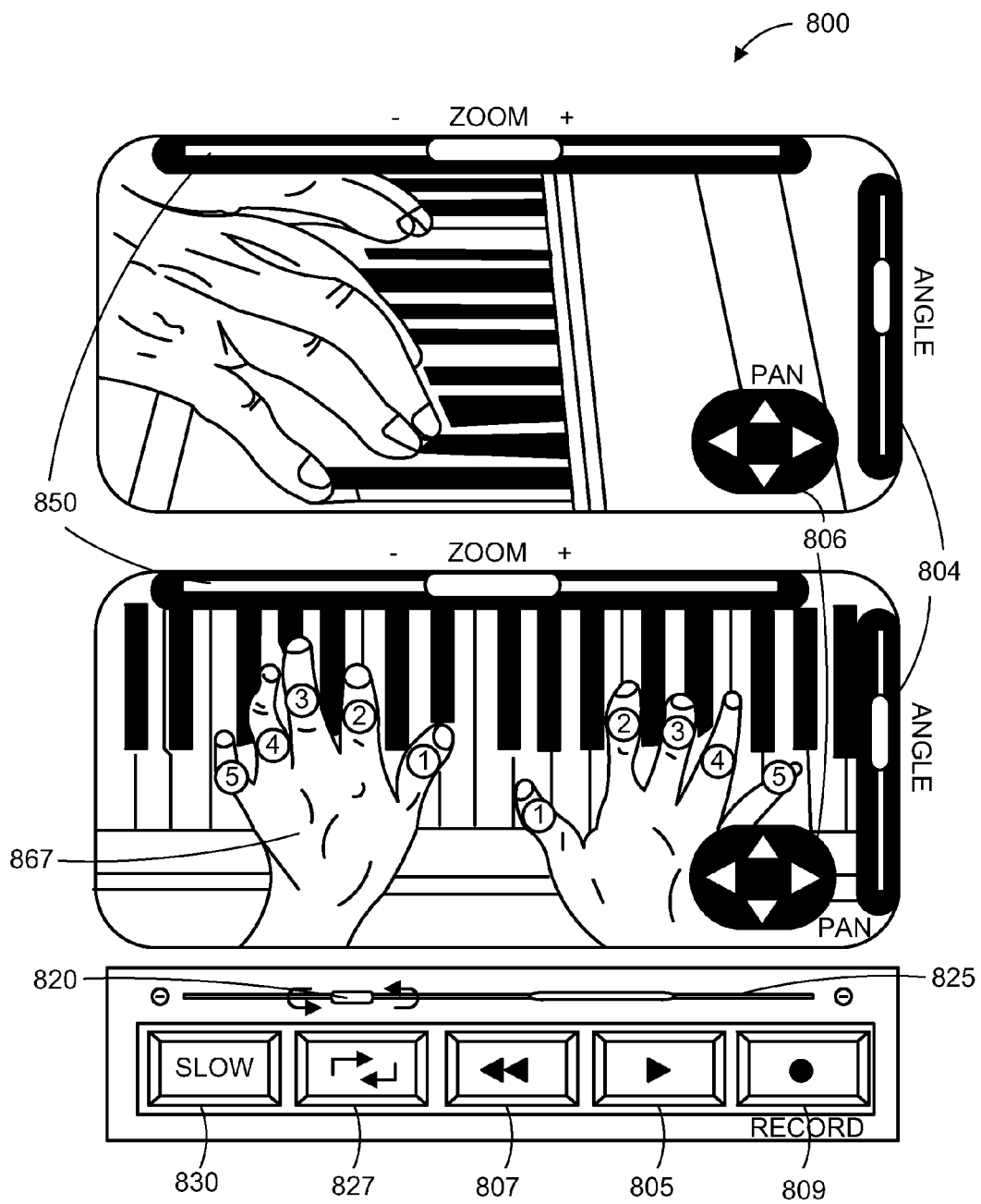
Figure 9:
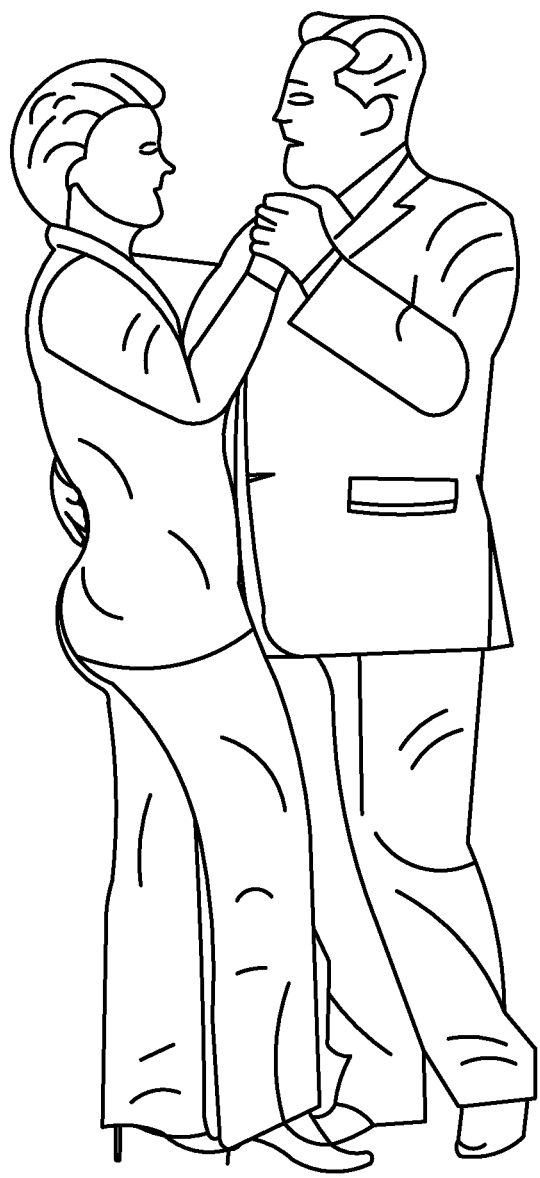
FIG. 9 illustrates a view of a couple dancing in an audio/video dancing demonstration, according to some embodiments.

As shown in FIG. 8A, the system 800 can include an instruction for any instrument, such as a guitar 802, and performance can be rated 872. The system 800 can include a video camera feature 861 that allows users to video themselves playing and superimpose or compare the user captured video to instructional video, and this feature 861 can also generate animations of the user, in some embodiments, using a motion-capture camera. Viewing angle adjustment 804, and a panning feature 806, can be a standard feature. In some embodiments, the system includes a narrative video/audio track through a narrative camera function 862 that gives the user information or instruction pertaining to the song. In some embodiments, the system includes a narrative teacher feature 863 to select from a variety of different narrative teachers that may include celebrities or popular artists. Moreover, the system may also have an accuracy feature 864 that automatically compares the audio/video from a user's performance to the instructional audio/video as a measure of the user's performance. The accuracy feature 864 can even serve as real time feature that notifies a user when a wrong note has been performed.

In some embodiments, the system includes an option that stops the user when he makes a mistake. In some embodiments, a tolerance option 865 can define the amount of tolerance that system will allow before stopping the user or indicating that a mistake has been made. And, in some embodiments, a multi-channel playback engine would let the user isolate and balance the audio level of the instructional instrument, the residual component track, the click track and any other instruments that may be isolated within the session.

In some embodiments, the system includes a click track 866 that helps the user keep time with the song. And, in some embodiments, the system 800 has an ability to provide a visual representation 867 of the suggested finger placement on instrument (i.e. #1 corresponds to thumb, #2 index figures, etc.). Moreover, the system can have an a notation enabling function 868 to provide the user with a notation screen as well as a video screen as an additional learning tool.

In some embodiments, the system has a note to note function 869, with the capability for users to advance note to note (set to a specific note value—⅛, 16th, quarter, half notes, etc.) at their own pace using a step advance mode. This would allow the learning of difficult musical passages by viewing the displays and hearing the notes in a non-real time "move-on when you're ready" method.

The system could also include a plurality of communities or social networks that include like-minded musicians or fans that can compare their skill level or exchange tips and lessons. As shown in FIG. 8A, a player may submit and share through a community share function 871, sharing a recorded performance 872 with the community and display the grading or skill level that has been achieved on a per song basis or an overall average ability rating. In some embodiments, the performance may be graded by the host or celebrity narrative chosen.

A user could have a video chat enabling feature 873 as an access to the online community to get direct feedback or tips from other users utilizing a video chat system. And, in some embodiments, a player may receive points for his performance and achieve a level of status in the community. The system could also be designed such that a player may exchange his points with other members or redeem his points for a variety of goods or services within the community or the company. In some embodiments, a player may be rewarded or graded on his appearance as it pertains to certain communities or predetermined genres.

In some embodiments, the system could include an instrument sound modeling option 874 that could synchronize a sound modeling processor or fx processor that matches the tone of the chosen song and automatically adjusts and changes with the unique tonality of each particular section of a song. And, in some embodiments, the system could also give the users feedback on the quality or their sound as it pertains to their chosen instrument or the selected song.

The systems taught herein can be in a device that can be configured for use with any musical instrument, for example, guitar, piano, drums, or a vocals. For example, such a device can be configured for use with a piano. The device can be substantially limited to the teachings herein and include a housing or container of any shape, such as a shape designed to sit on top of a piano in place of standard sheet music. A music display may be included as a liquid crystal display (LCD) screen or other type of display screen, and one or more transport buttons such as, for example, a play button, a stop button, and a pause button, can be provided. Such a device can comprise a number of controls, which may be configured as knobs or other similar state selectors known in the art. The device can include a first group of state selectors that relate to the "blender" function of the device and are structured to control the user's input, the music without the piano contribution, and the piano itself. A second group of state selectors can be provided to relate to the "master" function of the device and control volume, click track, and tempo. A third group of state selectors can be provided to control the on/off function of the device and may include indicator lights, light intensity control, and additional playback controls, for example. The device can also include one or more speakers, a sound module for electric pianos, and one or more ports for connecting the device to other units such as, for example, USB ports, phono jacks, and power jacks, or perhaps musical instruments, such as electric organs and guitars, for example. In some embodiments, a USB port may be used to connect the device to a computer system. In some embodiments, for example, the USB port allows for downloading of audio data to a larger computer memory storage location. In some embodiments, data may also be supplied to the device and and/or stored in removable data memory cards.

In some embodiments, the multi-track audio files are produced from original multi-track recordings, and these recordings may originate on analog tape, such as analog multi-track tape (e.g. 1 track to 24 tracks), a digital tape format (e.g. pulse code modulation, PCM, digital tape format). In some embodiments, an analog tape format is first transformed into a digital recording and a multi-track audio file is produced from the digital recording. In some embodiments, the original mix is recreated by taking all of the different tracks and making the mix to simulate the original recording. The mixing can be a manual process and can be done with an analog console, new digital console, or the mix can be done on a computer using basically any mixing technique known to one of skill. In some embodiments, older analog tapes need to be restored, such as by a baking procedure, before attempting a recreation.

It should be appreciated that the teachings can apply to any piece of music containing virtually any musical instrument including, but not limited to string instruments, brass instruments, woodwind instruments, percussion instruments, and vocals. In some embodiments, pieces of music having variable tempos, rhythms, and beats can be learned with more ease due to the manually created and variable metronome function, as well as the manually created audio files having superior isolated instrument audio track quality. In some embodiments, songs are complicated and have changing or otherwise un-isolatable beats that would be more difficult to learn without the teachings provided herein.

Figure 10:
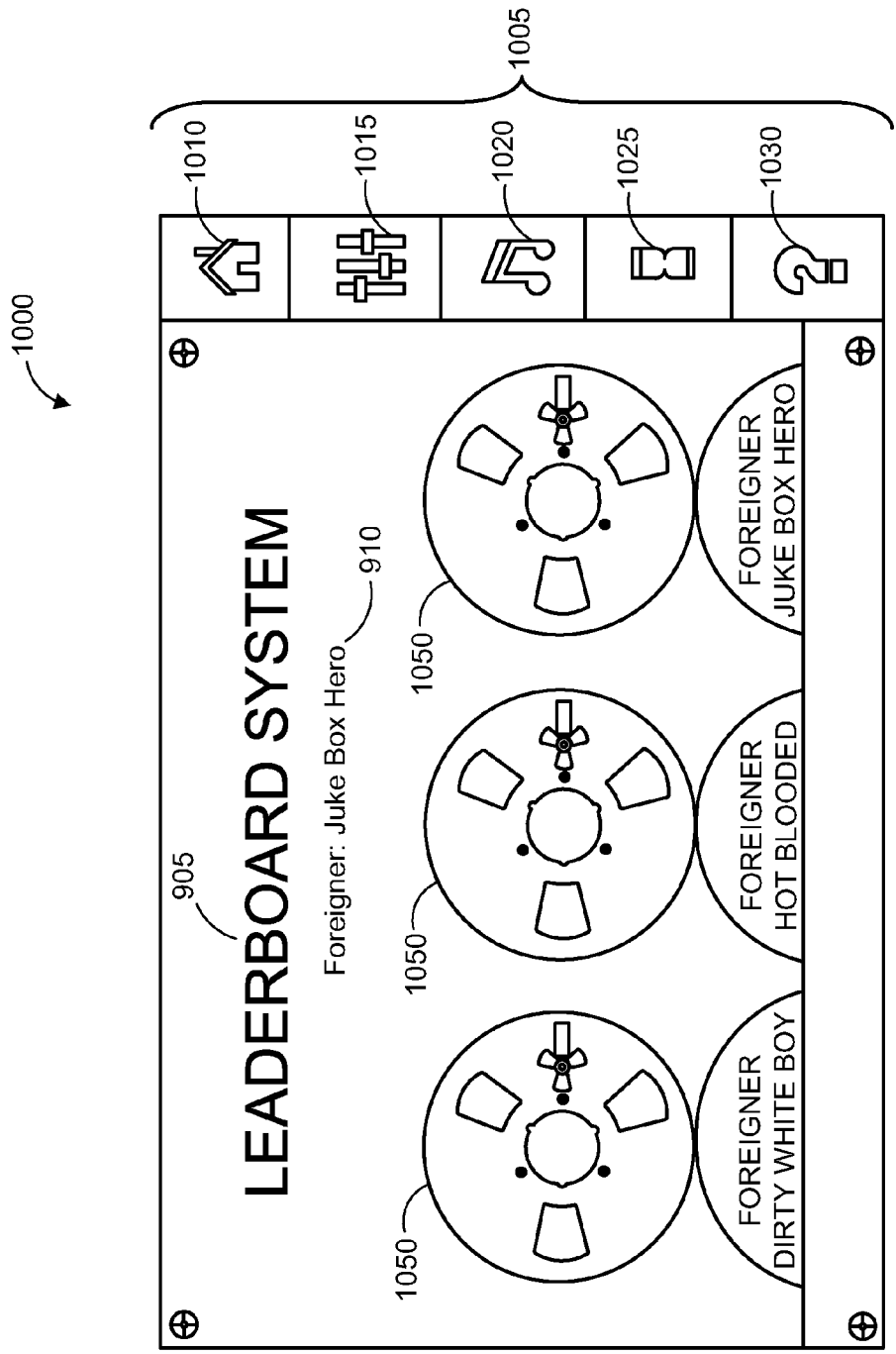
FIG. 10 illustrates a display for a graphical user interface offering selections within a track list of a multi-track audio recording set designed for use with the system, according to some embodiments.

The user will often have a set of multi-track audio files to learn on the system. FIG. 10 illustrates a display for a graphical user interface offering selections within a track list of a multi-track audio recording set designed for use with the system, according to some embodiments. Track List Display 1000 shows the selections in a multi-track audio recording set or track list 1050. The user chooses an audio file and proceeds to the menu bar 1005 to select a function from home page 1010, volume/fader page 1015, music transcription and tablature 1020, cycling page 1025, and help page 1030.

Figure 11:
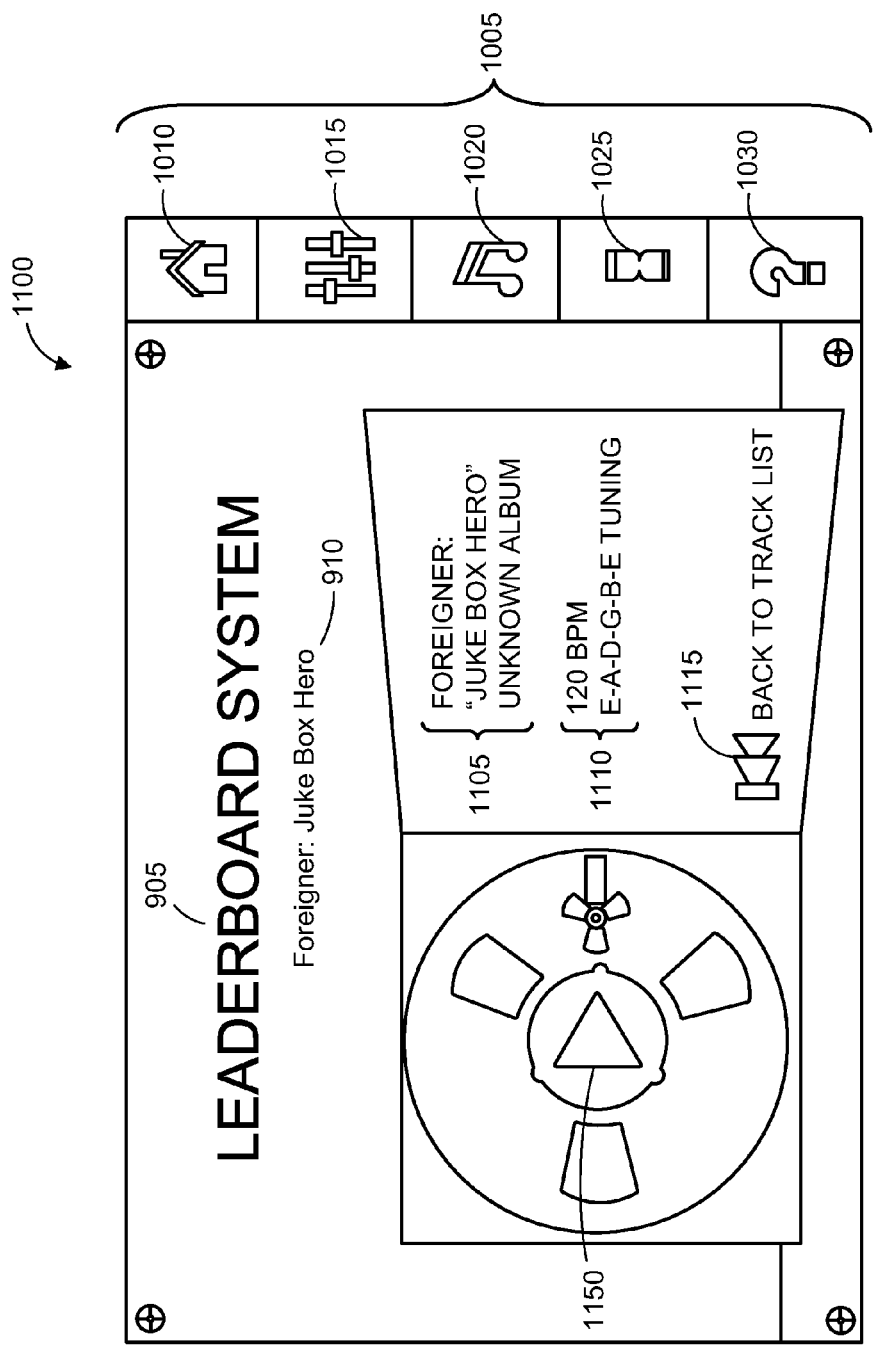
FIG. 11 illustrates a display for a graphical user interface offering information on the track list selection in the system, according to some embodiments.

The user can access an information page regarding the piece of music selected from the track list, such as the band, song title, album, tempo, and tuning. FIG. 11 illustrates a display for a graphical user interface offering information on the track list selection in the system, according to some embodiments. Information Display 1100 provides the user with the selection bibliographic information 1105 containing information on the band, song title, and album, and selection technical information 1110 provides information on the tempo and tuning for the selection. Play function 1150 allows the user to begin learning the selection.

Figure 12:
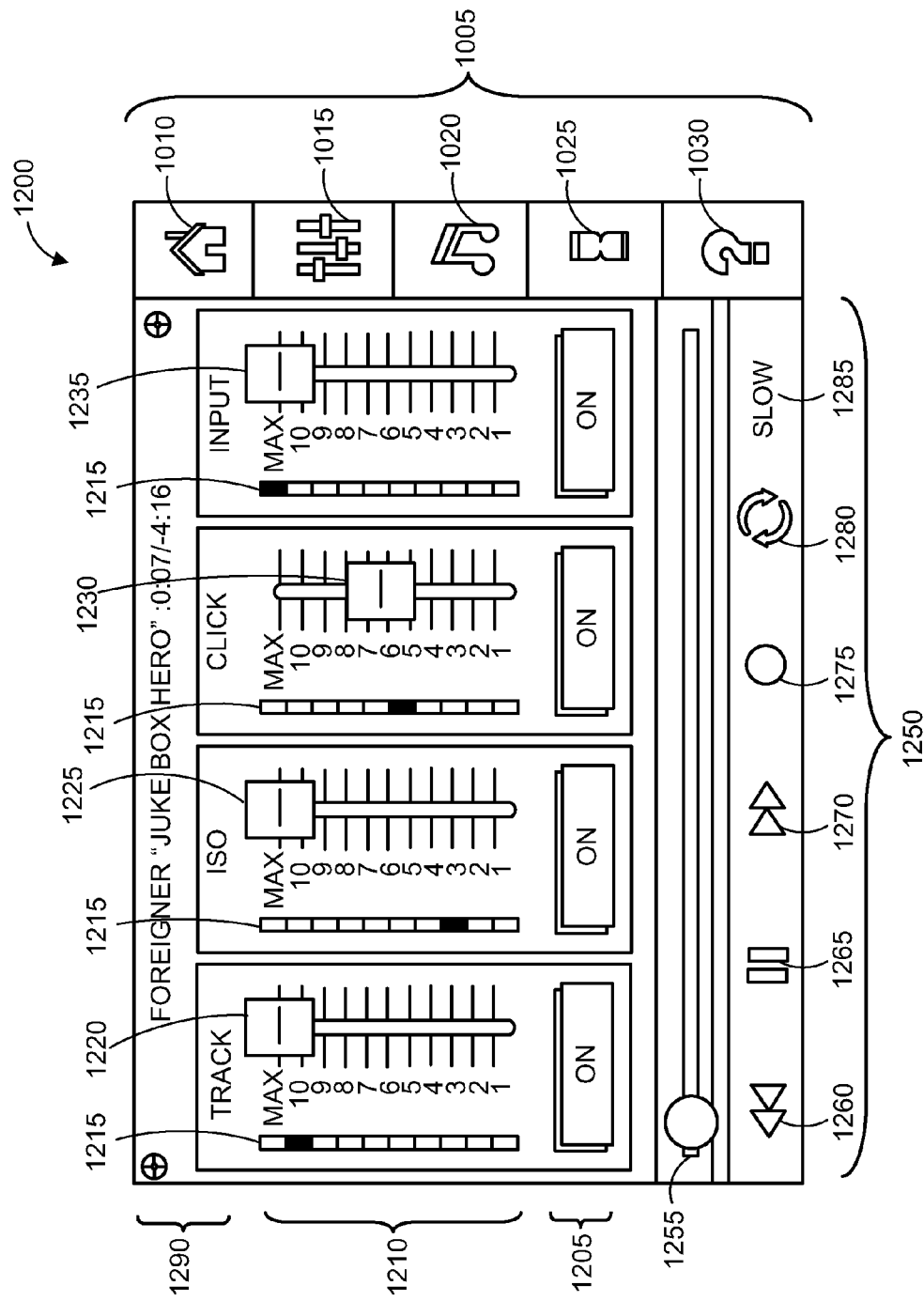
FIG. 12 illustrates a display for a graphical user interface offering state selections for track faders, volume fader control, and transport selections, in which all tracks are selected on a multi-track audio recording designed for use with the system, according to some embodiments.

The volume/fader page 1015 has several functions that enables a user to effectively learn and mix music. FIGS. 12-15 show various functionalities of the volume/fader page 1015. FIG. 12 illustrates a display for a graphical user interface offering state selections for track faders, volume fader control, and transport selections, in which all tracks are selected on a multi-track audio recording designed for use with the system, according to some embodiments.

Volume/fader display 1200 provides the functionality of track on/off (i.e. mute) control 1205 for each track file. The functionality of the volume/fader controls 1210 is provided by the volume indicators 1215 to indicate sound pressure level and the faders 1220,1225,1230,1235 to adjust volume in the manner of a potentiometer or digitometer, for example. Transport section 1250 provides a time bar 1255 to indicate a position in the piece of music and can also contain markings, such as colors, to indicate the intro, pre-chorus, verse, solo, bridge, outro, chorus, and middle section, for example.

The transport section 1250 also provides several state selection functions: a rewind 1260, pause 1265, fast forward 1270, stop 1275 as normal transport control state settings; cycle 1280 to allow a user to repeat a desired section of the piece of music; and slow 1285 to allow the user to slow the song by a predetermined amount and serve the user as a function commonly known as a speed control, tempo adjustment, or tempo control. In some embodiments, the slow 1285 function can be a default setting (e.g. to slow by some percentage, such as 50%, 75%, or the like) and, in some embodiments, the user can define a desired speed setting. As such, in some embodiments, the playback controls can be to those found on about any tape deck or video cassette recorder, such as "previous", "next", "play", "pause", and "record". And, in some embodiments the playback controls include a "cycling" function to allow the user to cycle a particular section or measure over and over again until the user is satisfied in the learning experience.

In some embodiments, the transport section 1250 can be operable within a single functioning section of a system, such as a single page of a software application. In some embodiments, the transport section 1250 can be operable within a plurality of functioning sections of a system, such as in a plurality of pages of a software application, such that the transporting can occur quickly at the choosing of the user without having to move from one section of the system to another section of the system. A music label and timer 1290 is also provided as a reference data point for the user.

In some embodiments, the mixing of audio can be handled on an individual sample per track basis. Each track can be represented individually, having to keep track of its own samples, duration, levels and peaks, gain, and time. Once each track can be initialized and loaded out of its file, and then handed off to a subsystem to decode the compression and make samples. An example of a subsystem can include, for example Apple's COREAUDIO subsystem. After the samples are made available, the track can then be assigned to a master track handler object referred to as the mixer object, and saved recorded audio sessions can be loaded at this time as well. The mixer object primes the subsystem and initializes the output. In these embodiments, the touching of the "play" button can be used to start the mixer in its function of combining the audio within buffers, where the mixer calls out to each track asking it for its next frame of audio. The audio frames can be added to the playback buffer and enqueued, and all timing on the audio can then be synced to allow the audio to be synced to a subnote level to reduce or eliminate creep within tracks.

In some embodiments, the audio recording can be handled by a manner similar to the individual audio playback, where extensions to record to a file and store its place within a song can be used. Once the user clicks a record function, a recorder object can be built, and the object can then start a file and initialize the recording. Once initialized, the recording class can store the current play time within the song to the measure and begin. The user can tell the device to stop recording, and the object can then mark that time and store the duration of the data stream in a settings file. The audio data is then flushed to the file, a track handler object can then be created with its start time and duration set, and the mixer can be updated to allow future playback of the recorded audio along with the rest of the prerecorded audio.

Figure 13:
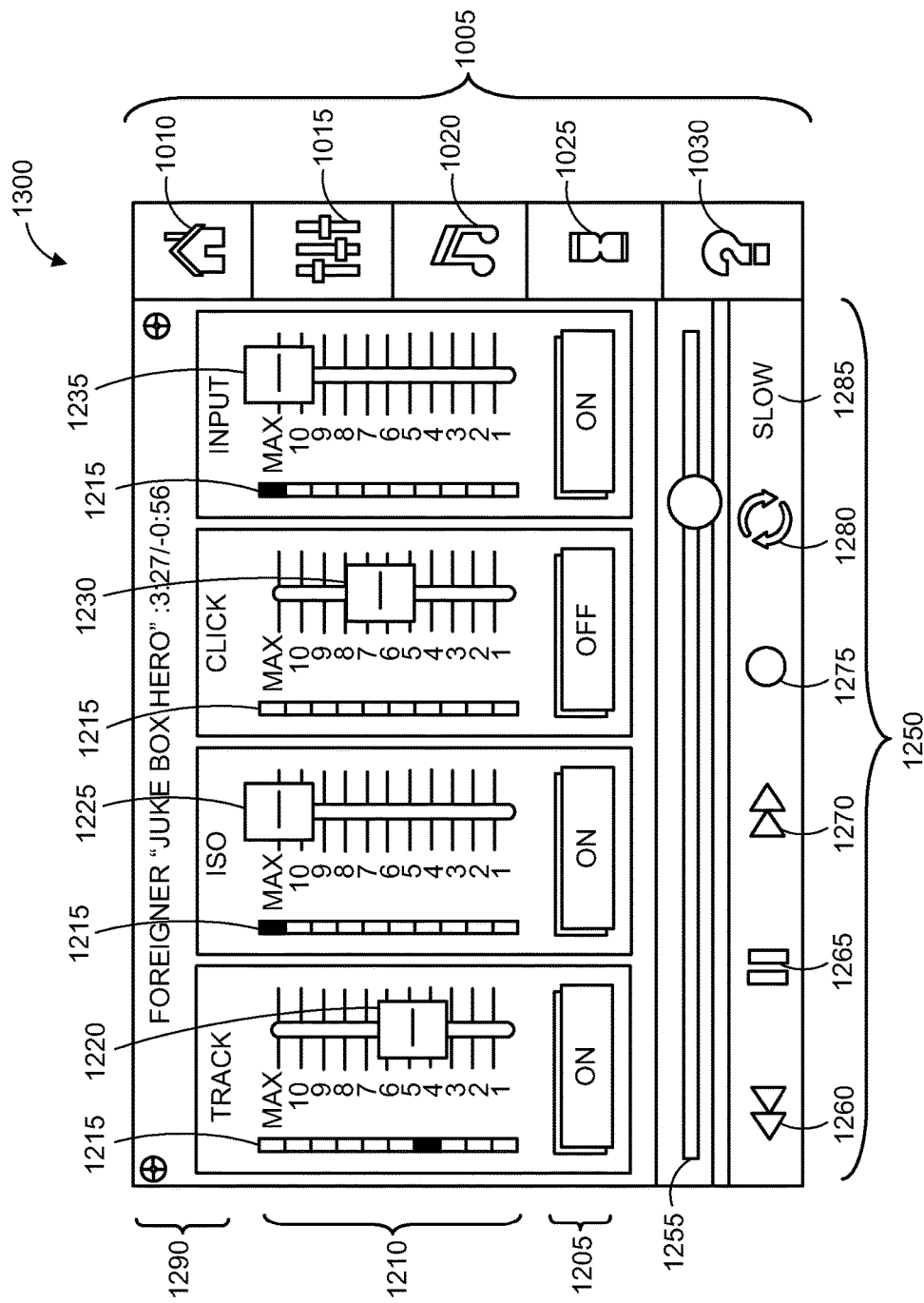
FIG. 13 illustrates a display for a graphical user interface offering state selections for track faders, volume fader control, and transport selections, in which all tracks but the click track are selected on a multi-track audio recording designed for use with the system, according to some embodiments.
Figure 14:
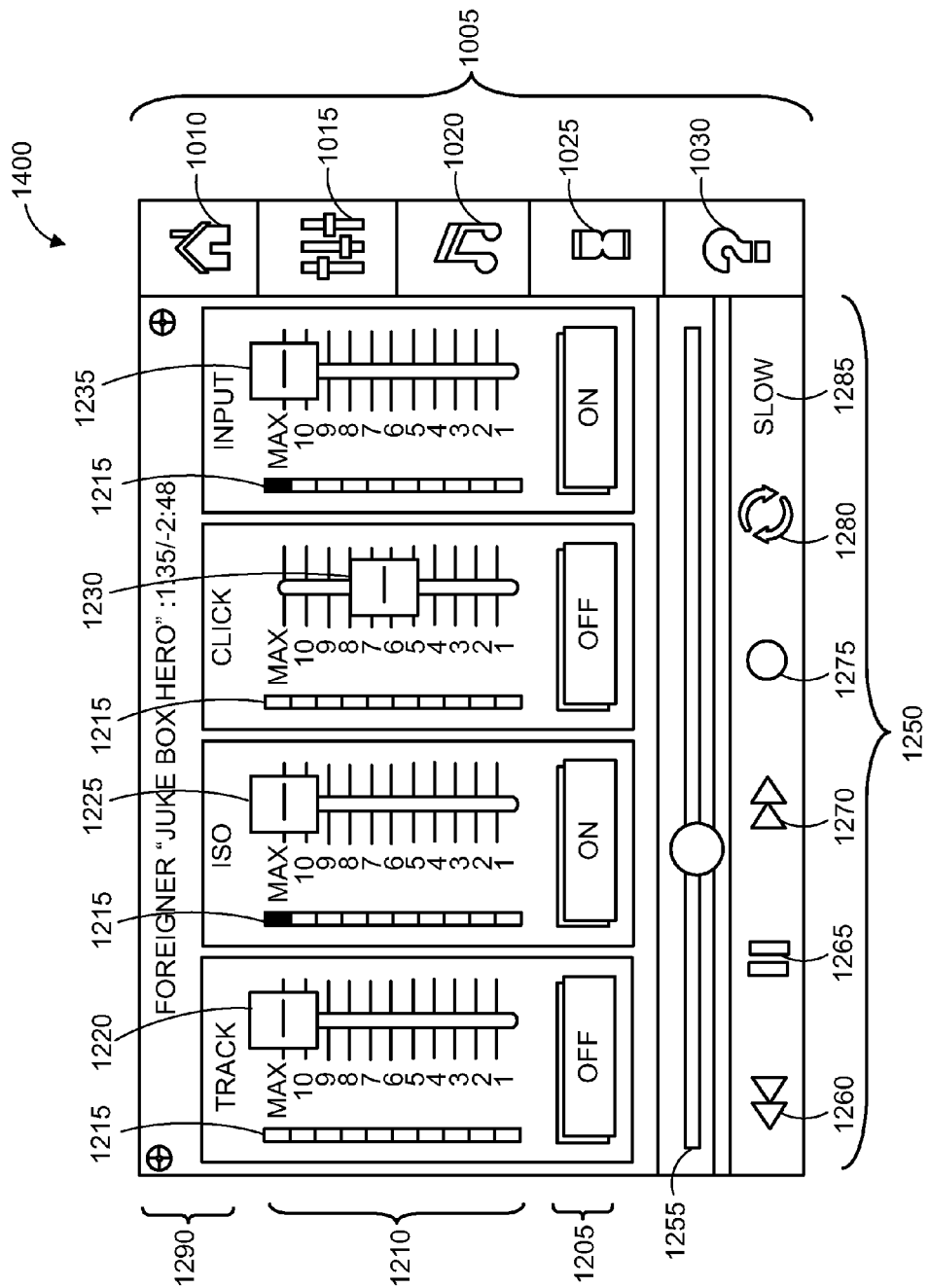
FIG. 14 illustrates a display for a graphical user interface offering state selections for track faders, volume fader control, and transport selections, in which only the isolated instrument audio track and the emulated instrument audio track are selected on a multi-track audio recording designed for use with the system, according to some embodiments.
Figure 15:
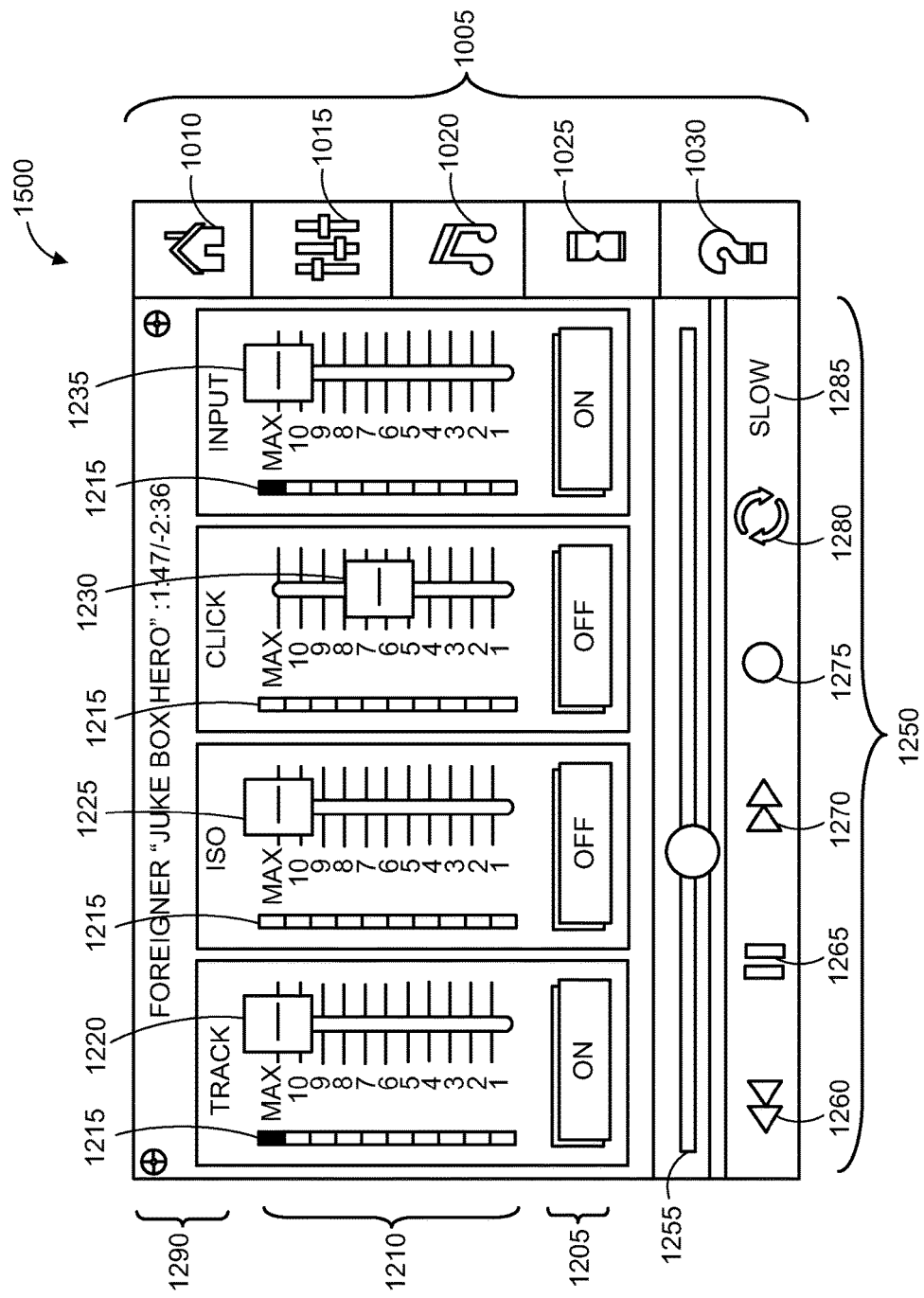
FIG. 15 illustrates a display for a graphical user interface offering state selections for track faders, volume fader control, and transport selections, in which only the residual track and the emulated instrument audio track are selected on a multi-track audio recording designed for use with the system, according to some embodiments.

FIG. 13 illustrates a display for a graphical user interface offering state selections for track faders, volume fader control, and transport selections, in which all tracks but the click track are selected on a multi-track audio recording designed for use with the system, according to some embodiments. FIG. 14 illustrates a display for a graphical user interface offering state selections for track faders, volume fader control, and transport selections, in which only the isolated instrument audio track and the emulated instrument audio track might be selected on a multi-track audio recording designed for use with the system, according to some embodiments. FIG. 15 illustrates a display for a graphical user interface offering state selections for track faders, volume fader control, and transport selections, in which only the residual track and the emulated instrument audio track are selected on a multi-track audio recording designed for use with the system, according to some embodiments.

Figure 16:
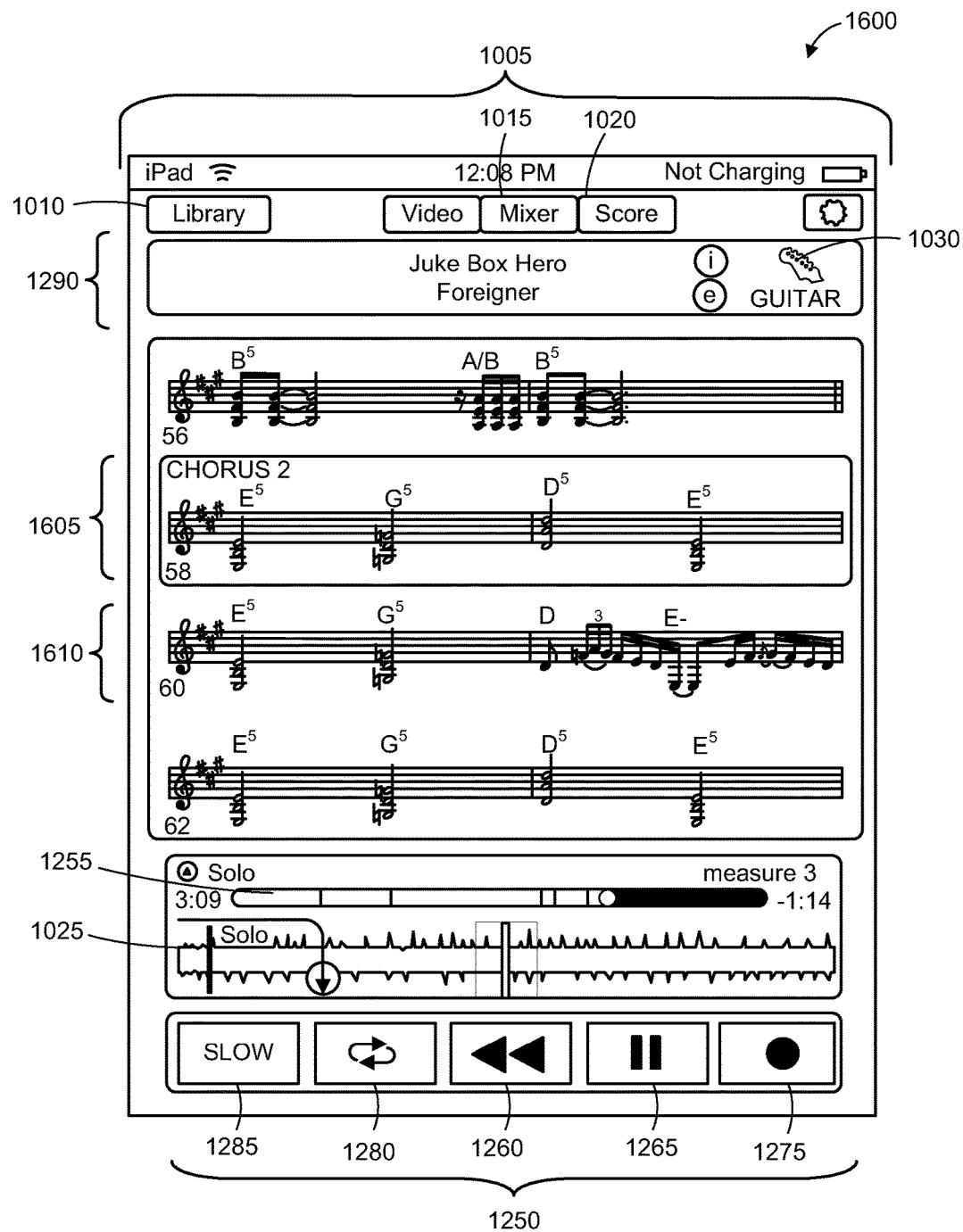
FIG. 16 illustrates a display for a graphical user interface offering musical transcription and tablature audio data, in which only the current section of music is shown for a multi-track audio recording designed for use with the system, according to some embodiments.

A user can benefit by reading music while playing. FIG. 16 illustrates a display for a graphical user interface offering musical transcription and tablature audio data, in which only the current section of music is shown for a multi-track audio recording designed for use with the system, according to some embodiments. Music transcription and tablature page 1600 provides the current transcription and tablature 1605 in a bright display and the upcoming transcription and tablature 1610 in a dim display, where the current represents the music currently playing, and the upcoming represents the music immediately following the music currently playing. Each measure, for example, can have a timecode and duration that represents where in the song's timeline that measure is played. Using that information along with the song's current playback position, the tablature can be synchronized along with any playing audio. Each measure can be designed to display notes or chords and which strings or frets to use. In some embodiments, a user may desire a standard music scale for display. The musical transcription and tablature can also be a dynamic, scrolling display, in some embodiments.

Figure 17:
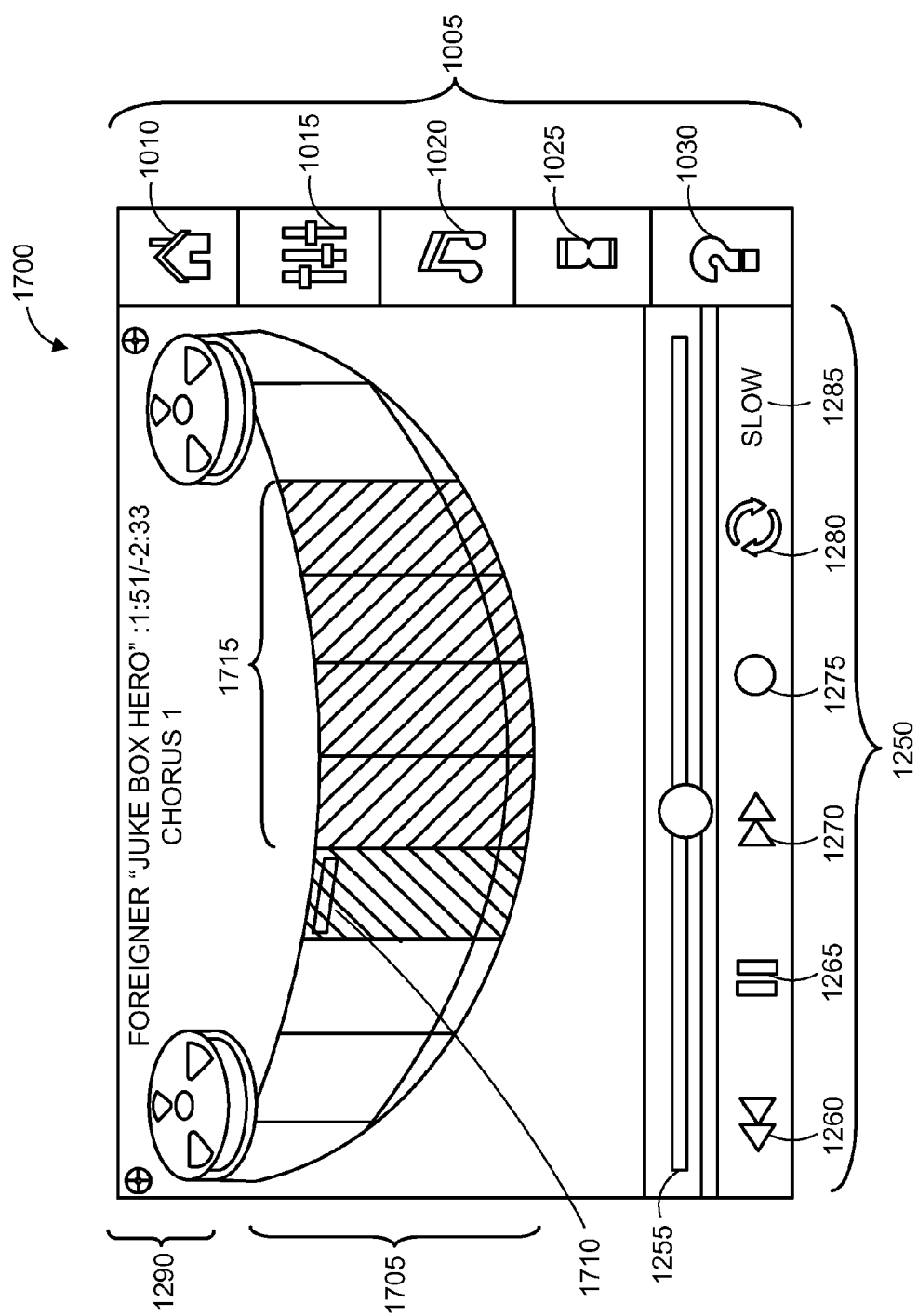
FIG. 17 illustrates a display for a graphical user interface offering selection of a section of a piece of music by bar or set of bars in a multi-track audio recording designed for use with the system, according to some embodiments.

A user can also benefit from a function that allows for an isolation of a particular section of a piece of music in an audiovisual work, as well as a cycling of that section to enable the user to focus and practice on that section of the music. FIG. 17 illustrates a display for a graphical user interface offering selection of a section of a piece of music by bar or set of bars in a multi-track audio recording designed for use with the system, according to some embodiments. Cycling page 1700 displays section 1705 of the digital audio file, and bar 1710 or bars 1715, for example, can be isolated and selected for playback by the user. The user can then use the methods taught herein to focus and learn the particular section 1705, bar 1710, or bars 1715, for example. As such, in some embodiments, the playback can also be controlled through a "reel screen", where every measure is segmented. In such embodiments, any audio the user has recorded can also be displayed on the screen in the measures in which it exists to allow the user to quickly find that audio and listen to their play of that session as graphed over the original audio data. In some embodiments, a "tape" can be graphically displayed to show the markings of the playback tracking bar. And, consistent with the teachings herein, a video display can complement the system, in some embodiments.

Figure 18:
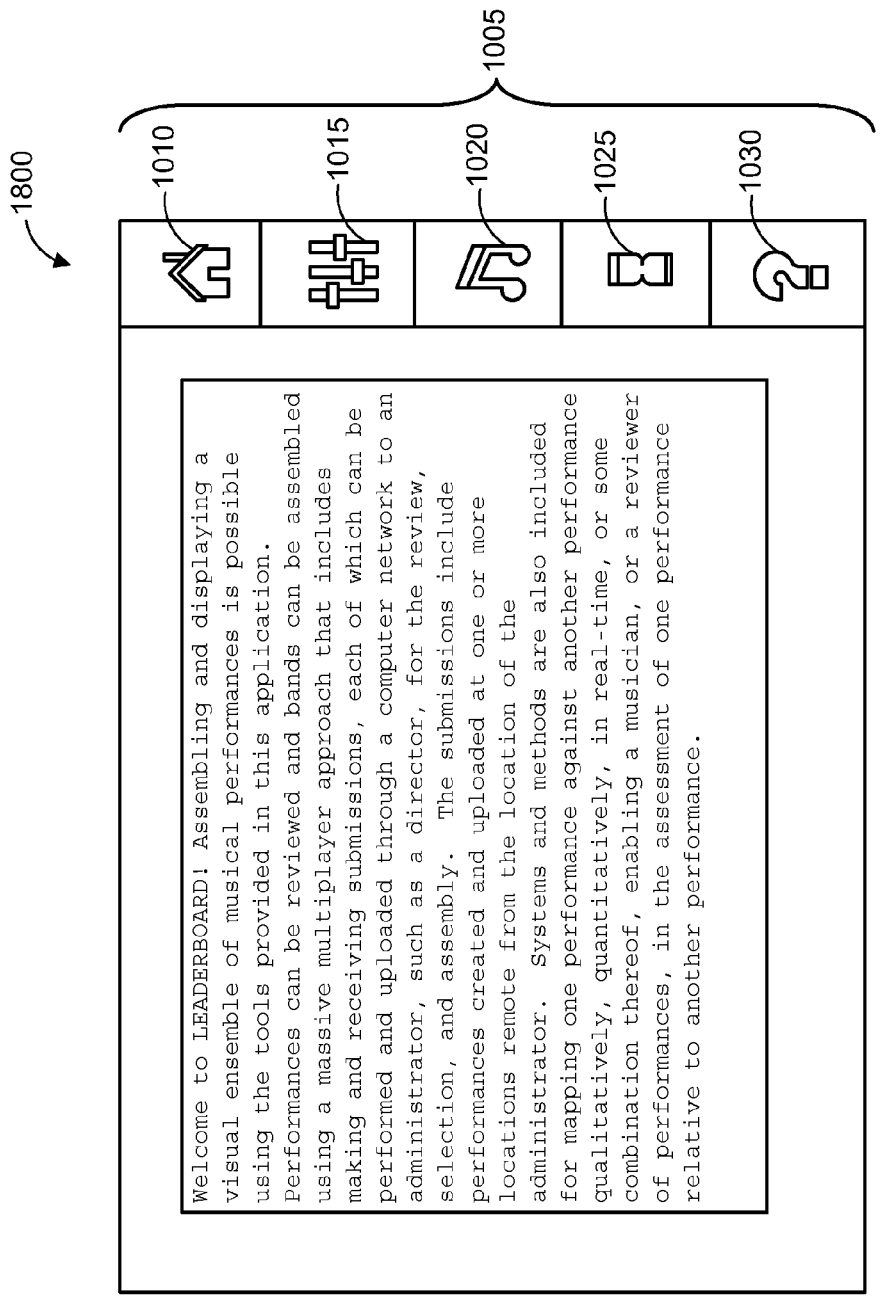
FIG. 18 illustrates a display for a graphical user interface offering a help page for the system, according to some embodiments.

The user may have questions, and as such, a help page is always useful. FIG. 18 illustrates a display for a graphical user interface offering a help page for the system, according to some embodiments. Help page 1800 is a simple depiction of information that a user can obtain from the system.

Figure 19:
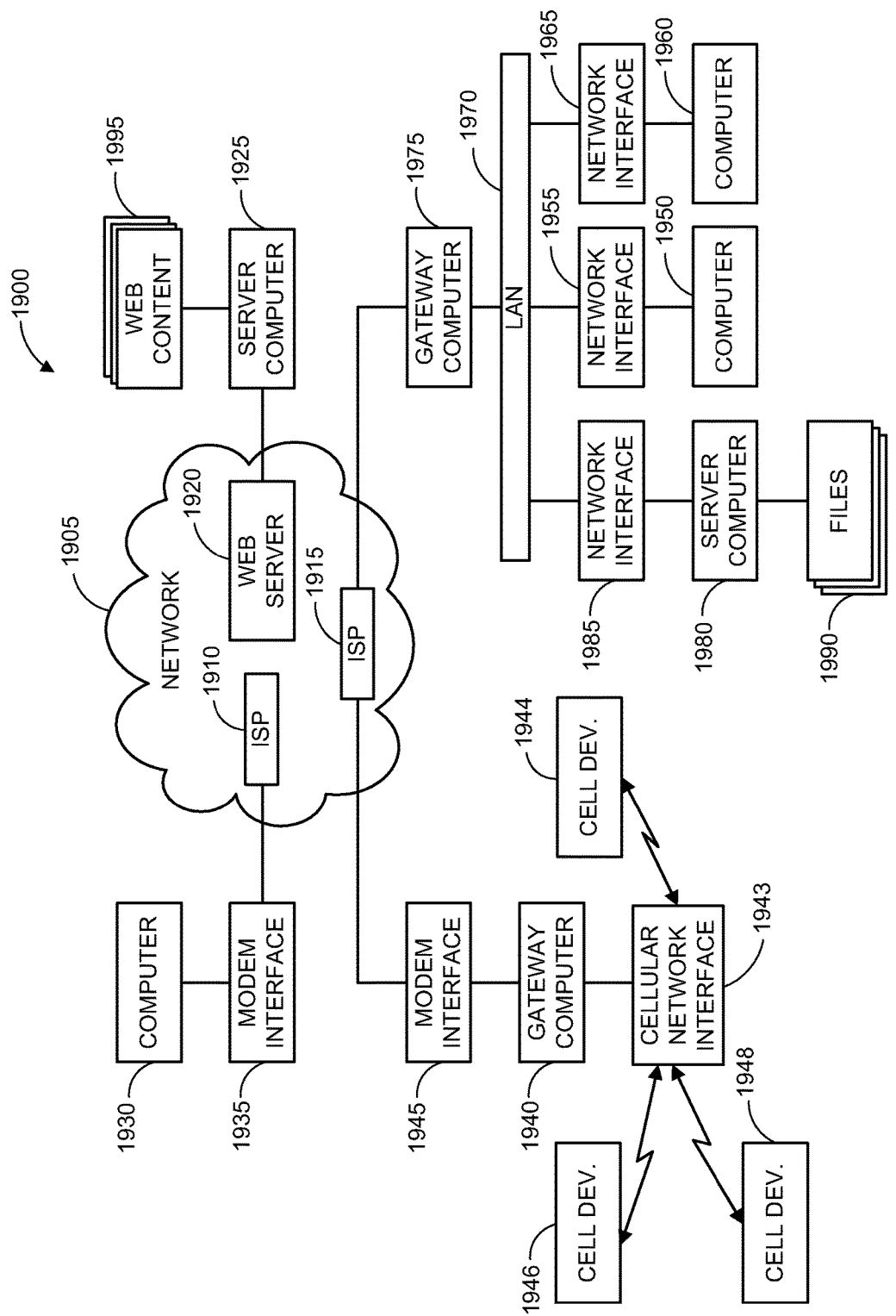
FIG. 19 shows how a network may be used for the system, according to some embodiments.

FIG. 19 shows how a network may be used for the system, according to some embodiments. FIG. 19 shows several computer systems coupled together through a network 1905, such as the internet, along with a cellular network and related cellular devices. The term "internet" as used herein refers to a network of networks which uses certain protocols, such as the TCP/IP protocol, and possibly other protocols such as the hypertext transfer protocol (HTTP) for hypertext markup language (HTML) documents that make up the world wide web (web). The physical connections of the internet and the protocols and communication procedures of the internet are well known to those of skill in the art.

Access to the internet 1905 is typically provided by internet service providers (ISP), such as the ISPs 1910 and 1915. Users on client systems, such as client computer systems 1930, 1950, and 1960 obtain access to the internet through the internet service providers, such as ISPs 1910 and 1915. Access to the internet allows users of the client computer systems to exchange information, receive and send e-mails, and view documents, such as documents which have been prepared in the HTML format. These documents are often provided by web servers, such as web server 1920 which is considered to be "on" the internet. Often these web servers are provided by the ISPs, such as ISP 1910, although a computer system can be set up and connected to the internet without that system also being an ISP.

The web server 1920 is typically at least one computer system which operates as a server computer system and is configured to operate with the protocols of the world wide web and is coupled to the internet. Optionally, the web server 1920 can be part of an ISP which provides access to the internet for client systems. The web server 1920 is shown coupled to the server computer system 1925 which itself is coupled to web content 1995, which can be considered a form of a media database. While two computer systems 1920 and 1925 are shown in FIG. 19, the web server system 1920 and the server computer system 1925 can be one computer system having different software components providing the web server functionality and the server functionality provided by the server computer system 1925 which will be described further below.

Cellular network interface 1943 provides an interface between a cellular network and corresponding cellular devices 1944, 1946 and 1948 on one side, and network 1905 on the other side. Thus cellular devices 1944, 1946 and 1948, which may be personal devices including cellular telephones, two-way pagers, personal digital assistants or other similar devices, may connect with network 1905 and exchange information such as email, content, or HTTP-formatted data, for example. Cellular network interface 1943 is coupled to computer 1940, which communicates with network 1905 through modem interface 1945. Computer 1940 may be a personal computer, server computer or the like, and serves as a gateway. Thus, computer 1940 may be similar to client computers 1950 and 1960 or to gateway computer 1975, for example. Software or content may then be uploaded or downloaded through the connection provided by interface 1943, computer 1940 and modem 1945.

Client computer systems 1930, 1950, and 1960 can each, with the appropriate web browsing software, view HTML pages provided by the web server 1920. The ISP 1910 provides internet connectivity to the client computer system 1930 through the modem interface 1935 which can be considered part of the client computer system 1930. The client computer system can be a personal computer system, a network computer, a web TV system, or other such computer system.

Similarly, the ISP 1915 provides internet connectivity for client systems 1950 and 1960, although as shown in FIG. 19, the connections are not the same as for more directly connected computer systems. Client computer systems 1950 and 1960 are part of a LAN coupled through a gateway computer 1975. While FIG. 19 shows the interfaces 1935 and 1945 as generically as a "modem," each of these interfaces can be an analog modem, isdn modem, cable modem, satellite transmission interface (e.g. "direct PC"), or other interfaces for coupling a computer system to other computer systems.

Client computer systems 1950 and 1960 are coupled to a LAN 1970 through network interfaces 1955 and 1965, which can be ethernet network or other network interfaces. The LAN 1970 is also coupled to a gateway computer system 1975 which can provide firewall and other internet related services for the local area network. This gateway computer system 1975 is coupled to the ISP 1915 to provide internet connectivity to the client computer systems 1950 and 1960. The gateway computer system 1975 can be a conventional server computer system. Also, the web server system 1920 can be a conventional server computer system. Alternatively, a server computer system 1980 can be directly coupled to the LAN 1970 through a network interface 1985 to provide files 1990 and other services to the clients 1950, 1960, without the need to connect to the internet through the gateway system 1975.

Through the use of such a network, for example, the system can also provide an element of social networking, and also a gaming platform, whereby users can contact other users having similar subject-profiles and compete with one another qualitative and/or quantitatively, using subject scores or actual numerical scores. In some embodiments, the system can include a messaging module operable to deliver notifications via email, SMS, and other mediums. In some embodiments, the system is accessible through a portable, single unit device and, in some embodiments, the input device, the graphical user interface, or both, is provided through a portable, single unit device. In some embodiments, the portable, single unit device is a hand-held device. In some embodiments, the systems and methods can operate from the server to a user, from the user to a server, from a user to a user, from a user to a plurality of users, in an MMO environment, from a user to a server to a user, from a server to a user (or plurality of users) and a teacher (or plurality of teachers), or a server to a plurality of users and a conductor, for example. The teachers or conductors can be either real-time teachers or conductors, simulated teachers or conductors, or recorded teachers or conductors, in some embodiments. The network can provide text and/or audio for real-time messaging, posting of messages, posting of instructional, posting of news or other items of a related interest to the users, and the like.

The systems and methods taught herein include the use of the computer system within any larger network system or method. It should also be appreciated that a network can include traditional network media. For example, television cable, optical fiber, satellite, and the like, in which such digital information can be transmitted to users. Such use of traditional media will facilitate use of the teachings provided herein with traditional media entertainment channels, such as reality TV, amateur talent shows and competitions, and the like.

The following examples are illustrative of the uses of the present teachings. It should be appreciated that the examples are for purposes of illustration and are not to be construed as otherwise limiting to the teachings.

Example 1. Selecting and Assembling a Visual Ensemble of Performances Performed and Uploaded to the Computer Network to Create a Band Performance Any genre of music performances can be assembled using the teachings provided herein. Audiovisual performances can be submitted to a computer network and assembled to create a ensemble, or band performance. This can be a powerful tool to assemble performances that were uploaded as submissions from remote locations, perhaps even worldwide, over a computer network. The submissions are received and reviewed over the network, as well as selected and assembled for display as the visual ensemble. For example, a church can request auditions online for a new church band, seeking out particular musicians, such as vocalists. And, the auditions can be performed at remote locations, such that the entire process can be done comfortably, as it does not require scheduling, meeting, and attending numerous auditions at a particular location. The church can receive submissions, review submissions, select and assemble a set of performances, and create and display a visual ensemble of the musical performances over a computer network to select members of the new church band.

The Audition System

The audition system can include a computer network having a director, as well as a processor operably connected to a memory that includes a database on a non-transitory computer readable medium. The computer network will audition a plurality of musicians, each at a remote location from the director and in an operable communication with the computer network.

The church can select a particular musical work for the audition, the work containing individual tracks that isolate musicians playing instruments, vocal or otherwise, that exemplify the type of content and talent desired for the church band. The director may select the musical work to test the skills of the musicians, as opposed to merely selecting a song that the director intends the band to play. Any number of musicians, including singers, can respond to a request for auditions, and they can download the musical work to emulate the musical work, perhaps using audible and visual click tracks, voice over guide tracks, or a synchronized video having any type of notes, lyrics, song maps or any other information to learn and practice the musical work until proficient for recording and submission. The methodology of learning, recording, and submitting could also include a plurality of videos showing human or virtual instruction, such as animation of the movement of body parts for playing a particular instrument. This could also include the position of an implement, such as sticks, mallets, pedals with fx or controller values, hand held bows for violin, cello, viola, etc., or any other implement that is physical. The instruction can include any additional electronics for instruction known to one of skill, such as artificial intelligence or virtual presence, including a hologram display or equivalent.

Receiving the Musical Work and Recording the Submission

The musical work can be presented to the plurality of musicians as an offering of a series of multi-track digital audio files; each of the series sharing the entirety of the musical work, yet highlighting a select instrument performance within the musical work. The musical work can have, for example, (i) T reference instrument performances within the musical work, wherein $T=\Sigma ♪_i$; and, $♪_i = ♪_1, ♪_2, ♪_3, \ldots$ or $♪_T$; (ii) an isolated audio track of the select reference performance, $♪_i$, the isolated instrument audio track having a pitch and a timing; (iii) a residual audio track representing the multi-track digital audio file having the select reference performance removed; and, (iv) instructions for execution by the processor of the computer network.

The plurality of musicians auditioning should be instructed to each request one of the series of multi-track digital audio files having the isolated instrument audio track that is to be replaced with their own submission, $♪_{i,r}$, in the audition. They should be asked to record the submission at their location, remote from the director, on a non-transitory computer readable medium for uploading to the computer network. They should also be asked to follow the frequency and the timing of the isolated audio track as a guide, since the evaluation will involve comparing their performance to the reference performance. They can also be instructed to use the residual audio track as an accompaniment to hone their skills. Once they're satisfied with their performance, they can upload a submission of their performance to the database.

To record the submission, the musician can merely push a "video record" button on the system and perform. Once completed, the musician can be prompted to delete the residual background music and submit only the performance to reduce file size, since the common denominator between all submissions for a particular instrument will be the same residual background following the same frequency and timing to serve as a timing interface between all performances. The musician can request a real-time professional feedback as they perform or after the recording. For example, the system may include an "expert analysis" module which provides a performance rating in real-time, and can also provide a more detailed report after the recording has stopped. The expert analysis module can offer detailed information about the performance at any point in time within a performance, in detail, with recommendations through a professional live teacher or delayed after review by a professional live teacher.

The Selection Process

The best musicians for each particular instrument can be chosen using any one, or any combination, of methods. For example, the best musicians can be chosen by the director, by votes from professional reviewers, by votes from peers, by votes from the public, or by votes from anyone having access to a vote through the computer network. Any method of gaining access to a vote can be used. Access to a vote can be given, for example, by lottery, by demographic, by selection due to profession, by vote, by sponsorship, or by paying to place a vote. The best musician may also be chosen by the expert analysis module. The expert analysis module can be adjusted to a default setting that evaluates the musical work using a default frequency and timing parameter, or it can be set to a preferential setting for a particular audition, either for a complete musical work, for sections of the work, or vary in settings by section. Some sections may allow for more variability in performance of frequency and timing because the sections are "loose". Other sections may require less variability in performance of frequency and timing because the sections are relatively "tight". The manner in which a performance of frequency and timing conforms to the musical work will determine whether the performance is "in the pocket." And, the allowable variation in performance from the musical work defines the size of the pocket.

The next step is the selecting of a set of performances, $\Sigma$ $\mathcal{J}_{ir} \leq \mathcal{J}_{1r}, \mathcal{J}_{2r}, \mathcal{J}_{3r}, \ldots, +\mathcal{J}_{Tr}$, from the plurality of submissions for display through the network; and, displaying each of the set of performances over the network alone or in combination with other submissions as a visual ensemble. Each of the top musicians selected for the ensemble can be presented as a set for display, or an even larger set that includes runners-up, or perhaps even all submission, can be configured for selection and display alternatively. A listener of the ensemble merely needs to activate the start button and the ensemble will play. This allows a listener, or reviewer, to listen to any one, or any combination of performances, including the set of performances selected by the director, votes, etc. In this manner, the director, listener, choir master, etc., can also use a transport selector to move to different sections of a song, loop the section, and change the relative volume between the different musicians. These functions can operate in real time, or while the music is stopped, to make a desirable balance. The system can also include an auto-balance module to find a desirable balance between musicians. As each of the musicians are alternated, favorites can be selected and stored in real-time, or when the music is stopped, to mix and match players in the selection of the band.

Example 2. Custom Mapping for the Timing of the Musical Work

One of skill in the art of music production will understand that mapping a musical work is a skill obtained through experience and is not easy. There's nothing obvious about mapping, and there's no existing system that offers the custom mapping approach to assembling remotely-performed and remotely-uploaded musical performances as an ensemble. And, this mapping, although complex, can be used to provide a control for the transport of the musician to the desired portions of the musical work.

The easiest example of mapping can include the use of a transient or beat, for example, with drums, from the start to the end of a musical work. Once this type of mapping is done, the map can be expressed as a timing reference in any form of electrical signal that is audible or visual, or both. Or, the beat of the drums themselves can be used as the timing reference. The skilled artisan could identify a first beat and map it with subsequent beats, such as a first kick, then a first snare, a second kick, and then a second snare, representing one bar in quarter notes. That's a simple tempo map.

The tempo map is based on "distance" that is measured in time between bars, or sometimes between beats, e.g., in milliseconds. The distance between bar 1 and bar 2 could be, for example. 119.5 beats per minute, between bar 2 and bar 3 could then be 119.38 beats per minute, where the skilled artisan can capture subtle fluctuations in tempo. The capturing of such fluctuations, whether subtle or not, allows for a mapping that allows a learning artist to locate exactly where the beat is, e.g. a downbeat or an upbeat.

What if there are no drums? For this purpose, the skilled artisan could use another instrument, such as a guitar, in search of a downbeat and upbeat, for example. Many musical transients may provide a means for identifying quarter notes, eighth notes, etc, using any point of reference known to one of skill, and the choice depends on the complexity of the work or the tempo.

What if no tempo at all for some time, such as 8 bars? In this case, the skilled artisan could take the last beat of a section and the first beat of a following section and measure the distance between the selected beats.

What if song starts with an ad-lib vocal with no time reference at all? In this case, the skilled artisan could look at the overall tempo of a song, and then use expert interpretation to select a tempo, followed by an iterative process that includes, for example, manually shuffling, adjusting, and laying-out the map.

Tempo mapping functions that are available through PROTOOLS or other software programs are inadequate for the uses taught herein, as the do not provide preconfigured custom tempo mapping sets that will easily and automatically align to any given song. Our predefined custom tempo maps provide a technology for obtaining an accuracy and precision in the mapping of a reference performance that is not otherwise available to the musician.

Example 3. A Guidance System for Use by (i) an Auditioner in Preparation to Submit a Performance; and, for Use by (ii) a Reviewer in Evaluating a Performance Against a Reference A musical performance includes the execution of a series of sound frequencies by a musician, each of the series performed by the musician at a particular time in the musical performance. Although a precise and accurate performance of each of the frequencies at their respective times represents only two of several variables in a great performance, these two variables provide the basis for a guidance system that can be used by the musician in the development of a performance, or by a reviewer of the performance in comparing the performance to a reference performance.

It should be appreciated that a musician can follow a timing reference to perform in a desired manner. A musical work can have complex timing, for example, due to following a live drummer playing without a timing reference, or a beat can slowly drift out-of-time because it was recorded on a tape machine that slowly changed speed over time. In fact, the musical work may have been cut to the timing of the drummer's live performance rather than any click track that may have been printed on the tape machine. The timing reference, for example, might be selected and provided by a director for a particular set of auditions. Two performances that follow the same timing references and were recorded at locations remote from one another can be uploaded to a computer network and assembled as an ensemble using the shared timing reference as a timing interface. This is of particular importance when combining performances that consist of variable tempos, which includes most performances. The timing reference can be, for example, (i) a click-track; (ii) a drum track; (iii) a reference track of a select reference performance performed with or without any other accompaniment and having a series of sound frequencies, each of the frequencies performed at a particular time in the select reference performance; (iv) a residual audio track representing a multi-track digital audio file of a musical work having the select reference performance removed, the residual audio track having a series of sound frequencies, each of the frequencies performed at a particular time in the residual audio track; or, (v) a combination thereof.

Using the teachings provided herein, a guidance system can be configured to display an independent analyses of the frequencies performed by a musician, as well as an independent analysis of the timing of the performance of the frequencies. Both analyses can be combined on a chart that the musician can follow when performing the musical work, or when reviewing the performance. As such, a reviewer of performances can likewise use the guidance system to evaluate the performance. In fact, the guidance system can be used in the review of a plurality of performances as a rating tool. The chart can include a notated, digital transcription having absolute values of frequency and/or timing correlated with that of the timing reference. As such, the system provides valuable information about a musical performance, such information never-before available to a musician performing a select reference performance, or to a director or other reviewer of the performance.

Frequency, Timing, and Correction of Anomalies

It is not a simple task to emulate the series of frequencies and timing of the performance of each of the frequencies in a reference performance, and this is generally true regardless of the instrument you're playing. As such, both the musician and administrator can benefit from a tool that provides timing and/or frequency comparisons, comparing the musician's performance to a template, such as the tempo map designed for a reference performance. Using at least the teachings set-forth below, the tool can also provide a gaming platform, whereby users can contact other users having similar subject-profiles and compete with one another qualitative and/or quantitatively, using subjective scores or actual numerical scores obtained from the guidance tool and guidance module, for example.

Some instruments are more difficult and variable than others, however. Certain instruments, such as a violin or fretless bass, for example, have a design that doesn't indicate exactly where a musician needs to position fingers to play a particular note that is "in tune" (i.e., plus or minus 2 or 3 "cents"). An instrument having a "fixed tuning", such as a piano, can be tuned to a standard 12 semitones per octave. Such instruments are based on a 12-tone scale and are not typically designed to generate notes or micro-tunings in-between the 12 semitones per octave. A frequency analysis can be used with such instruments, for example, to show whether a performed note has the correct or incorrect frequency and provide a measure of the number of semitones between the correct note and the performed note as a "correction factor" for the musician or reviewer to use as a quantitative measure of the accuracy and precision of the performance.

The musician or reviewer can simply use the correction factor for a qualitative and/or quantitative measure of a comparison of the musicians performance to the reference performance. However, the reference performance can contain undesirable anomalies, such as errors in one or more frequencies performed in the reference, and/or the time at which the one or more frequencies were performed. As such, the system can identify these anomalies and replace them with a representation of the one or more frequencies and timing that would be expected to be present in a desirable performance. These can be identified by creating a notated, programmed track, a track tempo-mapped to serve as the timing reference for use in the reference track of the system.

For example, each note performed by a musician could be compared directly to the timing of a reference performance that was tempo-mapped to serve as the timing reference. If the reference performance happens to "rush" or "drag", meaning that it plays a little faster ("rushing") or a little slower ("dragging") at times than what would be expected in a perfect performance referenced to the tempo map, data representing the perfect performance could be used to replace the anomalies where desired. These "rigid" timing inserts could be added, for example, in an entire section, a bar, half bar, or just a few beats, to bring the part in question "back into the pocket". In this way, a custom compilation could be configured to represent the "feel" of the live track to the extent desired and correct for anomalies through rigid inserts from the interpolated "perfect performance". These custom configurations are possible through the tempo mapping, a method of "quantizing" a performance, This would facilitate, for example, perhaps replacing quantized segments of the reference performance with corrected audio data that was generated using the tempo map, providing an improved timing reference for learning, recording, and integrating an ensemble of the musical work.

FIGS. 20A-20F illustrate a guidance system used by musicians and administrators, according to some embodiments. The system 2000 compares the frequencies performed, $F_P$, by a musician to the frequencies targeted by the musician, $F_T$, within a select time-frame. Likewise, the system 2000 compares the timing of the frequencies performed, $T_{FP}$, by a musician to the timing of the frequencies targeted by the musician, $T_{FT}$, within a select time-frame 2010. The differences between the frequencies performed and the frequencies targeted, and the differences between the timing of the performed frequencies and the timing of the targeted frequencies, provide a performance measure, PM, for the musician and the administrator to follow in performing and/or reviewing the performance by the musician. The scale 2020 provides a qualitative display for use by the musician and/or the administrator used in the comparison. If the performance by the musician is "in the pocket" 2030, it can be considered to have differences in frequencies and timing with the selected time-frame 2010 that are acceptable. The performance can be considered, qualitatively and/or quantitatively, as having the desired "groove" or "feel", for example.

Figure 20:
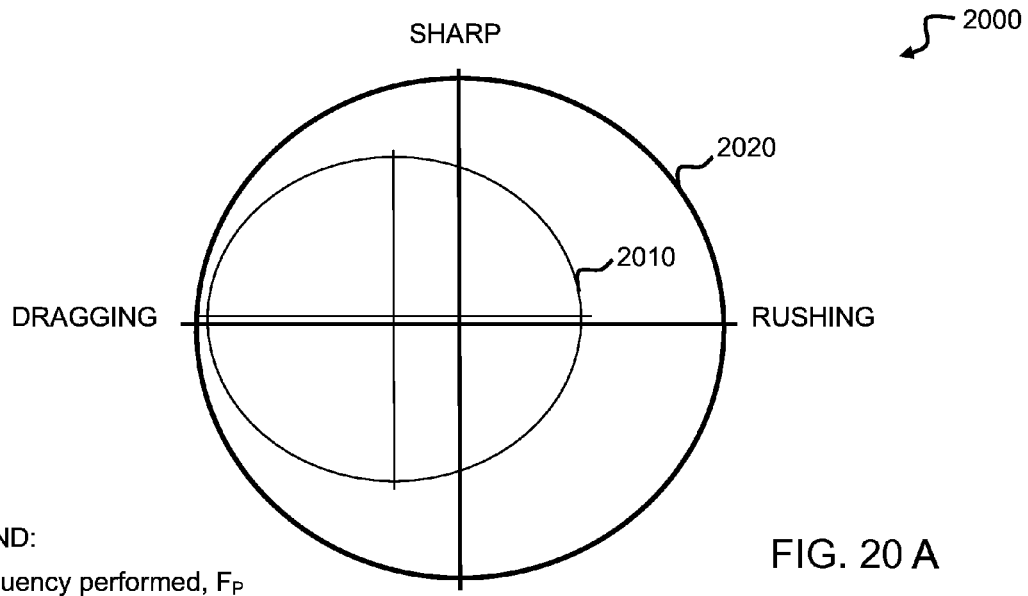
FIGS. 20A-20F show how an x-y guidance system can be used to help the musician stay "in the pocket" by monitoring note frequency and timing during the course of a performance, according to some embodiments.
Figure 20:
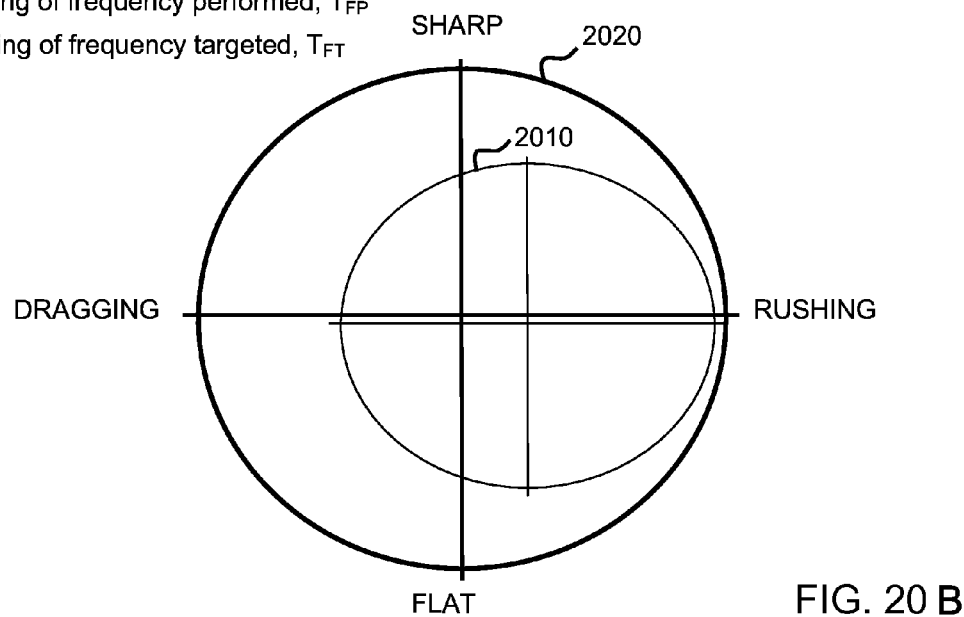
Figure 20:
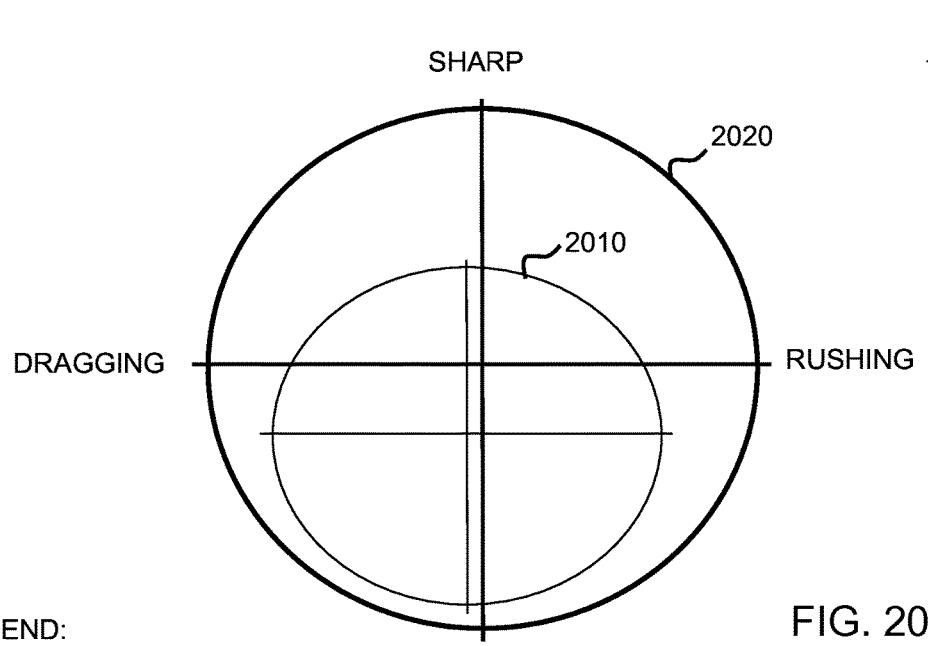
Figure 20:
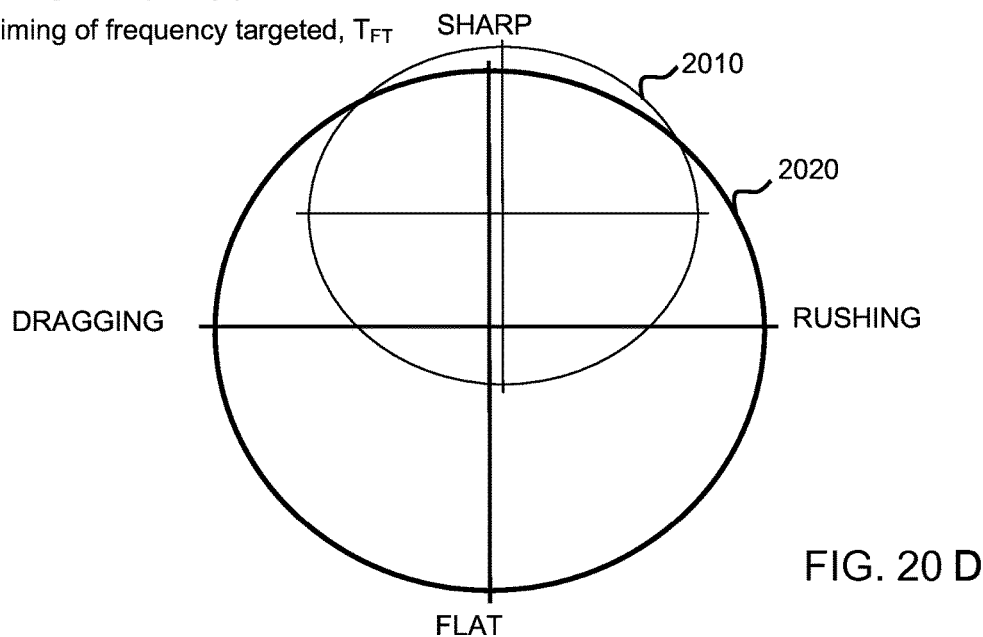
Figure 20:
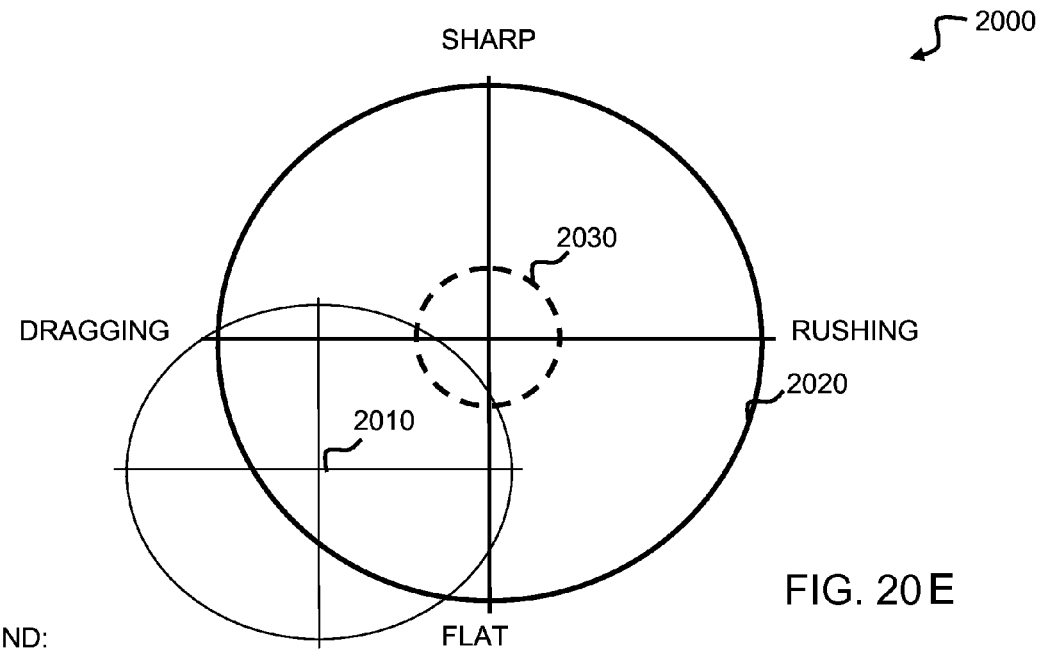
Figure 20:
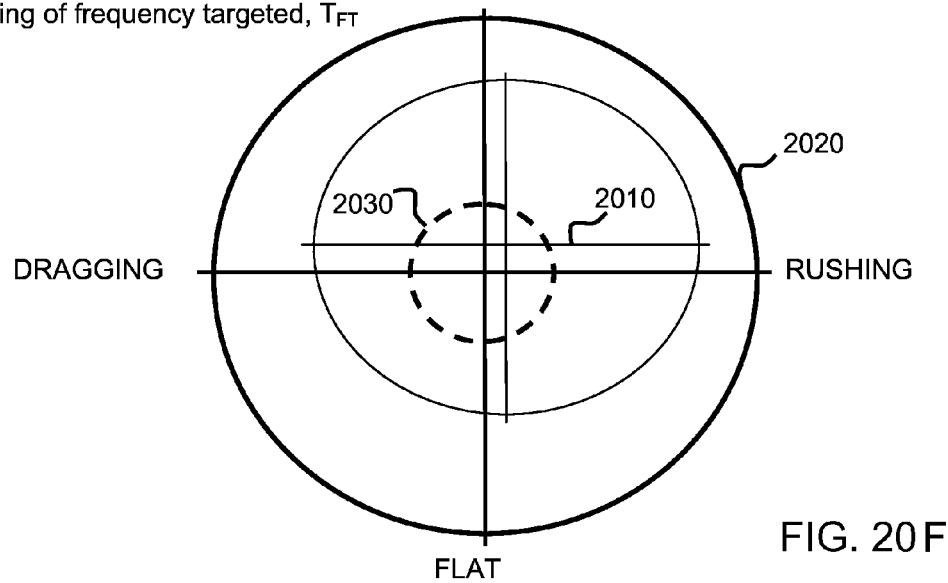

FIG. 20A illustrates an average of frequencies over the selected time-frame 2010 being slightly sharp in average frequency, and played slightly slow, dragging. FIG. 20B illustrates an average of frequencies over the selected time-frame 2010 being slightly flat in average frequency, and played slightly fast, rushing. FIG. 20C illustrates an average of frequencies over the selected time-frame 2010 being quite flat in average frequency, and played slightly slow, dragging. FIG. 20D illustrates an average of frequencies over the selected time-frame 2010 being quite sharp in average frequency, and played slightly fast, rushing. FIG. 20E illustrates "the pocket", and the musician playing quite a ways out of the pocket, not providing the desired performance of groove and/or feel. FIG. 20F illustrates the musician playing in the pocket, providing the desired performance of groove and/or feel. The selected time-frame can be adjusted to provide a desired degree of resolution during play, ranging from the representation of any beat or number of beats, measure or number of measures. In some embodiments, the selected time frame can include frequency and/or timing comparisons over the entire performance. In some embodiments, the selected time-frame can represent frequency and/or timing comparisons in an interval ranging from 0.1 second to 1 minute, from 0.1 second to 50 seconds, from 0.1 second to 40 seconds, from 0.1 second to 30 seconds, from 0.1 second to 20 seconds, from 0.1 second to 10 seconds, from 0.1 second to 5 seconds, from 0.5 seconds to 30 seconds, or any range or 0.1 second therein. In some embodiments, the selected time-frame can represent frequency and/or timing comparisons in an interval ranging can represent 0.1 second, 1 second, 2 seconds, 3 seconds, 5 seconds, 10 seconds, 15 seconds, 20 seconds, 30 seconds, or any range therein in increments of 0.1 second.

Figure 21:
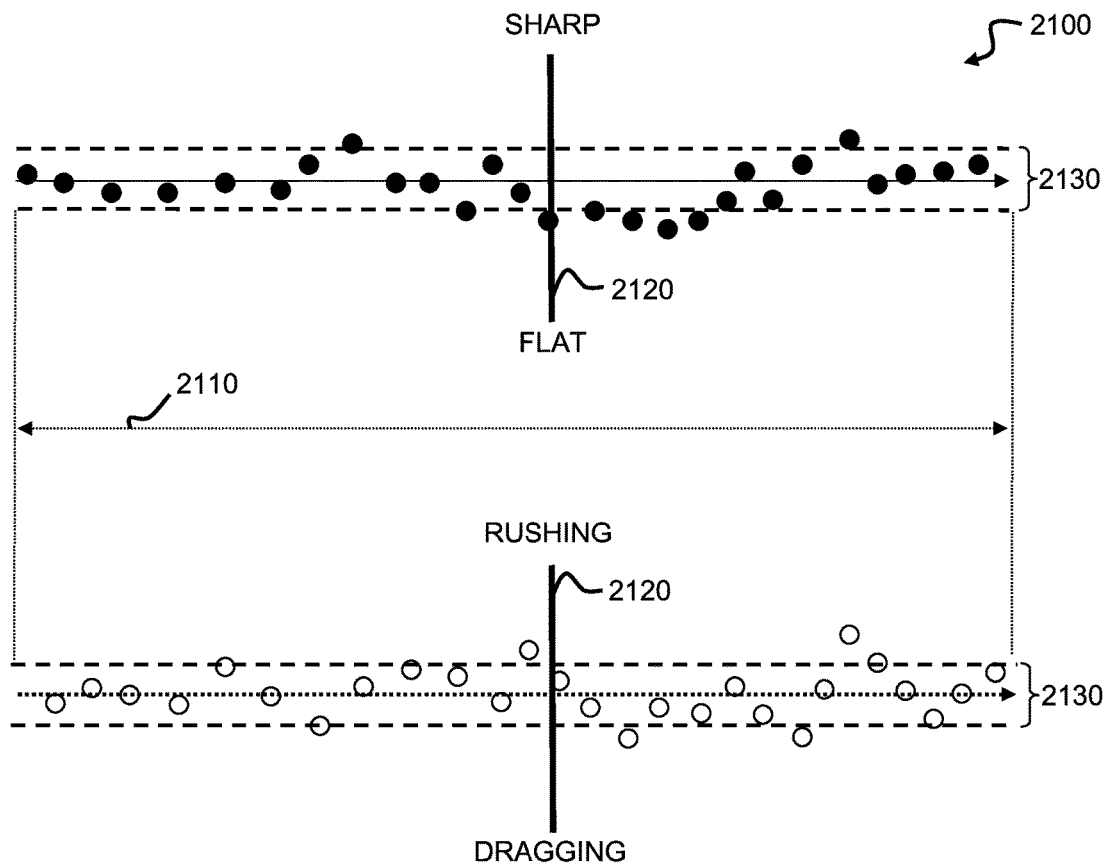
FIG. 21 shows how a timeline guidance system can be used to help the musician stay "in the pocket" by monitoring note frequency and timing during the course of a performance, according to some embodiments.

FIG. 21 illustrates an alternative guidance system used by musicians and administrators, according to some embodiments. The system 2100 compares the frequencies performed, $F_P$, by a musician to the frequencies targeted by the musician, $F_T$, within a select time-frame. Likewise, the system 2100 compares the timing of the frequencies performed, $T_{FP}$, by a musician to the timing of the frequencies targeted by the musician, $T_{FT}$, within a select time-frame 2110. The differences between the frequencies performed and the frequencies targeted, and the differences between the timing of the performed frequencies and the timing of the targeted frequencies, provide a performance measure, PM, for the musician and the administrator to follow in performing and/or reviewing the performance by the musician. The scale 2120 provides a qualitative display for use by the musician and/or the administrator used in the comparison. If the performance by the musician is "in the pocket" 2130, it can be considered to have differences in frequencies and timing with the selected time-frame 2110 that are acceptable. The performance can be considered, qualitatively and/or quantitatively, as having the desired "groove" or "feel", for example.

The qualitative comparison can be made using the relative positions of the visual "cross-hairs" of the performed and targeted frequencies and timing of the frequencies. A quantitative comparison can be made using the summation of the absolute values of the differences between the performed and targeted frequencies and timing of the frequencies across the selected time-frame. A mathematical relationship can be used, for example:

(i) for a performance measure of the timing=$PM_T=\Sigma|T_{FP}-T_{FT}|$ and $\Sigma$ is taken for the timing of the performance of each frequency across the selected time-frame; and, (ii) for a performance measure of the frequency=$PM_F=\Sigma|F_P-F_T|$ and $\Sigma$ is taken for the performance of frequency across the selected time-frame.

These qualitative and quantitative measures can be used alone, or in combination with, a system of voting. The system of voting can be achieved through the votes of one or more administrators, such as one or more directors, musicians in the plurality of musicians, users, or the general public, for example. In fact, in some embodiments, the voting system alone can be used and can be implemented with or without the computer network.

Example 4. The Use of Audio Tempo Mapping to Index a Corresponding Video Portion This example illustrates steps that can be used in implementing the teachings herein to an audiovisual musical work. U.S. application Ser. No. 13/274,293 is hereby incorporated herein by reference in its entirety.

Overdubbing to a Master Recording

This example shows how to use the methods provided herein combining the audio track derived from a classic multi-track master recording, and the audio/video performance of an instructor. Our example uses the original multi-track audio from Jimi Hendrix' "Purple Haze" and an audio/video performance of modern guitar legend Steve Vai demonstrating Jimi's technique.

The original multi-track master tapes were transferred to high quality multi-track audio files and mixed to sound indistinguishable from the original version of the song. The original guitar performance and the accompanying band track are both exported separately as stereo audio files so that the user will have discrete volume level control over these elements. Using these isolated audio components, a timing reference is constructed as described herein. By utilizing the individual instrument tracks from this original multi-track recording, the timing reference is created using a variety of notes, beats, and transients.

Steve Vai enters the audio/video studio where his rendition of the classic Jimi Hendrix song will be recorded with multiple camera angles and high quality audio recording equipment. In addition to the band track (all tracks remaining after removing the original guitar, for example, using the teachings described herein and in U.S. Pat. No. 7,902,446, which is hereby incorporated herein in its entirety by reference), Mr. Vai will use the timing reference as an accurate audio guide to perform his guitar in sync with the original band track. Either the audio/video recording of Steve or the audio of the Hendrix song may benefit from very subtle editing to match the 2 audio tracks in certain sections that will be very pleasing to the user.

Taking the finished and edited audio/video files of the performance and authoring it in sync with the original Hendrix tracks, the user can choose the desired camera angle for video playback and adjust the audio playback levels of the band audio track, Steve Vai's performance audio track, the original Hendrix audio track and the metronome click track (directly derived from the timing reference). A user can now select a desired portion of the video to emulate, and the user's selection will automatically move to the nearest cycle point and begin cycling through the selection. The cycling, for example, can be further defined by a default cycle point selection which might be 2 beats, 1 bar, 2 bars or an entire section such as a verse, chorus, or the entire song. The timing reference provides the point cycle feature with the information it needs so the user can quickly select a desired section of the audio/video and watch the same performance over and over again, and can do so with the synchronized audio cycling. In this way, the user can very quickly learn every technique that Steve Vai demonstrated on the Hendrix song. The user can select a small 1 bar section with the point cycle feature turned on in advance and as the section is perfected, the user can select the next closest start point or end point allowing the user the ability to change his start and end selection quickly and proficiently to the next closest cycle point at the beginning or ending of the current selection. The user will benefit from the ability to slow down the speed of the audio/video performance as desired without changing the pitch of the audio and examine the detail and nuances of Steve Vai performing his rendition of Purple Haze. As such, this allows the user to emulate this performance in slow motion with a great degree of detail and confidence and, once mastered, the user may now be able to emulate the performance at regular speed.

Example 5. Uploading and Displaying Multiple Video Portions as an "Ensemble" of Performances that are Synchronized Through a Timing Interface This example illustrates steps that can be used to receive, assemble, and display multiple audiovisual data files from a plurality of musicians that were performed uploaded at locations remote from the receiving, assembling, and displaying.

The methodology includes receiving a plurality of submissions from the plurality of musicians and using one variable tempo map created for the performance of each submission to transform data in each submission into a chronological series chunks of bars or beats that correspond to the tempo map, such that each audiovisual file is triggered to play in synchronization with the other submissions. The chunking of data provides one or more triggering-events for aligning and playing each of the plurality of submissions together as an ensemble.

As described herein, musicians are provided with a system for contributing to an ensemble of a set of remotely-performed and remotely-uploaded musical performances through a computer network. The systems have a processor operably connected to a memory and an input device operable to receive audio data. The memory can include a database operable to store data for access; a timing reference having (i) instructions for execution by the processor and (ii) a tempo selected by a director, for example; an audio engine embodied in a non-transitory computer readable storage medium, wherein the audio engine is operable to transform input audio data to output audio data; and, an instruction module operable for providing directions for a musician. The instruction module can direct the musician to record a musical submission at a location that is remote from a director of the ensemble, the recording including configuring the musical submission by following the timing reference when performing the musical submission. The instruction module can also direct the musician to upload the musical submission to the computer network at the location remote from the director to enable the director to create the ensemble by integrating the musical submission with the second musical submission using the timing interface.

As such, the timing interface is integral to aligning the musical submissions as an ensemble. A technical hurdle remains, in that the otherwise alignable musical submissions now need a triggering event to instruct each of the submissions to begin playing at the same time through a computer network. This is a significant technical hurdle, as the audio-visual files will typically include two batches of data—one video batch and one audio batch, the audio batch having, for example, two separate mono files or one interleaved stereo file. One of skill will appreciate that, although each submission contains files that were meant to play together, synchronized, starting and stopping at generally the same time, such that they play in unison, the art does not design the separate submissions to play together, synchronized, starting and stopping at generally the same time, such that they play in unison.

The process for creating the triggering event can include, for example, receiving each separate submission as a combination of audio and video data. For example, an ensemble created through the selection of 5 submissions will include 5 batches of video data and 5 batches of audio data, each batch of data performed using the timing reference, and each needing a triggering event through the computer system for playback through a common, master computer clock.

The common triggering event can be obtained, for example, by combining the audio data batch and video data batch from each submission into a common $AV_i$ file. An ensemble of 5 submissions, for example, will include common files designated as $AV_1$, $AV_2$, $AV_3$, $AV_4$, and $AV_5$. Each of the submissions will contain the common timing reference to serve as the timing interface, and the triggering event can occur as follows:

1. Align the timing reference of $AV_1$ with a SMPTE time code, the timing reference based on a tempo map that quantizes the performance into beats and bars. The SMPTE time code can be used to trigger the start of the playback of $AV_1$.
2. Align the timing reference of $AV_2$ with a SMPTE time code, the timing reference based on a tempo map that quantizes the performance into beats and bars. The SMPTE time code can be used to trigger the start of the playback of $AV_2$ with $AV_1$.
3. Align the timing reference of $AV_3$ with a SMPTE time code, the timing reference based on a tempo map that quantizes the performance into beats and bars. The SMPTE time code can be used to trigger the start of the playback of $AV_3$ with $AV_1$ and $AV_2$.
4. Align the timing reference of $AV_4$ with a SMPTE time code, the timing reference based on a tempo map that quantizes the performance into beats and bars. The SMPTE time code can be used to trigger the start of the playback of $AV_4$ with $AV_1$, $AV_2$, and $AV_3$.
5. Align the timing reference of $AV_5$ with a SMPTE time code, the timing reference based on a tempo map that quantizes the performance into beats and bars. The SMPTE time code can be used to trigger the start of the playback of $AV_5$ with $AV_1$, $AV_2$, $AV_3$, and $AV_4$.
6. Optionally, the-files can remain as separate audio and video files $A_1V_1$, $A_2V_2$, $A_3V_3$, $A_4V_4$, and $A_5V_5$.

Having the timing reference and SMPTE map overlay allows for a dynamic point referencing of the playback of the ensemble, the playback synchronization based on this method controlled by a common master clock from which the ensemble is combined and played. This technology provides a powerful new tool for uploading a plurality, perhaps massive, number of submissions, reviewing the submissions individually and in any combination, while having the ability to select any section or sections within a musical work for comparison, review, looping, selection, and swapping out of musicians to form an ensemble.

The system can also include a correction or "re-queue" feature, in which a frame or plurality of frames can be added or removed to shift the time code of a data stream. For example, the SMPTE time code can be used to initiate a triggering event. This triggering event can be followed by a series of re-triggering events, the frequency of re-triggering being selected as desired. The frequency of the re-triggering event can depend on the tempo and "looseness" of a particular song. A song having a tempo of 120 bpm may be appropriately re-triggered every 4 measures, or 16 beats, in some embodiments. A range of re-triggering events may occur, in many cases, at every 1 beat to 8 bars, in some embodiments.

The current state-of-the-art does not offer a technology for assembling multiple performances as an ensemble. In some embodiments, the term "multiple" can be used to refer to 3, 4, 5, 6, 7, 8, 10, 12, 14, 16, 18, 20, 30 or more performances that can be separately performed, separately uploaded, and assembled as an ensemble.

It should be appreciated that, if the processing requirement exceeds a machines power, it may be desirable to add additional processing capability. This can be in the form of a separate processing core for each video stream, in some embodiments. An external master clock source may also be desired to ensure a reliable synch between machines. A black burst generator, for example, can reference the common power frequency of 60 cycles/second with the master clock pulling down the speed of all synchronized devices from 30 frames per second to a black burst resolved speed of to 29.97 frames per second. This ensures that all devices are running at the same resolved speed.

Example 6. Use of the Systems and Methods in the Audition Process

The methods and systems provided herein can be used in the audition process.

Auditioning a new singer or musician for a musical group can be a time consuming task. Musicians aren't known for their punctuality, for example, making it difficult to have back-to-back auditions without long and costly breaks waiting for the next participant. Moreover, the environment of a typical audition is not expected to be comfortable, often hot and in a low-cost overhead urban environment, making the outside and the inside of the audition location generally unappealing. As such, one of skill in the art of auditions will appreciate that watching the auditions at your own pace and in your own environment would be preferred.

In addition, the audition environment is not conducive to the creation of a performer's best work. For example, a nervous singer showing up in a room packed with people that they've never met is an experience that makes it challenging at best to give the best performance they have to give. The systems and methods provided herein allow auditions to be viewed off-line at a later date, reducing the stress significantly, as there is no need for 25 or so people to be staring at the singer in a small, undesirable rehearsal space with florescent lighting.

As such, one of skill in the art of auditioning will appreciate the systems and methods provided herein.

Example 6. Use of the Systems and Methods in the Process of Practicing a Performance The methods and systems provided herein can be used in the process of practicing a performance.

All forms of artistic expression require practice to refine in preparation for a performance. Many Church bands, for example, learn new content every week and the leader of the band can find him or herself in a constant state of frustration. For example, a person that didn't learn their part correctly can make the rest of the band very irritable due to creating the need for everyone to spend more hours at practice than anticipated, cutting into their social or family time.

The leader can now stay home at least one night a week, choosing to wait and confirm that all participants have learned their parts correctly.

As such, one of skill in the art of practicing a performance of any type, particularly a group performance, will appreciate the systems and methods provided herein.

Example 7. Use of the Systems and Methods in the Process of Assembling a Set of Performances This example provides a concise illustration of a method and system for obtaining, selecting, and assembling a set of video performance for a concurrent, synchronized playback of otherwise remote performances.

Figure 22:
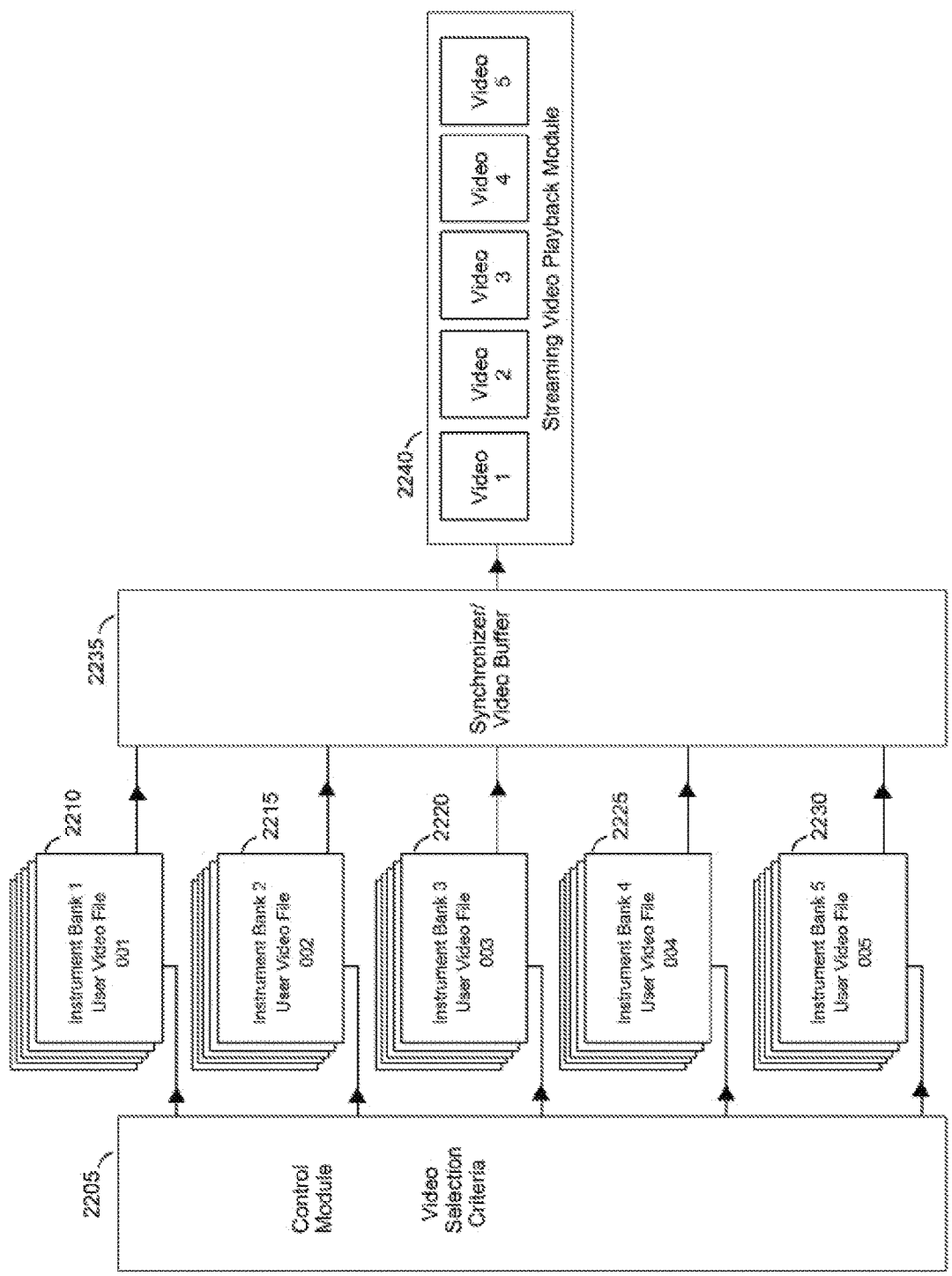
FIG. 22 is an illustration of how video selections of multiple performances can be selected and placed on a graphical user interface for concurrent viewing, according to some embodiments.

FIG. 22 is an illustration of how video selections of multiple performances can be selected and placed on a graphical user interface for concurrent viewing, according to some embodiments. Each instrument performance submitted, for example, is buffered and sent to a streaming video playback module 2240. First, the control module 2205 manages the video selection criteria for each of a set of user video files for display. In FIG. 22, 5 different user video files, each playing a different instrument is presented on one display, or a plurality of displays.

The control module 2205 regulates the selection of the user video files from instrument bank 1 2210, instrument bank 2 2215, instrument bank 3 2220, instrument bank 4 2225, and instrument bank 5 2230. The instrument banks 2210,2215,2220,2225,2230 are categorized, respectively, to represent each of 5 instruments that are eligible to be included in a synchronized streaming playback of 5 select videos. The videos are streamed from the instrument banks through the synchronizer/video buffer 2235 and into the streaming video playback module 2240. The control module, the instrument banks, the synchronizer/video buffer, and the streaming video playback module are operably connected to a processor for executing the instructions for playback of the videos on a graphical user interface.

The instrument banks 2210,2215,2220,2225,2230 provide a database of potential videos for selection, and one video is selected for playback per instrument bank based on dynamic criteria that may include, but is not limited to, user voting, electronic performance evaluation, admin override and/or random selection. The synchronizer/video buffer module 2235 aligns the timing of the playback of the selected video files for synchronous streaming 2240 using the methods and processes taught herein.

In some embodiments, the display can be assembled using the streaming video playback module 2240. The module can execute instructions on the processor to assemble each of the 5 videos (videos 1 through 5) by locating each of the videos on a single screen space in its own geometrical area by positioning each video in its own unique space, within the borders of a single screen. Each of the 5 unique spaces could be exactly the same geometrical area or radically different. For example, 4 of the geometrical areas can be defined as relatively smaller for the musicians (each less than 3%-20% of the entire single screen, for example) as compared to a larger, perhaps huge, area for the singer (or 80%-97% of the entire screen).

In some embodiments, each user video file in each instrument bank will be cut into predefined smaller files. In some embodiments, the predefined smaller files will correspond in time to one or more bars. In some embodiments, the predefined smaller files will correspond in time to one or more beats. For example, the predefined smaller files can correspond to about the length of 1 bar of music at 120 bpm. In another example, the predefined smaller files can correspond to a length of about 1 msec, 2 msec, 3 msec, 5 msec, 10 msec, 50 msec, 100 msec, and up to 1 minute in increments of 1 msec. Each of these predefined smaller files can be triggered approximately every bar or by a predetermined trigger point based on realtime, time code, bar, beats etc.

In some embodiments, the user video file in each instrument bank can be cut into predefined smaller files based on a variable tempo mapping of the performance and making a start point at the beginning of each bar and a stop point at the end of each bar. These start and stop points could also be adjusted in increments ranging in duration from about 1 millisecond to about 100 milliseconds, from about 5 milliseconds to about 50 milliseconds, from about 10 milliseconds to about 100 milliseconds, from about 20 milliseconds to about 100 milliseconds, from about 2 milliseconds to about 20 milliseconds, from about 3 milliseconds to about 30 milliseconds, from about 4 milliseconds to about 100 milliseconds, or any range or amount therein in increments of 1 millisecond.

In addition, the user video file in each instrument bank can be cut into predefined smaller files based on a variable tempo map or tempo defined "sniffer," making a start point at the beginning of each bar or bars and a stop point at the end of each bar or bars. These start and stop points could also be individually or globally adjusted in increments ranging in duration from about 1 millisecond to about 100 milliseconds, from about 5 milliseconds to about 50 milliseconds, from about 10 milliseconds to about 100 milliseconds, from about 20 milliseconds to about 100 milliseconds, from about 2 milliseconds to about 20 milliseconds, from about 3 milliseconds to about 30 milliseconds, from about 4 milliseconds to about 100 milliseconds, or any range or amount therein in increments of 1 millisecond.

After the cuts (edits) have been made, for example, each of these predefined smaller files can be triggered approximately every bar or by a predetermined trigger point based on realtime, time code, bar, beats etc.

We claim:

1. A system for creating an ensemble of a set of remotely-performed and remotely-uploaded musical performances through a computer network, the system comprising:
  a processor operably connected to a memory on a non-transitory computer readable medium;
  a receiving module operable for receiving audio data from a musical submission and a second musical submission on a non-transitory computer readable medium;
  an integration engine embodied in a non-transitory computer readable medium, wherein the integration engine is operable to interface the timing of a musical submission with the timing a second musical submission using a timing reference track that includes a tempo map in the creation of an ensemble; and
  a display module operable for displaying the ensemble;
  wherein the timing reference is selected from the group consisting of:
  a click-track;
  a drum track;
  a select reference track of a select reference performance, $\jmath$, the select reference performance having a series of sound frequencies, each of the frequencies performed at a particular time in the select reference performance;
  a residual audio track representing a multi-track digital audio file of a musical work having the select reference performance removed, the residual audio track having a series of sound frequencies, each of the frequencies performed at a particular time in the residual audio track; and,
  a combination thereof.

2. The system of claim 1, wherein the timing reference used by the integration engine is one track in each of a series of multi-track digital audio files available upon request by each of a plurality of musicians; each of the series containing a shared musical work, highlighting a select reference performance on a select reference track within the musical work, and including
  (i) T reference performances within the musical work, wherein $T = \Sigma \jmath_i$; and, $\jmath_i = \jmath_1, \jmath_2, \jmath_3, \ldots,$ or $\ldots \jmath_T$;
  (ii) a select reference track of the select reference performance, $\jmath_i$, the select reference performance having a series of sound frequencies, each of the frequencies performed at a particular time in the select reference performance;
  (iii) a residual audio track representing the multi-track digital audio file having the select reference performance removed; and,
  (iv) instructions for execution of the timing reference by the processor.

3. The system of claim 1, further comprising
  an input device operable to receive video data on a non-transitory computer readable medium;
  a video engine embodied in a non-transitory computer readable medium, wherein the video engine is operable to transform input video data to output video data as a video recording of a musical submission for display in a visual ensemble;
  an output module embodied in a non-transitory computer readable medium, wherein the output module is operable to transmit the integrated audio data, along with the video data, to an output device, the output device operable to display the visual ensemble.

4. The system of claim 1, further comprising a guidance module on a non-transitory computer readable medium and operable as a guidance system including a timing comparison tool to compare the musical submission to the select reference performance, the guidance system providing a feedback that includes a qualitative or quantitative measure of the timing comparison.

5. The system of claim 1, further comprising a guidance module on a non-transitory computer readable medium and operable as a guidance system including a frequency comparison tool to compare the musical submission to the select reference performance, the guidance system providing a feedback that includes a qualitative or quantitative measure of the frequency comparison.

6. The system of claim 2, further comprising a guidance module on a non-transitory computer readable medium and operable as a guidance system including a frequency comparison tool and a timing comparison tool to compare the musical submission to the select reference performance, the guidance system providing a feedback that includes a qualitative or quantitative measure of the frequency comparison and the timing comparison.

7. The system of claim 2, further comprising a dynamic guidance module on a non-transitory computer readable medium and operable as a dynamic guidance system including a frequency comparison tool and a timing comparison tool to provide a continuous comparison of the musical submission with the select reference performance from the beginning of the performance to the end of the performance, or any section therein, the dynamic guidance system providing a qualitative or quantitative measure of the frequency comparison and the timing comparison.

8. The system of claim 2, further comprising a dynamic guidance module on a non-transitory computer readable medium and operable as a dynamic guidance system, the guidance system including a frequency comparison tool and a timing comparison tool for each of the plurality of musicians to continuously compare their performance of the musical submission with the select reference performance while they perform, the dynamic guidance system providing a real-time feedback that includes a qualitative or quantitative measure of the frequency comparison and the timing comparison, the real-time feedback being no slower than 30 milliseconds from the occurrence of a respective transient or note performed in the musical submission and used for comparison to the select reference performance.

* * * * *